(12) United States Patent
Fujii

(10) Patent No.: US 7,529,011 B2
(45) Date of Patent: May 5, 2009

(54) DEFLECTOR MIRROR WITH REGIONS OF DIFFERENT FLEXURAL RIGIDITY

(75) Inventor: Mitsumi Fujii, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/102,658

(22) Filed: Apr. 11, 2005

(65) Prior Publication Data

US 2005/0243396 A1    Nov. 3, 2005

(30) Foreign Application Priority Data

Apr. 12, 2004   (JP) ............... 2004-117199
Apr. 19, 2004   (JP) ............... 2004-122688

(51) Int. Cl.
*G02B 26/08* (2006.01)

(52) U.S. Cl. ............ 359/224; 359/197; 359/212; 359/870; 359/846; 359/848

(58) Field of Classification Search ........ 359/224
See application file for complete search history.

(56) References Cited

U.S. PATENT DOCUMENTS

| | | | | |
|---|---|---|---|---|
| 6,016,377 | A * | 1/2000 | Suhir | ............ 385/135 |
| 6,672,732 | B1 | 1/2004 | Niendorf et al. | |
| 6,900,925 | B2 * | 5/2005 | Kato et al. | ............ 359/298 |
| 6,924,914 | B2 * | 8/2005 | Kato et al. | ............ 359/224 |
| 2002/0122217 | A1 | 9/2002 | Nakajima | |
| 2003/0053156 | A1 | 3/2003 | Satoh et al. | |
| 2003/0072066 | A1 | 4/2003 | Hayashi et al. | |
| 2003/0214734 | A1 * | 11/2003 | Nishioka et al. | ............ 359/846 |
| 2003/0227538 | A1 | 12/2003 | Fujii et al. | |
| 2005/0030606 | A1 | 2/2005 | Nakajima | |
| 2005/0185237 | A1 * | 8/2005 | Nakajima | ............ 359/212 |
| 2005/0243396 | A1 | 11/2005 | Fujii et al. | |

FOREIGN PATENT DOCUMENTS

| | | |
|---|---|---|
| JP | 7-92409 | 4/1995 |
| JP | 2924200 | 5/1999 |
| JP | 2981600 | 9/1999 |
| JP | 3011144 | 12/1999 |
| JP | 2002-48998 | 2/2002 |
| JP | 2002-258183 | 9/2002 |
| JP | 2002-341285 | 11/2002 |
| JP | 2003-15064 | 1/2003 |
| JP | 2003-503754 | 1/2003 |

(Continued)

OTHER PUBLICATIONS

U.S. Appl. No. 10/857,489, filed May 27, 2004, Merrick Furst.

(Continued)

*Primary Examiner*—Jessica T Stultz
(74) *Attorney, Agent, or Firm*—Oblon, Spivak, McClelland, Maier & Neustadt, P.C.

(57) ABSTRACT

A deflector mirror is disclosed that includes a mirror substrate configured to vibrate in a reciprocating manner on beams as a torsional rotary shaft so as to deflect a light beam emitted from a light source. The mirror substrate includes multiple regions in each of portions thereof extending from the torsional rotary shaft to respective ends of the mirror substrate, the regions being different in flexural rigidity.

7 Claims, 41 Drawing Sheets

FOREIGN PATENT DOCUMENTS

| JP | 2003-66361 | 3/2003 |
| --- | --- | --- |
| JP | 2003-84226 | 3/2003 |
| JP | 2003-131161 | 5/2003 |
| JP | 2003-241134 | 8/2003 |
| JP | 2003-255251 | 9/2003 |
| JP | 2003-315724 | 11/2003 |

OTHER PUBLICATIONS

Kurt E. Petersen, "Silicon Torsional Scanning Mirror", IBM J. Res. Develop., vol. 24, No. 5, Sep. 1980, pp. 631-637.

Harald Schenk, et al., "An Electrostatically Excited 2D-Micro-Scanning-Mirror with an In-Plane Configuration of the Driving Electrodes", the 13th Annual International Workshop on MEMS2000, pp. 473-478.

Henri Camon, et al., "Fabrication, Simulation and Experiment of a Rotating Electrostatic Silicon Mirror with Large Angular Deflection", the 13th Annual International Workshop on MEMS2000, 2000, pp. 645-650.

Harald Schenk, et al., "A New Driving Principle for Micromechanical Torsional Actuators", the 1999 ASME International Mechanical Engineering Congress and Exposition, MEMS-vol. 1, Nov. 14-19, 2000, pp. 333-338.

U.S. Appl. No. 11/282,655, filed Nov. 21, 2005, Saitoh.
U.S. Appl. No. 11/609,098, filed Dec. 11, 2006, Nakajima.
U.S. Appl. No. 11/765,166, filed Jun. 19, 2007, Nakajima.
U.S. Appl. No. 11/838,392, filed Aug. 14, 2007, Sato.
U.S. Appl. No. 12/020,292, filed Jan. 25, 2008, Miyatake, et al.
U.S. Appl. No. 12/024,505, filed Feb. 1, 2008, Watanabe, et al.
U.S. Appl. No. 12/028,446, filed Feb. 8, 2008, Nakamura, et al.
U.S. Appl. No. 12/051,404, filed Mar. 19, 2008, Amada, et al.

* cited by examiner

Z-DIRECTIONAL DYNAMIC DEFLECTION t=0 (s)

t=T0·1/4 t=T0·1/2 t=T0·3/4 t=T0·4/4

DEFLECTOR MIRROR WITH REGIONS OF DIFFERENT FLEXURAL RIGIDITY

BACKGROUND OF THE INVENTION

1. Field of the Invention

The present invention relates generally to micro-optical systems realized by micromachining technology, and more particularly to a deflector mirror of a type that causes a mirror substrate to vibrate in a reciprocating manner around torsion beams as a torsional rotary shaft, the torsion beams each having one end thereof supported. The present invention also relates to apparatuses such as optical scanning devices and image forming apparatuses to which the deflector mirror is applied. The present invention relates to a technique suitable for the writing unit of an image forming apparatus such as an electrophotographic printer or copier.

2. Description of the Related Art

A deflector mirror in which a mirror substrate supported by two beams provided on a straight line is caused to vibrate in a reciprocating manner around the two beams serving as a torsional rotary shaft by the electrostatic attraction between the mirror substrate and electrodes positioned opposite the mirror substrate is disclosed in Petersen, K. E.; "Silicon Torsional Scanning Mirror," *IBM Journal of Research and Development*, 24, 631-637 (1980). Compared with the conventional optical scanning device that causes a polygon mirror to rotate using a motor, this deflector mirror formed by micromachining technology has a simple structure, and can be formed by batch formation in a semiconductor process. As a result, this deflector mirror is easy to reduce in size and manufacturing cost. Further, this deflector mirror uses a single reflecting surface. Accordingly, unlike the polygon mirror, there are no variations in accuracy between reflecting surfaces. Further, since the deflector mirror performs scanning in a reciprocating manner, it is possible to support an increase in speed.

Such electrostatically driven torsional vibration deflector mirrors are disclosed as follows. Japanese Patent Nos. 2924200 and 2981600 each disclose a deflector mirror (an optical scanner) that has beams each shaped like an S letter to reduce rigidity so that a great deflection angle can be obtained with a little driving force. Japanese Laid-Open Patent Application No. 7-92409 discloses an optical scanner in which beams are thinner than a mirror substrate and a frame substrate. Japanese Patent No. 3011144 discloses an optical scanner in which fixed electrodes are positioned so as not to overlap with a mirror part in its directions of vibration. Such an optical scanner (a scanning mirror) is also disclosed in Herald Schenk; "An Electrostatically Excited 2D-Micro-Scanning-Mirror with an In-Plane Configuration of the Driving Electrodes," the 13th Annual International Workshop on MEMS2000, 473-478 (2000). A torsional actuator that reduces driving voltage without changing the deflection angle of a mirror by providing an opposing electrode so that the opposing electrode is inclined from the center position of the deflection of the mirror is disclosed in the 13th Annual International Workshop on MEMS2000, 645-650 (2000), and Herald Schenk et al.; "A New Driving Principle for Micromechanical Torsional Actuators," the 1999 ASME International Mechanical Engineering Congress and Exposition, 333-338, Nov. 14-19, 2000.

Japanese Laid-Open Patent Application No. 2003-15064 discloses a deflector mirror in which each torsion beam (torsion connection part) connecting a mirror substrate (a mirror formation part) and a frame is relatively wide at the connection to the mirror formation part and is gradually narrowed in a direction away from the mirror formation part at least up to halfway toward the frame, thereby preventing the rotation of the mirror substrate around a normal.

Published Japanese Translation of PCT International Application No. 2003-503754 discloses a deflector mirror (a micromechanical oscillating device) including a converter structure for converting external impact forces applied to a mirror substrate (an oscillating structure) into forces in the axial directions of a torsion beam (a torsion spring element) between the mirror substrate and the torsion beam.

Further, Japanese Laid-Open Patent Application No. 2002-48998 discloses an optical scanning device that causes a light beam to be emitted after causing the light beam to be reflected multiple times between the mirror surface of a deflector mirror and a mirror surface opposite thereto.

Conventionally, in a mechanical element requiring a high-speed operation, its inertia is a great hindrance to drive speed. In particular, in a mechanical element that rotationally vibrates within a predetermined angle, it is necessary to reduce the moment of inertia. At this point, attention should be paid so as not to reduce the rigidity of the mechanical element to be driven. For this purpose, the mechanical element is provided with a hollow structure, or a reinforcing member is fixed to the mechanical element.

Laser printers using an optical deflector to perform optical scanning have become more sophisticated and reduced in size, so that it is required that the optical deflector be also reduced in size. As an optical deflector satisfying such a requirement, an optical deflector that deflects light by causing a micromirror employing micromachining technology to perform torsional vibration is proposed.

A micromirror employed in this type of optical deflector is required to be drivable at high speed and have high rigidity. If the rigidity of the micromirror is insufficient, the micromirror deflects greatly because of an inertia force generated with the vibration of the mirror. Such dynamic deflection extremely degrades the optical characteristics of the reflected light of the mirror. In general, this type of dynamic deflection is reduced by increasing rigidity by increasing the thickness of the mirror.

However, the acting force of an actuator employed in this type of optical deflector is extremely small. If the thickness of the mirror is increased to reduce dynamic deflection, the inertia of the mirror increases so that the small acting force of the actuator cannot prevent the angle of deflection from decreasing significantly. Accordingly, it is necessary to reduce the moment of inertia of the mirror in order to increase the angle of deflection.

Japanese Laid-Open Patent Application No. 2003-131161 discloses an optical deflector in which the moment of inertia is reduced by setting a vibration plate (a mirror substrate) so that its thickness gradually decreases outward.

Even in the above-described conventional technology, however, the moment of inertia is still great so that dynamic deflection cannot be controlled sufficiently.

FIG. 1 is a schematic diagram of a conventional deflector mirror. The deflector mirror of FIG. 1 includes a substrate 1, a rotary shaft 2 formed of torsion beams, and a rectangular mirror substrate 3 provided on the substrate 1. A thin metal film having sufficient reflectance with respect to employed light is formed on the mirror substrate 3 as a mirror surface so as to deflect light made incident on the mirror surface.

The mirror substrate 3 vibrates rotationally in a sine wave manner on the rotary shaft 2. At the time of vibration, an inertia force works because of the vibration of the mirror substrate 3. That is, dynamic deflection deformation occurs in the mirror substrate 3 because of an inertia force when the mirror substrate 3 vibrates in a reciprocating manner. This inertia force causes a bending moment Mx to act on each point of the mirror substrate as illustrated in FIG. 2. FIG. 2 is a schematic diagram of the bending moment acting on each point of the mirror substrate 3. FIG. 3 is a graph illustrating the results of calculating the bending moment Mx.

In FIG. 3, letting the length of the mirror substrate 3 in a Y-axial direction be L, the peak positions of the bending moment Mx are located approximately at ±L/3 positions.

A description is given, with reference to FIGS. 4A and 4B, of the dynamic deflection deformation of the mirror substrate 3, which is uniform in thickness and has a length of 2L with the center of each of opposing sides thereof being directly connected to the unsupported end of the corresponding torsion beam, in the case of causing the mirror substrate 3 to vibrate in a reciprocating manner around the rotary shaft 2.

FIG. 4A is a schematic diagram of the dynamic deflection deformation of the mirror substrate 3. FIG. 4B is a graph illustrating variations in the calculated value (solid line) and the actually measured value (dots) of the dynamic deflection of the mirror substrate 3 in its longitudinal directions. The deformation of the mirror substrate 3 was measured by actually causing the mirror substrate 3 to vibrate.

As illustrated in FIG. 4A, the mirror substrate 3 vibrates approximately in a sine wave manner so as to deflect like a wave. The calculated value of the dynamic deformation is the difference between the curved surface of the mirror substrate 3 and an ideal plane obtained from the curved surface of the deformed mirror substrate 3 by the least squares method. The calculated value was obtained by numerical calculation considering the inertia force of the mirror substrate 3. The actually measured value of the dynamic deflection is a value measured by holography. Here, the absolute values of the calculated and actually measured values are not illustrated because it is intended to illustrate how the dynamic deflection of the mirror substrate 3 varies in its longitudinal directions.

As illustrated in FIG. 4B, a peak of the dynamic deflection appears around a position approximately L/3 apart from the rotation center axis of the mirror substrate 3, which coincides with the extension of the center axis of the torsion beams. That is, a maximum deflection can be obtained around a position where approximately Y=L/3. Specifically, for instance, in the case of causing a mirror substrate of single crystal silicon 4 mm×4 mm in size and 20 μm in thickness, supported directly by two torsion beams, to vibrate in a reciprocating manner at a deflection angle of ±5° at 2.5 kHz, deflection in the proximity of a position L/3 distant from the rotation center axis amounts to no less than approximately 1 μm.

Such dynamic deflection deformation of a mirror substrate degrades the optical characteristics of a light beam reflected from a mirror surface formed as a thin metal film on the mirror substrate. Accordingly, it is necessary to prevent such dynamic deflection deformation as much as possible.

In order to reduce the dynamic deflection deformation of a mirror substrate, the rigidity of the mirror substrate may be increased by increasing its thickness. However, such an approach causes a problem in that the deflection angle (angle of deflection) of the mirror substrate decreases because of an increase in the moment of inertia of the mirror substrate or driving energy necessary for obtaining the same deflection angle increases (a driving voltage becomes high in a deflector mirror of an electrostatic driving type).

SUMMARY OF THE INVENTION

Accordingly, it is a general object of the present invention to provide a deflector mirror in which the above-described disadvantages are eliminated.

A more specific object of the present invention is to provide a deflector mirror in which dynamic deflection is reduced by optimizing a change in the rigidity of a vibration plate (a mirror substrate) and the angle of deflection is increased by reducing the moment of inertia of the vibration plate, and an optical scanning device and an image forming apparatus using the same.

A more specific object of the present invention is to provide a deflector mirror in which the dynamic deflection deformation of a mirror substrate adversely affecting the optical characteristics of a reflected light beam is controlled effectively, and a device or apparatus to which the deflector mirror is applied.

One or more of the above objects of the present invention are achieved by a deflector mirror including a mirror substrate configured to vibrate in a reciprocating manner on beams as a torsional rotary shaft so as to deflect a light beam emitted from a light source, wherein the mirror substrate includes a plurality of regions in each of portions thereof extending from the torsional rotary shaft to respective ends of the mirror substrate, the regions being different in flexural rigidity.

According to one aspect of the present invention, a mirror substrate includes multiple regions different in flexural rigidity around a rotary shaft in each portion extending from the rotary shaft to a corresponding end of the mirror substrate. Accordingly, dynamic deflection can be reduced.

One or more of the above objects of the present invention are also achieved by an optical scanning device including: a light source; a deflector mirror including a mirror substrate configured to vibrate in a reciprocating manner on beams as a torsional rotary shaft so as to deflect a light beam emitted from the light source, the mirror substrate including a plurality of regions in each of portions thereof extending from the torsional rotary shaft to respective ends of the mirror substrate, the regions being different in flexural rigidity; and an imaging optical system configured to focus the deflected light beam into a spot on a scanned surface.

One or more of the above objects of the present invention are also achieved by an image forming apparatus including: an optical scanning device including: a light source; a deflector mirror including a mirror substrate configured to vibrate in a reciprocating manner on beams as a torsional rotary shaft so as to deflect a light beam emitted from the light source, the mirror substrate including a plurality of regions in each of portions thereof extending from the torsional rotary shaft to respective ends of the mirror substrate, the regions being different in flexural rigidity; and an imaging optical system configured to focus the deflected light beam into a spot on a scanned surface; a photosensitive body on which a latent image is formed by scanning by the light beam; a development unit developing the latent image with toner into a toner image; and a transfer unit transferring the toner image onto recording paper.

One or more of the above objects of the present invention are also achieved by a deflector mirror including: a mirror substrate; first and second torsion beams each having one end thereof supported and another end thereof unsupported; and first and second pairs of joining members of a same length joining the unsupported ends of the first and second torsion beams, respectively, to the mirror substrate so as to allow the mirror substrate to vibrate in a reciprocating manner on the first and second torsion beams serving as a rotary shaft, wherein the joining members of each of the first and second pairs have respective first ends thereof joined to a corresponding side of the mirror substrate at specific positions symmetric with respect to a rotation center axis of the mirror substrate, and have respective second ends thereof joined to the unsupported end of a corresponding one of the first and second torsion beams, so that the joining members and the corresponding side of the mirror substrate form, as a whole, a substantially isosceles triangle-like structure with the unsupported end of the corresponding one of the first and second torsion beams being an apex; and the specific positions are selected so as to be more remote from the rotation center axis of the mirror substrate than peak positions of dynamic deflection of the mirror substrate in a case of joining the mirror substrate directly to the unsupported ends of the first and second torsion beams and causing the mirror substrate to vibrate in a reciprocating manner.

According to the above-described deflector mirror, the dynamic deflection deformation of a mirror substrate can be controlled with efficiency. Further, a region of small dynamic deflection can be expanded in the mirror substrate, and in the region, the dynamic deflection can be reduced in particular in the vicinity of the rotation center axis of the mirror substrate. Accordingly, the optical characteristics of a deflected light beam, such as a beam diameter, can be improved. Since the region of small dynamic deflection expands in the mirror substrate, good optical characteristics of a light beam can be obtained also in the case of increasing the angle of deflection of the light beam by the principle of the optical lever by reflecting the light beam back and forth between the mirror substrate and a fixed mirror such as a roof mirror. Further, unlike the approach of controlling the dynamic deflection deformation of a mirror substrate by increasing its thickness, no increase is caused in the moment of inertia of the entire mirror substrate. Accordingly, no reduction is caused in the deflection angle of the mirror substrate, and no increase is caused in driving energy.

One or more of the above objects of the present invention are also achieved by an optical scanning device including: a deflector mirror according to the present invention; a light source; a first optical system making a light beam emitted from the light source incident on the deflector mirror; a mirror having the light beam reflected back and forth a plurality of times between the mirror and the mirror substrate of the deflector mirror; and a second optical system causing the light beam reflected back and forth the plurality of times to focus on a surface to be scanned.

One or more of the above objects of the present invention are achieved by an optical scanning device including: a deflector mirror according to the present invention; a light source; a first optical system making a light beam emitted from the light source incident on the deflector mirror; and a second optical system causing the light beam deflected by the deflector mirror to focus on a surface to be scanned.

According to the above-described optical scanning devices, it is possible to scan a scanned surface (a surface to be scanned) with a light beam having good optical characteristics, and it is also possible to perform high-speed scanning by reciprocating scanning. Further, the optical scanning device according to the present invention is superior in silence and power saving to the conventional optical scanning device using a polygon mirror.

One or more of the above objects of the present invention are achieved by an image forming apparatus including: a photosensitive body; an optical scanning device scanning a surface of the photosensitive body with a light beam modulated by an image signal so as to form an electrostatic latent image, the optical scanning device including: a deflector mirror according to the present invention; a light source; a first optical system making a light beam emitted from the light source incident on the deflector mirror; a mirror having the light beam reflected back and forth a plurality of times between the mirror and the mirror substrate of the deflector mirror; and a second optical system causing the light beam reflected back and forth the plurality of times to focus on the scanned surface; and a development part developing the electrostatic latent image into a toner image.

One or more of the above objects of the present invention are achieved by an image forming apparatus including: a photosensitive body; an optical scanning device scanning a surface of the photosensitive body with a light beam modulated by an image signal so as to form an electrostatic latent image, the optical scanning device including: a deflector mirror according to the present invention; a light source; a first optical system making a light beam emitted from the light source incident on the deflector mirror; and a second optical system causing the light beam deflected by the deflector mirror to focus on the scanned surface; and a development part developing the electrostatic latent image into a toner image.

According to the above-described image forming apparatuses, it is possible to form a high-quality image by performing optical writing to a photosensitive body with a light beam having good optical characteristics. Further, since it is possible to perform high-speed optical writing by reciprocating scanning, it is possible to form an image at high speed. Further, the image forming apparatus according to the present invention is superior in silence and power saving to the conventional image forming apparatus employing the optical scanning device using a polygon mirror.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

Figure 4A:
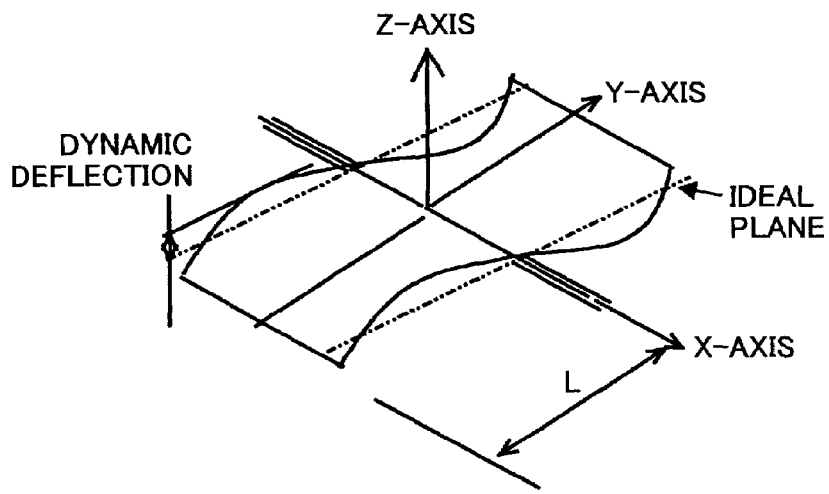
FIG. 4A is a schematic diagram of the dynamic deflection deformation of the conventional mirror substrate.
Figure 4B:
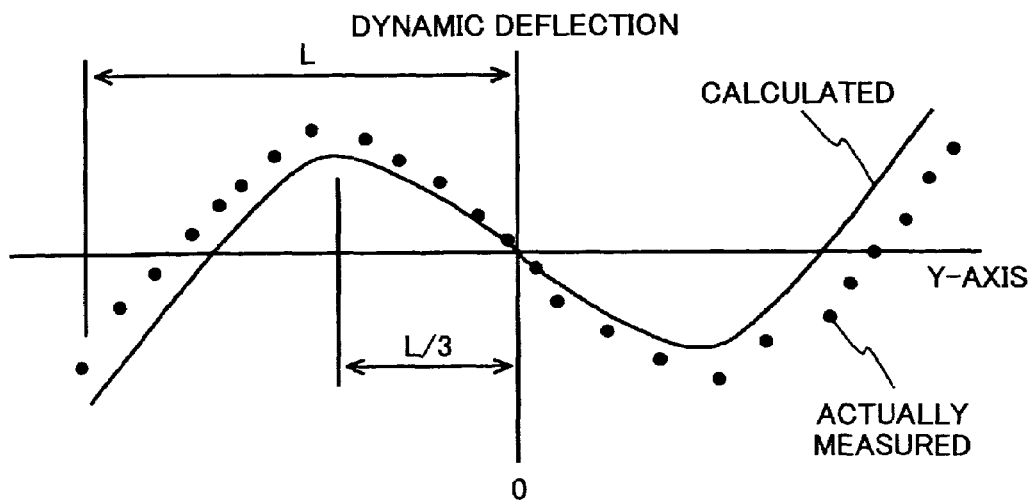
FIG. 4B is a graph of variations in the calculated value (solid line) and the actually measured value (dots) of the dynamic deflection of the conventional mirror substrate in its longitudinal directions.

FIG. 4B shows that the deformation of the mirror substrate 3 peaks at the ±L/3 positions. This shows that the mirror substrate 3 deforms most at a part where the bending moment is maximized. Accordingly, in a deflector mirror according to the present invention, the flexural rigidity of a region of a mirror substrate which region includes a position where the bending moment acting on the mirror substrate at the time of its vibration is maximized is set to be maximized.

Letting a maximum bending moment and the flexural rigidity of its region be Mmax and EI, respectively, dynamic deflection δ is given by the following expression:

$$\delta \propto Mmax/EI, \quad (1)$$

where E is Young's modulus and I is the geometrical moment of inertia.

In the area from the torsion beams to an end part of the mirror substrate, the maximum flexural rigidity is assigned to a region in which the maximum bending moment applies. Accordingly, the dynamic deflection can be reduced according to the expression (1).

Figure 1:
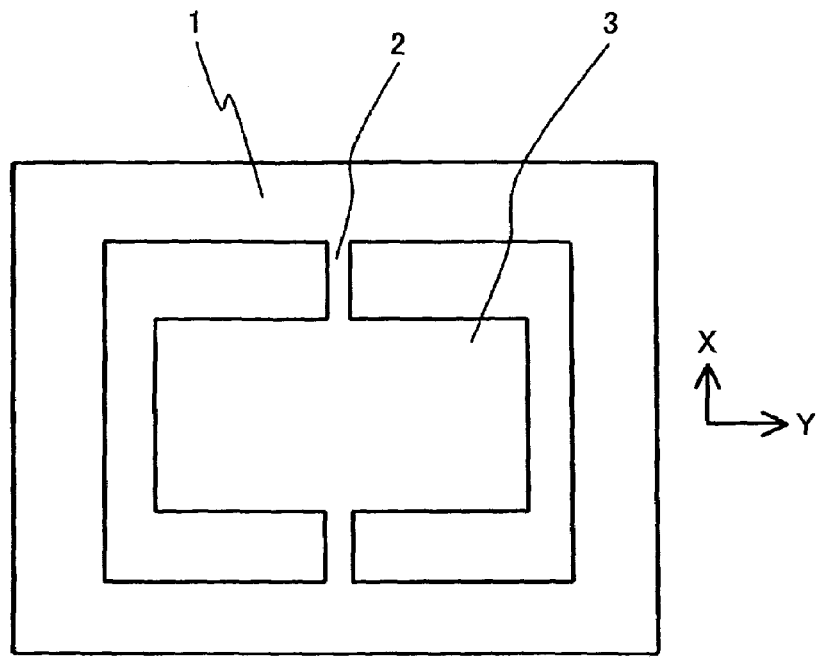
FIG. 1 is a schematic diagram of a conventional deflector mirror.
Figure 2:
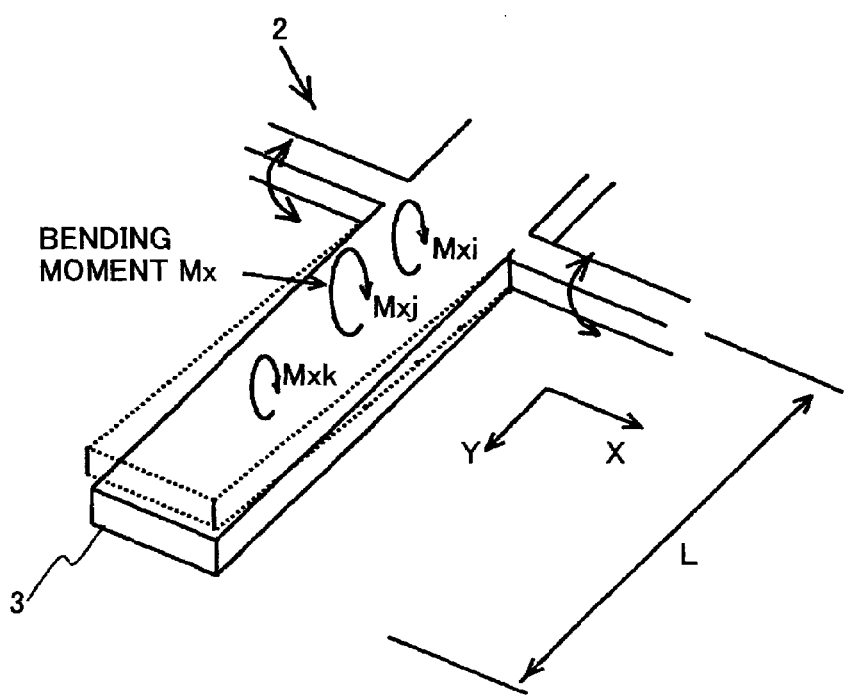
FIG. 2 is a schematic diagram of the bending moment acting on each point of a conventional mirror substrate.
Figure 3:
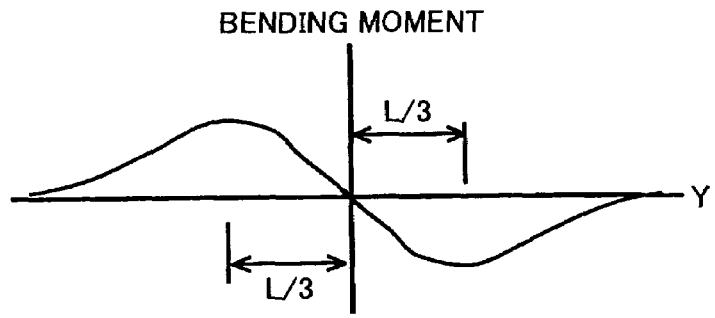
FIG. 3 is a graph of the results of calculating the bending moment.
Figure 5:
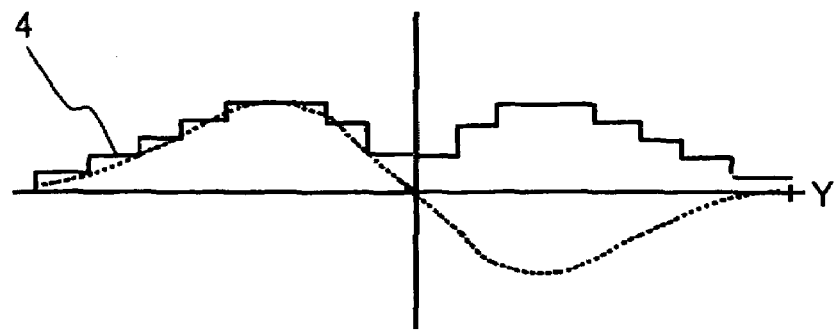
FIG. 5 is a graph of the relationship between the bending moment and the flexural rigidity according to the present invention.

FIG. 5 is a graph of the relationship between the bending moment and the flexural rigidity according to the present invention. The bending moment obtained as illustrated in FIG. 3 is equally divided in a Y-axial direction, and the bending moment is obtained in each divided region. Based on the obtained step-like bending moment, the flexural rigidity is assigned to each corresponding region of the mirror substrate 3. The assigned flexural rigidity shows a flexural rigidity distribution 4 illustrated in FIG. 5.

Figure 6:
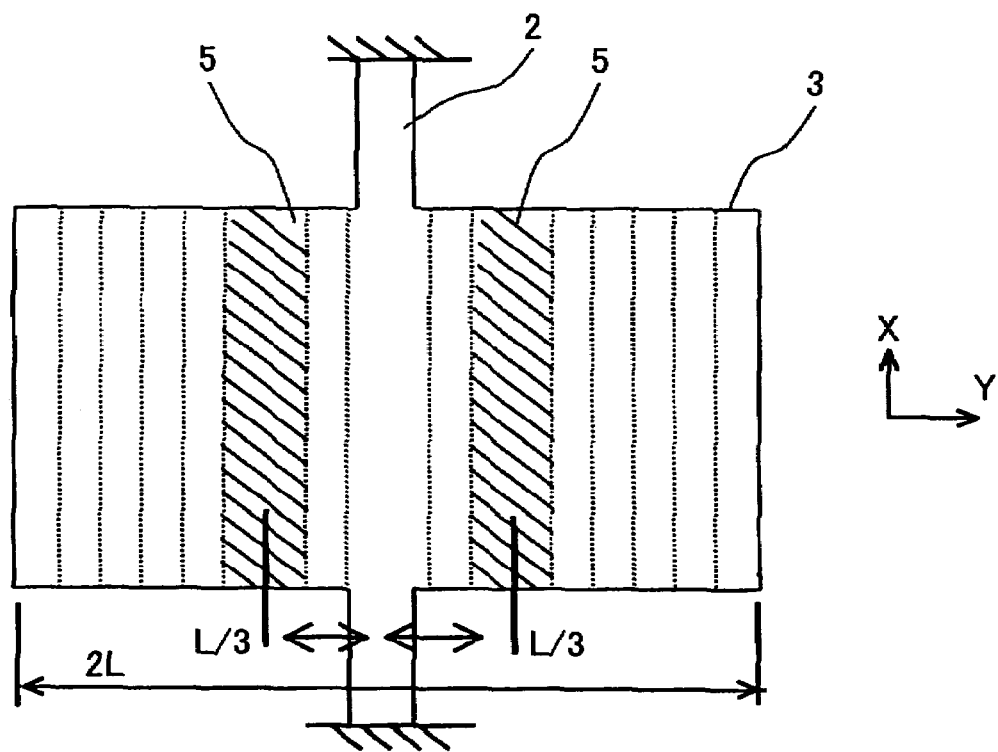
FIG. 6 is a diagram illustrating the principles of the present invention.

FIG. 6 is a diagram illustrating the principles of the present invention. The flexural rigidity is set to be maximized at an approximately intermediate position between the rotary shaft 2 and each end of the mirror substrate 3.

That is, according to the present invention, the flexural rigidity is provided in the mirror substrate 3 so that the flexural rigidity of each of regions 5 including the corresponding ±L/3 position, where the bending moment is maximized, is maximized. In other words, the flexural rigidity is provided so as to have the flexural rigidity distribution 4 illustrated in FIG. 5.

First Embodiment

Figure 7:
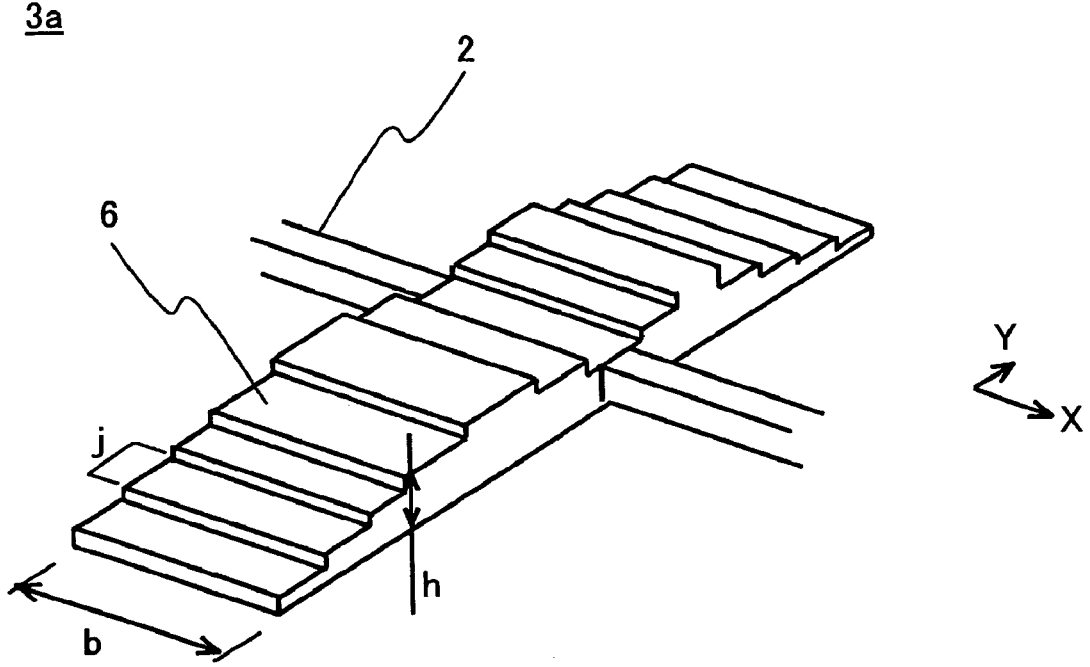
FIG. 7 is a diagram illustrating a mirror substrate according to a first embodiment of the present invention.

FIG. 7 is a diagram illustrating a mirror substrate 3$a$ according to a first embodiment of the present invention. According to the first embodiment, step-like multiple regions 6 are provided on the bottom side of the mirror substrate 3 so that the flexural rigidity distribution 4 illustrated in FIG. 5 is realized. That is, an optimum flexural rigidity distribution for reducing dynamic deflection can be set by varying the thickness of the mirror substrate 3$a$. The step-like multiple regions 6 are formed of a silicon member.

Letting the geometrical moment of inertia in each region j of the mirror substrate 3$a$ of FIG. 7 be Ixxj, the geometrical moment of inertia in each region j is given by the following equation:

$$Ixxj = bh^3/12, \quad (2)$$

where b is the width of the region j of the mirror substrate 3$a$, and h is the thickness of the region j of the mirror substrate 3$a$.

Letting the bending moment in each of the step-like regions j obtained in FIG. 5 be Mxj, the dynamic deflection δ of the mirror substrate 3$a$ in each region j is given by the following equation:

$$\delta = k \cdot Mxj/Ixxj, \quad (3)$$

where k is a constant of proportionality.

In the first embodiment, the geometrical moment of inertia Ixxj in each region j is set so as to approximately equalize the dynamic deflection among the regions j of the mirror substrate 3$a$. That is, the geometrical moment of inertia Ixxj in each region j is set so that the ratio of the geometrical moment of inertia Ixxj to the bending moment Mxj that is exerted at the time of the vibration of the mirror substrate 3$a$ is substantially constant for all regions j.

Second Embodiment

Figure 8A:
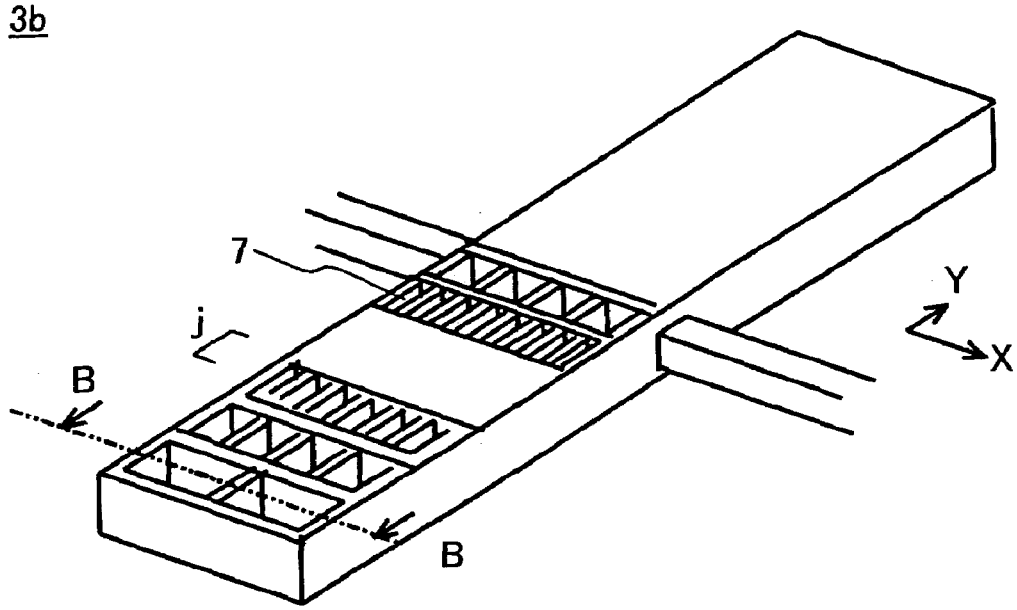
FIGS. 8A and 8B are diagrams illustrating a mirror substrate according to a second embodiment of the present invention.
Figure 8B:
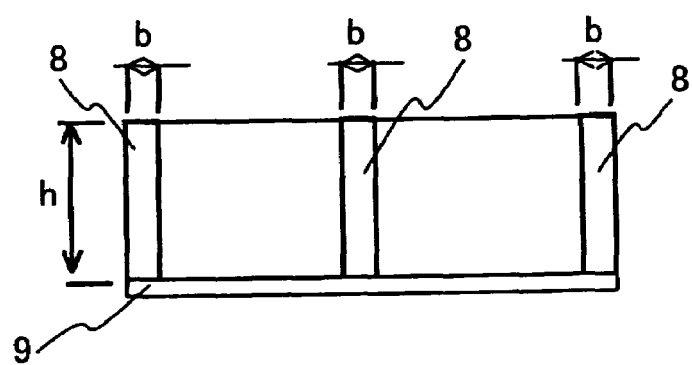

FIG. 8A is a diagram illustrating a mirror substrate 3$b$ according to a second embodiment of the present invention. In the second embodiment, multiple recesses 7 are formed on the bottom side of the mirror substrate 3. The multiple recesses 7 are formed of a silicon member. FIG. 8B is a cross-sectional view of the mirror-substrate 3$b$ of FIG. 8A taken along the line B-B. The multiple recesses 7 are formed of multiple ribs 8 and a bottom plate part 9. In the second embodiment, the size of the recess 7 differs between the regions j so as to realize the flexural rigidity distribution 4 illustrated in FIG. 5. That is, an optimum flexural rigidity distribution for reducing dynamic deflection can be set by causing the size of the recess 7 to differ between the regions j.

It is assumed that the geometrical moment of inertia in each region j is Ixxj. The geometrical moment of inertia Ixxj is obtained by dividing the cross section B-B of each region j of the mirror substrate $3b$ into the rectangular ribs 8. The bottom plate part 9 is set to an extremely small value, or set to be extremely thin, so that the geometrical moment of inertia thereof is neglected. The geometrical moment of inertia Ixxj is given by the following equation:

$$Ixxj = \Sigma bh^3/12. \tag{4}$$

The above-described Eq. (4) shows that the numerical value of the geometrical moment of inertia Ixxj can be controlled by controlling the number of ribs 8.

Letting the bending moment in each region j of FIG. 8 be Mxj, the dynamic deflection $\delta$ of the mirror substrate $3b$ is given by the following equation:

$$\delta = k\Sigma Mxj/Ixxj. \tag{5}$$

The geometrical moment of inertia Ixxj in each region j is set so as to approximately equalize the dynamic deflection among the regions j of the mirror substrate $3b$. Thus, according to this embodiment, Mxj/Ixxj is substantially constant in the regions j, so that the entire deflection $\delta$ increases substantially linearly. As a result, the dynamic deflection can be reduced.

In order to observe the effects of the rigidity distribution of the mirror substrate $3b$ of the second embodiment, the dynamic deflection of a mirror substrate including recesses based on the rigidity distribution and the dynamic deflection of a mirror substrate shaped like a rectangular parallelepiped are compared. The results obtained by a simulation are shown on the basis of the values of the rectangular parallelepiped mirror substrate. Letting the dynamic deflection and the moment of inertia of the rectangular parallelepiped mirror substrate be 1 and 1, respectively, the dynamic deflection and the moment of inertia of the mirror substrate including recesses according to the present invention are 0.7 and 0.7, respectively. Thus, both dynamic deflection and moment of inertia are reduced.

Third Embodiment

Figure 9:
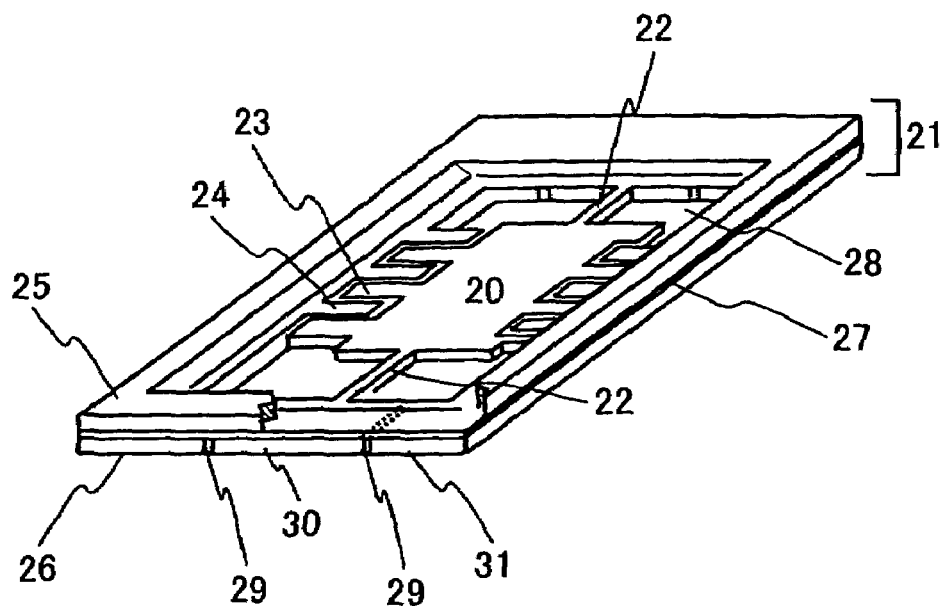
FIG. 9 is a diagram illustrating a first deflector mirror according to a third embodiment of the present invention.

FIG. 9 is a diagram illustrating a first deflector mirror according to a third embodiment of the present invention. The deflector mirror of FIG. 9 includes a mirror substrate 20 and a substrate 21. Flexural rigidity is set for each point of the mirror substrate 20 by the method illustrated in the first or second embodiment. An external force exerted on the mirror substrate 20 is caused by an electrostatic force exerted between comb-teeth-like movable electrodes 23 formed on the free ends of the mirror substrate 20 and comb-teeth-like fixed electrodes 24 formed on the inner sides of the substrate 21 corresponding to the free ends of the mirror substrate 20. The substrate 21 includes a first Si member 25 and a second Si member 26 joined through a silicon oxide film (an insulating film) 27. An opening 28 is formed in the first Si member 25 by anisotropic etching. The mirror substrate 20 and a torsion rotary shaft 22 are formed in the second Si member 26 by a semiconductor process technology such as photoetching. The second Si member 26 is divided into a movable part 30 including the movable electrodes 23 and a fixed part 31 including the fixed electrodes 24 by four separating grooves 29.

A mirror part and the torsion rotary shaft 22 are formed on the mirror substrate 20 by etching. The comb-teeth-like movable electrodes 23 are provided to both longitudinal sides of the mirror part. The comb-teeth-like fixed electrodes 24 are provided to the fixed part 31 of the substrate 21 so as to be positioned alternately with the movable electrodes 23 provided on the mirror substrate 20. The space between the movable electrodes 23 and the fixed electrodes 24 works electrically as a capacitor. At a driving time, a large part of power is consumed only by charging and discharging the capacitor. Accordingly, power consumption is extremely small.

Figure 10:
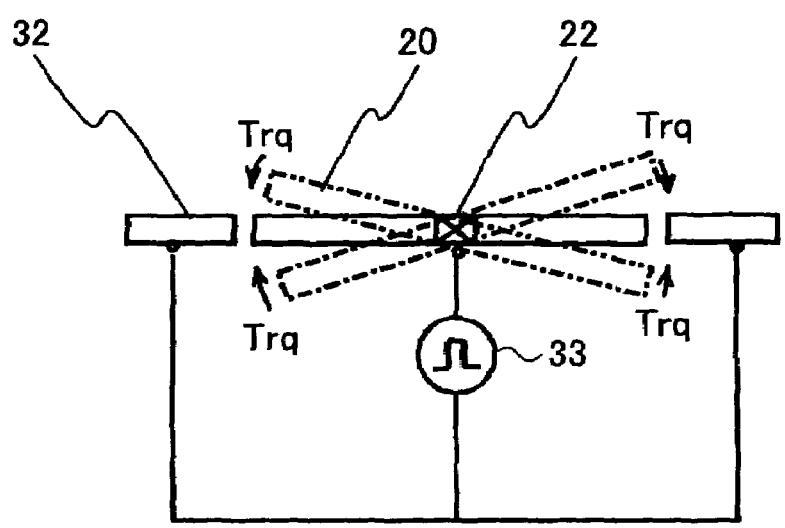
FIG. 10 is a diagram illustrating an operation of the first deflector mirror according to the third embodiment of the present invention.
Figure 11:
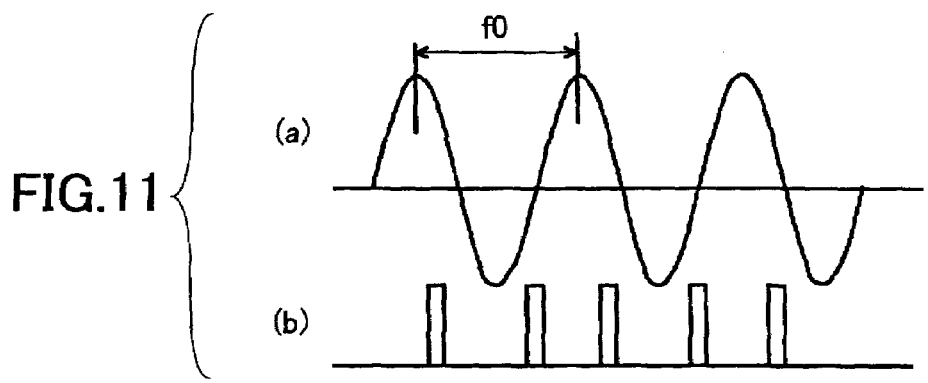
FIG. 11 illustrates a mirror vibration waveform and driving pulses according to the third embodiment of the present invention.

FIG. 10 is a schematic diagram for illustrating the operation of the deflector mirror of FIG. 9. As described above, in FIG. 10, flexural rigidity is set to each point of the mirror substrate 20 by the method illustrated in the first or second embodiment. An external force generator 32 exerts an external force Trq on the mirror substrate 20 by a drive pulse generated by a drive pulse generator 33. The external force Trq acts so as to attract the mirror substrate 20 toward the external force generator 32. The external force Trq causes the mirror substrate 20 to rotationally swing on the torsion rotary shaft 22. In FIG. 11, (a) illustrates a mirror vibration waveform (sine wave vibration), and (b) illustrates drive pulses.

Fourth Embodiment

Figure 12:
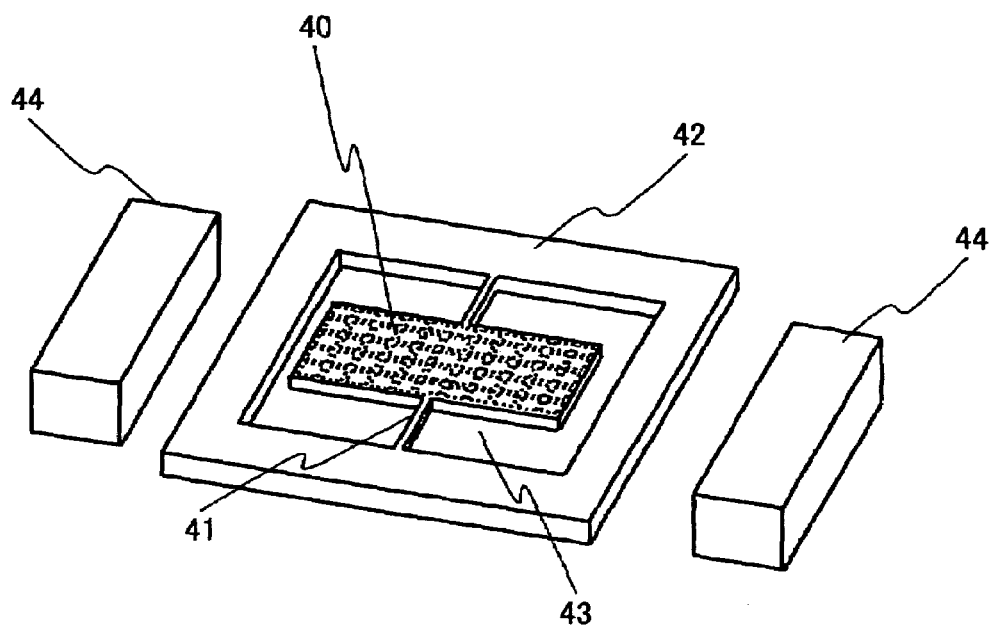
FIG. 12 is a diagram illustrating a second deflector mirror (bottom surface) according to a fourth embodiment of the present invention.
Figure 13:
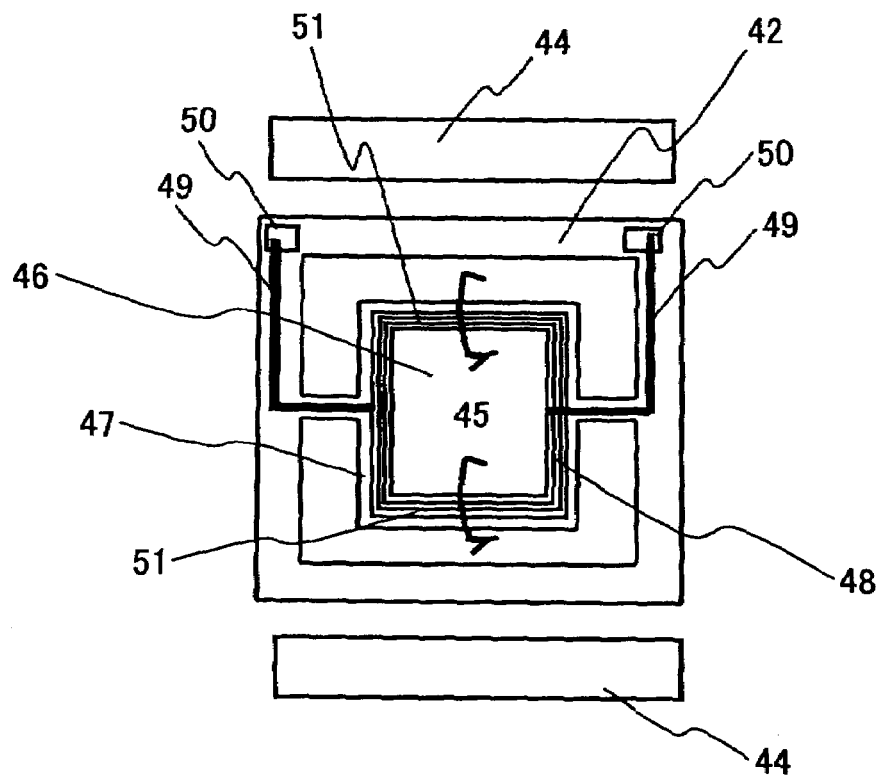
FIG. 13 is a diagram illustrating the second deflector mirror (top surface) according to the fourth embodiment of the present invention.

FIGS. 12 and 13 illustrate a second deflector mirror according to a fourth embodiment of the present invention. FIG. 12 illustrates a bottom surface 43 of the deflector mirror, and FIG. 13 illustrates a top surface 46 of the deflector mirror. The deflector mirror of FIGS. 12 and 13 includes a mirror substrate 40 and a silicon substrate 42. Flexural rigidity is set for each point of the mirror substrate 40 by the method illustrated in the first or second embodiment. The external force generator of the deflector mirror is based on an electromagnetic force. Beams 41 are formed so as to support the mirror substrate 40 so that the mirror substrate 40 is swingable with respect to the silicon substrate 42. Flexural rigidity is set for each point on the bottom surface 43 of the mirror substrate 40 by the method illustrated in the first or second embodiment. In this case, a recessed surface as illustrated in the second embodiment is formed. On the other (top) surface 46 of the mirror substrate 40, a mirror 45 is formed in the center, and a driving coil 48 of, for instance, a thin copper film, which generates a magnetic field by being energized, is formed in a peripheral part 47 of the mirror substrate 40 so as to surround the mirror 45. Both end parts 49 of the driving coil 48 are connected to corresponding electrode terminals 50 provided on the fixed part of the silicon substrate 42. Further, a pair of permanent magnets 44 generating a static magnetic field are disposed so that the static magnetic field is exerted on coil parts 51 on the opposite sides of the mirror substrate 40 parallel to the axial directions of the beams 41.

Figure 14:
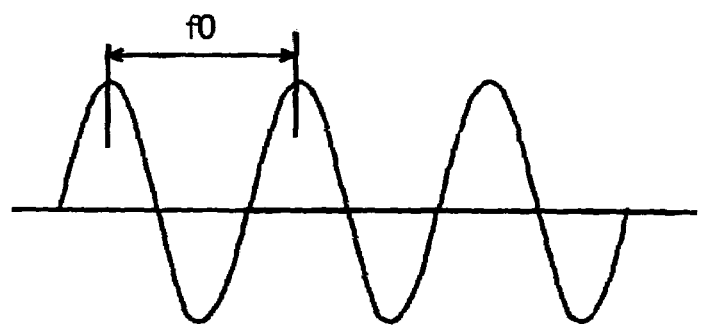
FIG. 14 is a graph of a sine wave signal applied to a driving coil of the second deflector mirror according to the fourth embodiment of the present invention.

A sine wave signal illustrated in FIG. 14 is applied to the driving coil 48. As a result, electromagnetic torque Trq is exerted. This torque Trq causes the mirror substrate 40 to receive a force in a rotational direction so as to vibrate. The resonant frequency f0 and the amplitude by vibration (deflection angle) θ of the mirror 45 at this time are given by the following equations:

$$f0 = (1/2\pi)\sqrt{(K\theta/I)}, \tag{6}$$

$$\theta = Trq/I * K(f0, C), \tag{7}$$

where Kθ is a torsion spring constant, Trq is electromagnetic torque exerted on a coil, I is the moment of inertia of a mirror, and C is a viscosity resistance coefficient. K(f0, C) is a function of the resonant frequency f0 and the viscosity resistance coefficient C, and is inversely proportional to f0 and C. The torque Trq generated by a magnetic force is relatively high, so that a large deflection angle can be obtained from Eq. (7).

Fifth Embodiment

Figure 15:
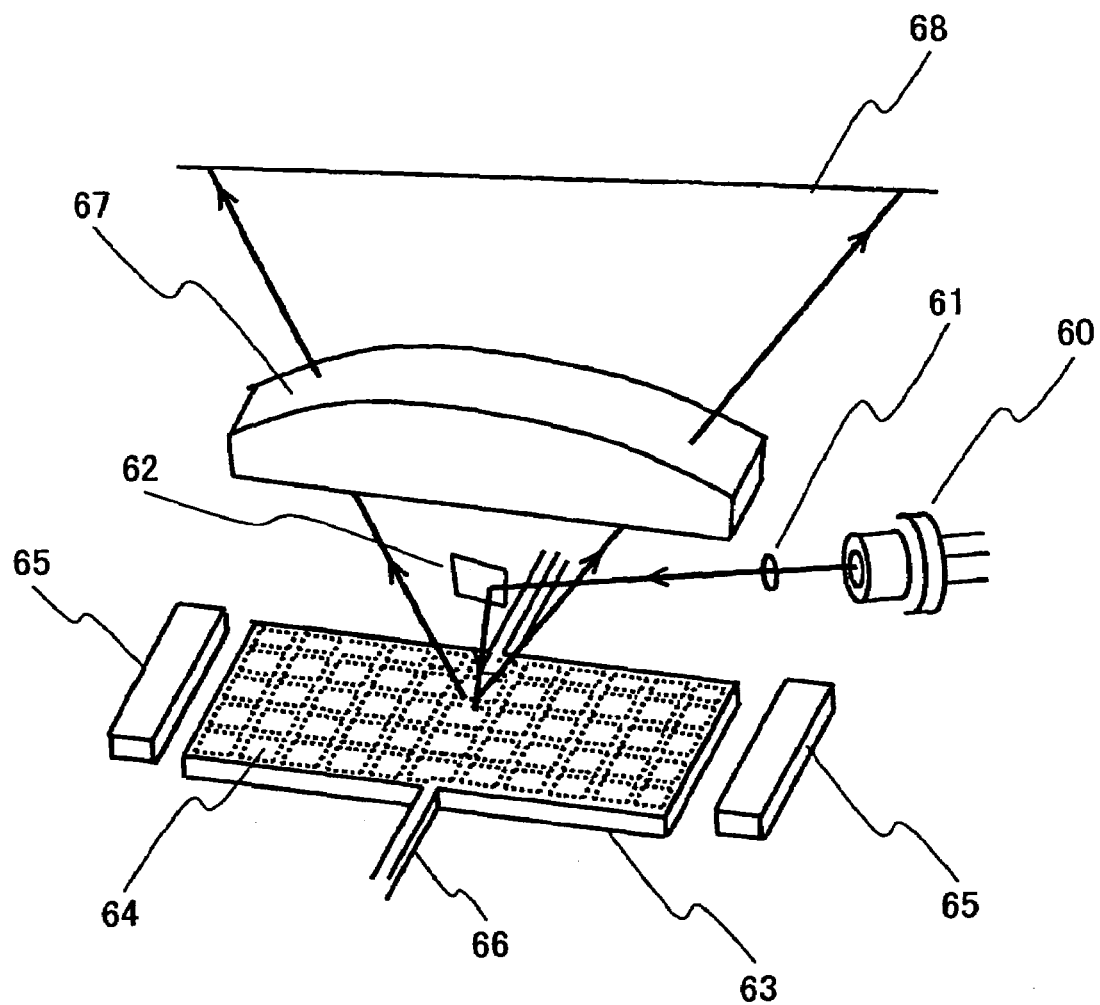
FIG. 15 is a schematic diagram of an optical scanning device according to a fifth embodiment of the present invention.

FIG. 15 is a schematic diagram of an optical scanning device according to a fifth embodiment of the present invention. According to this optical scanning device, a light beam emitted from a light source 60, which is, for instance, a semiconductor laser light source, is shaped into substantially parallel light by a collimator lens 61. The light beam is reflected by a folding mirror 62 so as to be incident on a mirror surface 64 of a mirror substrate 63. An external force by an external force generator 65 is exerted on the mirror substrate 63. As a result, the mirror substrate 63 vibrates in a reciprocating manner with beams 66 serving as a torsion rotary shaft. The light beam entering this swinging mirror substrate 63 is deflected by the mirror surface 64 so as to enter a correction optical system 67 such as an fθ lens. The light beam emitted from the correction optical system 67 is focused into a spot on a scanned surface (a surface to be scanned) 68. The mirror substrate 63 has a feature as described in the first or second embodiment. In this embodiment, a recessed surface as illustrated in the second embodiment is formed on the mirror substrate 63. Since the mirror substrate 63 is configured to reduce dynamic deflection by the method of the first or second embodiment, it is possible to improve the optical characteristics of the optical scanning device of this embodiment, such as the beam diameter of a light beam focused on the scanned surface 68.

Sixth Embodiment

Figure 16A:
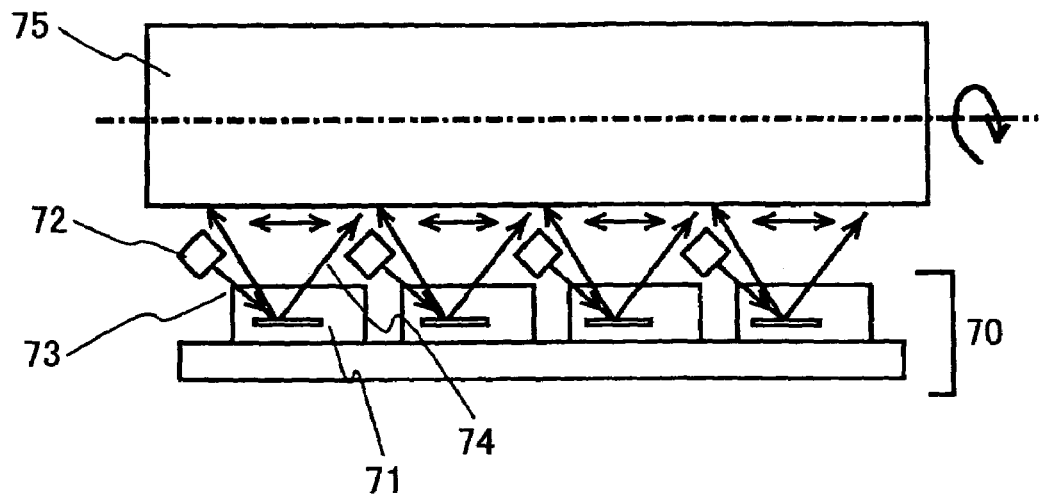
FIG. 16 is a schematic diagram of an image forming apparatus according to a sixth embodiment of the present invention.
Figure 16B:
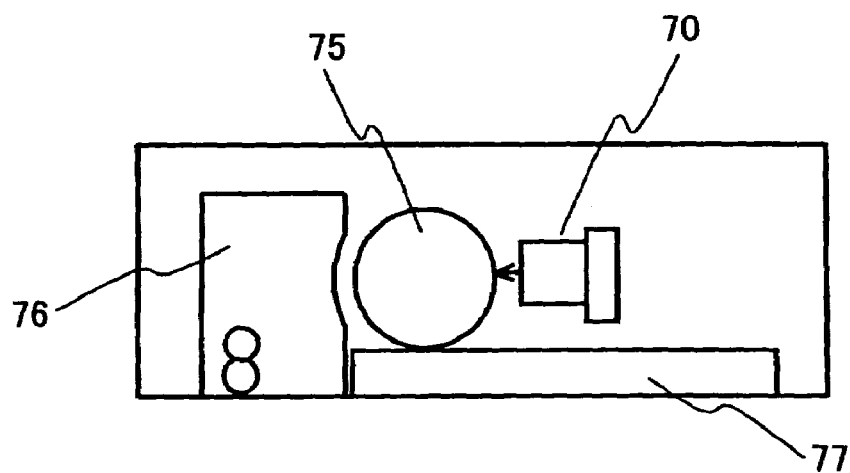

FIGS. 16A and 16B are schematic diagrams of an image forming apparatus according to a sixth embodiment of the present invention. FIG. 16A illustrates a configuration in the main scanning direction, and FIG. 16B is a side view of the configuration of FIG. 16A. The image forming apparatus includes an optical writer 70 including multiple optical scanning devices 71 disposed in the main scanning direction. The optical scanning devices 71 perform writing with respect to writing width. Each of semiconductor lasers 72 emits light based on an image signal generated by an image signal generator (not graphically illustrated). Laser light 73 emitted from each semiconductor laser 72 enters the corresponding optical scanning device 71. Reflected laser light 74 deflected by a mirror of the optical scanning device 71 forms an electrostatic latent image on a photosensitive body 75. Using a development and fixation unit 76 and a transfer unit (not graphically represented), the electrostatic latent image formed on the photosensitive body 75 is developed into a toner image, and the toner image is transferred onto recording paper fed by a recording medium conveyor 77, and fixed thereon.

The optical writer has the multiple optical scanning devices 71 disposed in the main scanning direction. In general, a polygon scanner is employed as an optical scanning device in laser printers. The optical writer including the multiple optical scanning devices 71 according to the present invention is extremely reduced in the number of components compared with the polygon scanner. Accordingly, cost reduction can be expected.

A description is given below of embodiments of the present invention in relation to features according to the present invention.

[Description of Feature (a)]

In a deflector mirror according to the present invention, a mirror substrate and the unsupported end of each torsion beam (torsion spring) may be joined through a pair of joining members of the same length. First ends of each set of paired joining members are joined to a side of the mirror substrate at specific positions symmetric with respect to the rotation center axis of the mirror substrate. Second ends of each set of paired joining members are joined to the unsupported end of the corresponding torsion beam. As a result, each set of paired joining members and the corresponding side of the mirror substrate form, as a whole, a substantially isosceles triangle-like structure with the unsupported end of the corresponding torsion beam being an apex. As a result of providing such joining members between the mirror substrate and the unsupported ends of the torsion beams, the peak position of the dynamic deflection of the mirror substrate shifts to the outside compared with the case of directly connecting the mirror substrate and the unsupported ends of the torsion beams. As a result, a region of small dynamic deflection expands in the mirror substrate, and in the region, the dynamic deflection is reduced particularly in the vicinity of the rotation center axis of the mirror substrate.

A more detailed description is given, with reference to FIGS. 17 through 21, of such a characteristic configuration of the deflector mirror according to the present invention.

Figure 17:
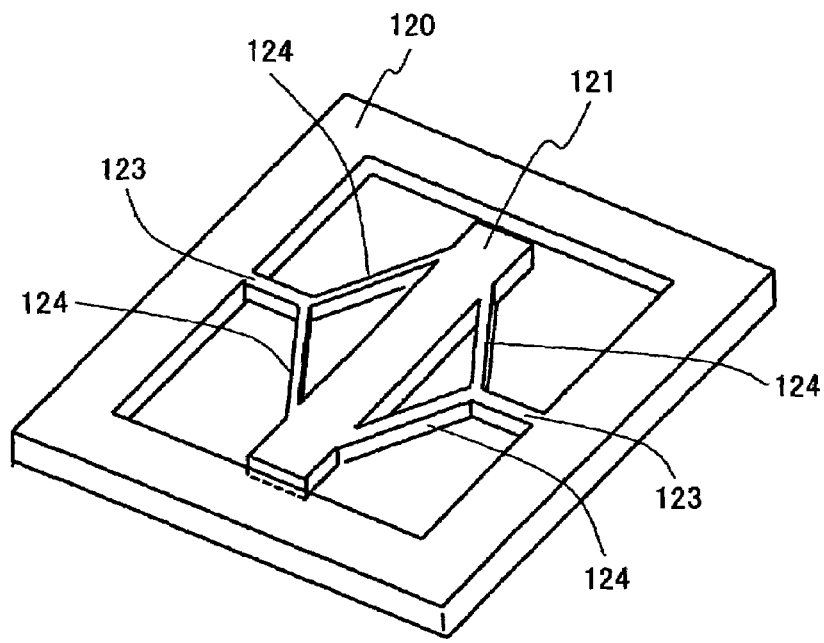
FIG. 17 is a diagram for illustrating a characteristic configuration of a deflector mirror according to the present invention.
Figure 18:
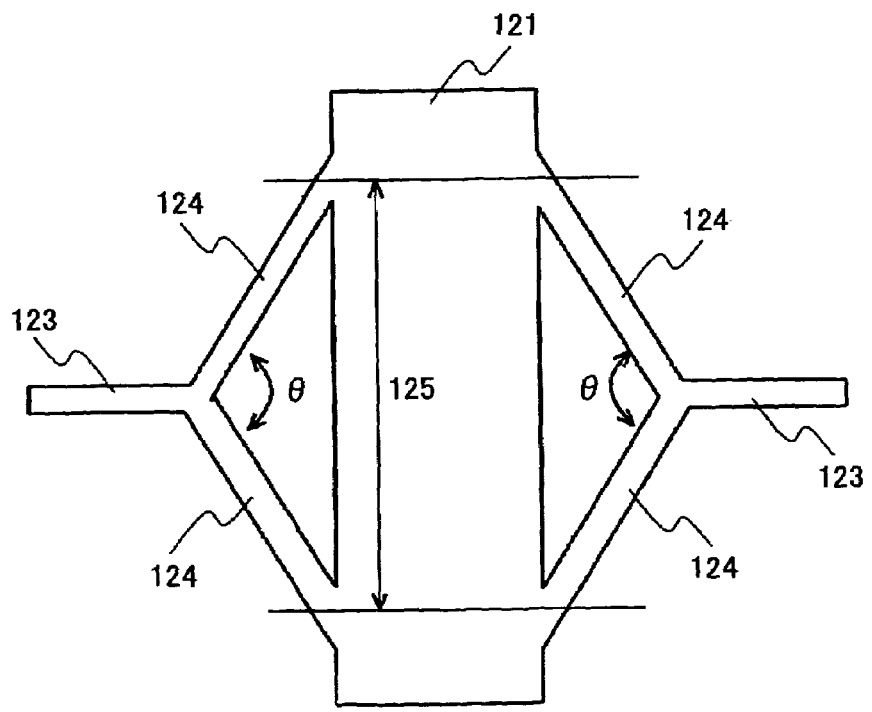
FIG. 18 is an enlarged view of part of the deflector mirror of FIG. 17 according to the present invention.

FIG. 17 is a perspective view of the deflector mirror according to the present invention for illustrating a characteristic configuration thereof. FIG. 18 is an enlarged view of part of the deflector mirror of FIG. 17. Referring to FIG. 17, the deflector mirror includes a frame 120, a mirror substrate 121, torsion beams 123 each having an end thereof supported by the frame 120, and joining members 124 connecting the unsupported ends of the corresponding torsion beams to the mirror substrate 121.

As illustrated in FIG. 18, each pair of the joining members 124, joining the unsupported end of the corresponding torsion beam 123 and the mirror substrate 121, and a side of the mirror substrate 121 to which the paired joining members 124 are joined form a substantially isosceles triangle-like structure with the unsupported end of the corresponding torsion beam being an apex. The substantially isosceles triangle-like configuration includes an equilateral triangle-like configuration.

Figure 19:
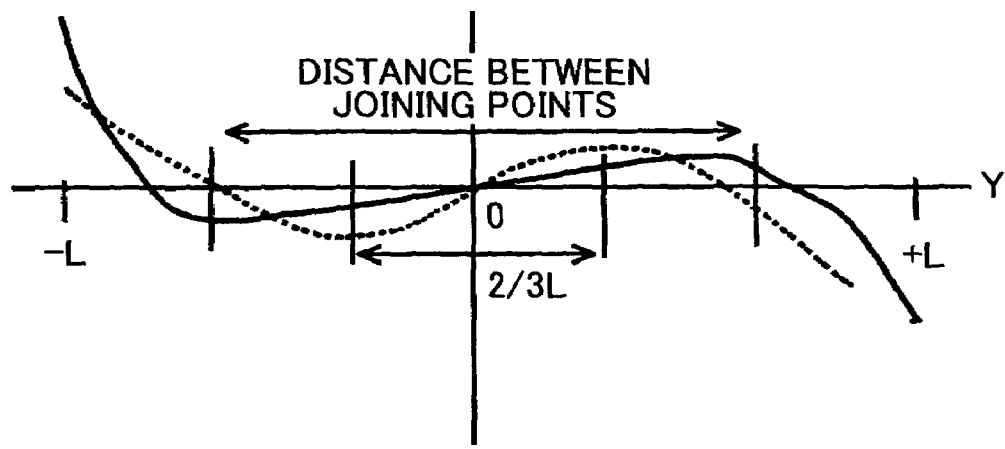
FIG. 19 is a graph of the effect of controlling the dynamic deflection deformation of a mirror substrate according to the present invention.
Figure 20:
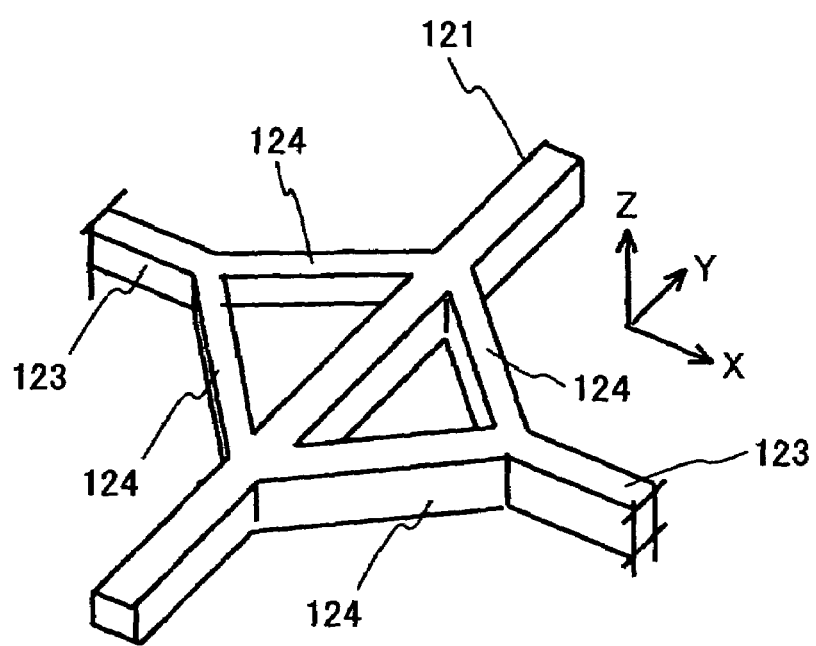
FIG. 20 is a perspective view of a three-dimensional beam model for calculating the bending moment exerted on the mirror substrate according to the present invention.

Letting the length of the mirror substrate 121 be 2L in such a deflector mirror, dynamic deflection occurs as indicated by the solid line in FIG. 19 when the mirror substrate 121 vibrates in a reciprocating manner. In FIG. 19, the broken line indicates dynamic deflection in the case of causing the mirror substrate 121 to vibrate in a reciprocating manner when the unsupported end of each torsion beam 23 is directly joined to the mirror substrate 121. This is as described above with reference to FIGS. 4A and 4B.

A comparison between the solid line and the broken line clearly shows that in the deflector mirror according to the present invention, a region of small dynamic deflection expands and in the region, the dynamic deflection is reduced particularly in the vicinity of the rotation center axis of the mirror substrate 121.

As is seen easily from FIG. 19, the peak position of the dynamic deflection of the mirror substrate 121 is related to a distance 125 (FIG. 18) between the joining points of the paired joining members 124 and the mirror substrate 121. When the inter-joining point distance 125 is set to be greater than 2L/3, that is, when the distance between the rotation center axis of the mirror substrate 121 and the joining point (position) of each of the paired joining members 124 is set to be greater than L/3, a remarkable effect can be produced in controlling dynamic deflection deformation. However, this is the case of a 2L-long rectangular mirror substrate having uniform thickness. More generally, dynamic deflection deformation can be controlled with efficiency by selecting a position more remote from the rotation center axis of the mirror substrate 121 than the peak position of the dynamic deflection thereof in the case of causing the mirror substrate 121 to vibrate with the mirror substrate 121 being directly joined to the unsupported end of each torsion beam 123 as the joining position of each joining member 124 to the mirror substrate 121.

A supplemental description is given of the above-described mechanism of dynamic deflection deformation control. The dynamic deflection deformation is attributable mainly to the bending moment acting on the mirror substrate 121. When the bending moment is calculated by the finite element method using a three-dimensional beam model illustrated in FIG. 20, the results illustrated in FIG. 21 are obtained.

Figure 21:
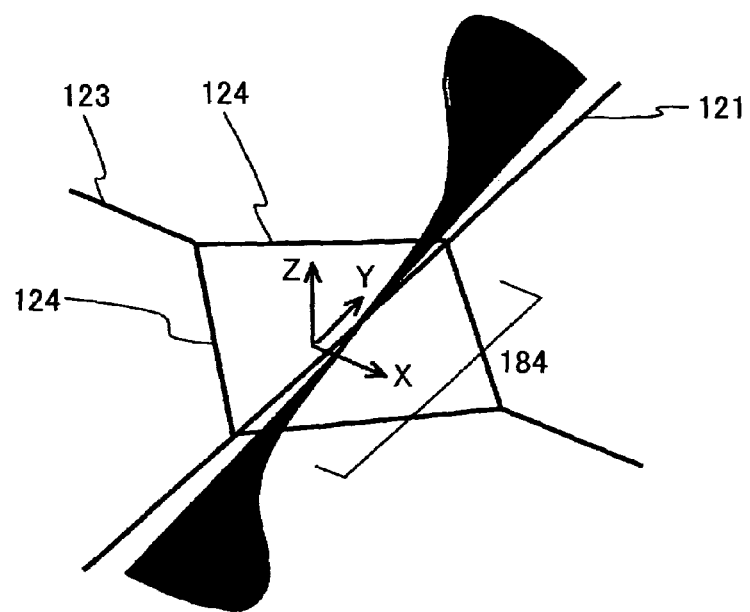
FIG. 21 is a diagram illustrating the results of calculation of the bending moment exerted on the mirror substrate according to the present invention.

As illustrated in FIG. 21, the bending moment acting on the mirror substrate 121 is smaller in a region 184 between the joining points of each paired joining members 124, and increases outside the region 84. As a result of such a bending moment distribution, a region of small dynamic deflection expands, and in the region, the dynamic deflection is reduced particularly in the vicinity of the rotation center axis of the mirror substrate 121 as described with reference to FIG. 19.

In order to achieve the above-described dynamic deflection control effect, it is necessary to take the rigidity of the joining members 124 into consideration. In general, higher rigidity produces a more remarkable dynamic deflection control effect. Accordingly, it is necessary to select the material and the dimensions of the joining members 124 so that a required rigidity is obtained. For instance, in the case of a deflector mirror having a mirror substrate, torsion beams, joining members, and a frame integrally formed in a silicon substrate, if each torsion beam is 20-40 µm in width and 1-2 µm in length with the distance between the unsupported end of the torsion beam and the mirror substrate being 1-1.5 µm, the width of each joining member can be set to 60-80 µm. However, this is a mere example, and the dimensions of the joining members, such as width, are determined taking the dimensions of other members into consideration as well.

[Description of Feature (b)]

The deflector mirror according to the present invention may include multiple recesses on the bottom side of the mirror substrate so that the flexural rigidity of the mirror substrate decreases in proportion to the distance from the rotation center axis of the mirror substrate.

Figure 22:
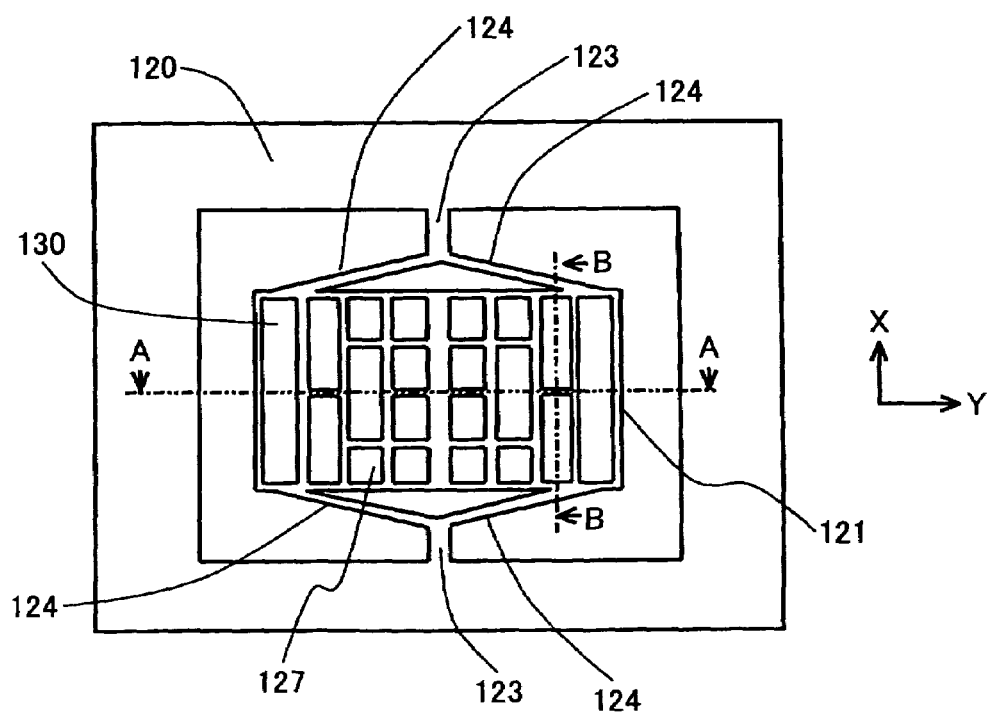
FIG. 22 is a diagram for illustrating recesses formed on the mirror substrate according to the present invention.
Figure 23:
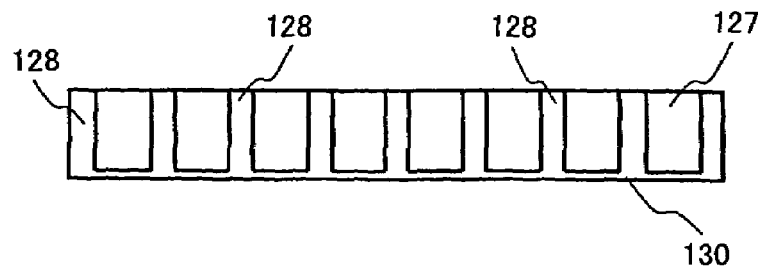
FIG. 23 is a longitudinal cross-sectional view of the mirror substrate of FIG. 22 taken along the line A-A according to the present invention.
Figure 24:
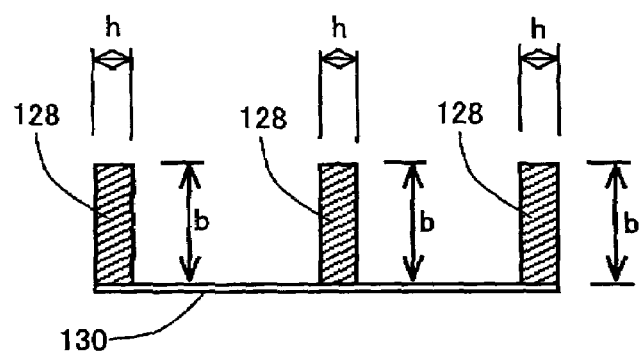
FIG. 24 is a cross-sectional view of the mirror substrate of FIG. 22 taken along the line B-B according to the present invention.

A description is given in more detail with reference to FIGS. 22 through 25. FIG. 22 is a plan view of the deflector mirror, taken from the bottom surface side of the mirror substrate 121. FIG. 23 is a longitudinal cross-sectional view of the mirror substrate 121 of FIG. 22 taken along the line A-A. FIG. 24 is a cross-sectional view of the mirror substrate 121 of FIG. 22 taken along the line B-B. In this example, multiple ribs 128 are provided in a standing condition on the bottom side of a thin mirror surface part 130 of the mirror substrate 121 so that multiple recesses 127 partitioned by the ribs 128 are formed on the bottom surface of the mirror substrate 121. Each rib 128 has a width h and a height b, which is sufficiently greater than the thickness of the mirror surface part 130. In a portion of the mirror substrate 121 from the rotation center axis to a free end thereof, the number and the size of recesses 127, that is, the density of disposition of the ribs 28, differs in each part (region).

The geometrical moment of inertia in each part of the mirror substrate 121 provided with the recesses 127 is obtained. The thickness of the mirror surface part 130 is so small that the geometrical moment of inertia thereof is neglected in the calculation. The geometrical moment of inertia Ij of each part can be obtained as the sum of the values of the geometrical moment of inertia of the ribs 128 as follows:

$$Ij = \Sigma bh^3/12. \qquad (8)$$

The flexural rigidity Mj of the mirror substrate 121 is a value obtained by multiplying the geometrical moment of inertia Ij of each part by Young's modulus E. That is, $$Mj = E*Ij. \qquad (9)$$

Accordingly, the value and the distribution of the flexural rigidity Mj of the mirror substrate 121 can be controlled by adjusting the number of ribs 128 and the distance therebetween.

Figure 25:
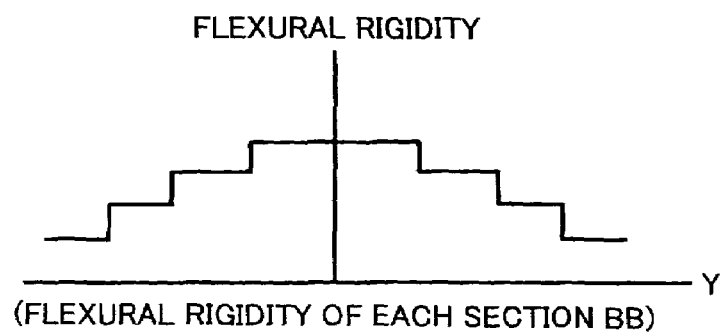
FIG. 25 is a graph of a flexural rigidity distribution of the mirror substrate according to the present invention.

FIG. 25 illustrates a flexural rigidity distribution of the mirror substrate 121 thus obtained. By thus realizing a flexural rigidity distribution such that the flexural rigidity decreases toward each free end of the mirror substrate, it is possible to increase the flexural rigidity of a region of the mirror substrate 121 used for deflection without increasing the moment of inertia of the entire mirror substrate 121, so that it is possible to control dynamic deflection deformation in the region with efficiency.

In the case of controlling the flexural rigidity distribution by forming the above-described recesses 127 on the bottom side of the mirror substrate 121, a difference is generated between the peak position of the dynamic deflection in the case of causing the mirror substrate 121 to vibrate in a reciprocating manner with the unsupported end of each torsion beam 123 being directly joined to the mirror substrate 121 and the peak position of the dynamic deflection in the case of not controlling the flexural rigidity distribution. Accordingly, this peak position difference should be considered in determining the joining positions of the joining members 124 and the mirror substrate 121.

A description is given of specific examples of the above-described deflector mirror according to the present invention.

Seventh Embodiment

Figure 26:
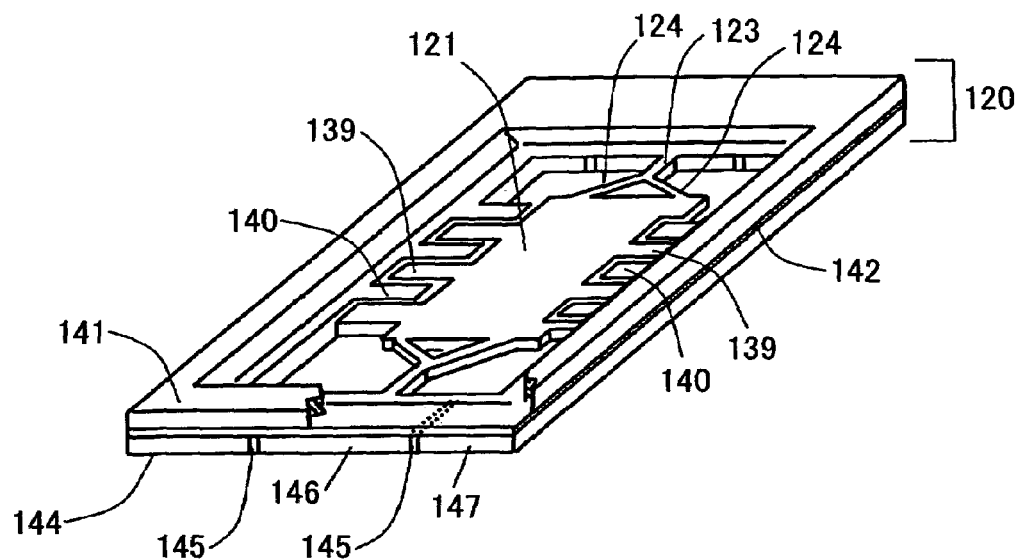
FIG. 26 is a schematic perspective view of a deflector mirror according to a seventh embodiment of the present invention.

FIG. 26 is a schematic perspective view of a deflector mirror according to a seventh embodiment of the present invention. In FIG. 26, the same elements as those described above are referred to by the same numerals. According to the deflector mirror of this embodiment, using an SOI substrate formed by joining two silicon substrates 141 and 144 through an insulating film 42, the mirror substrate 121, the joining members 124, the torsion beams 123, and the frame 120 are integrally formed by a semiconductor process such as photoetching. Each joining member 124 is joined to a corresponding position close to a corresponding free end of the mirror substrate 121. Comb-teeth-like movable electrodes 139 are formed on the free ends of the mirror substrate 121. Comb-teeth-like fixed electrodes 140 are formed on the portions of the frame 120 (on the silicon substrate 144 side) opposing the free ends of the mirror substrate 121 so as to engage the movable electrodes 139 through a minute gap. That is, the deflector mirror according to this embodiment is of an electrostatic driving type that drives the mirror substrate 121 by an electrostatic torque between the movable electrodes 139 and the fixed electrodes 140.

At least, the silicon substrate 144 is a substrate of low resistance. The silicon substrate 144 is separated into a first region having electric continuity with the movable electrodes 139 through the torsion beams 123 and a second region having electric continuity with the fixed electrodes 140 by four slits 145 reaching the insulating film 142, the first and second regions being isolated and separated from each other. Electrode pads for the movable electrodes 139 and the fixed electrodes 140 are formed in the first and second regions, respectively, but are not graphically illustrated. Further, a thin metal film having high reflectance with respect to the wavelength of employed light is formed on a surface of the mirror substrate 121 as a mirror surface, but is not graphically illustrated.

Figure 27:
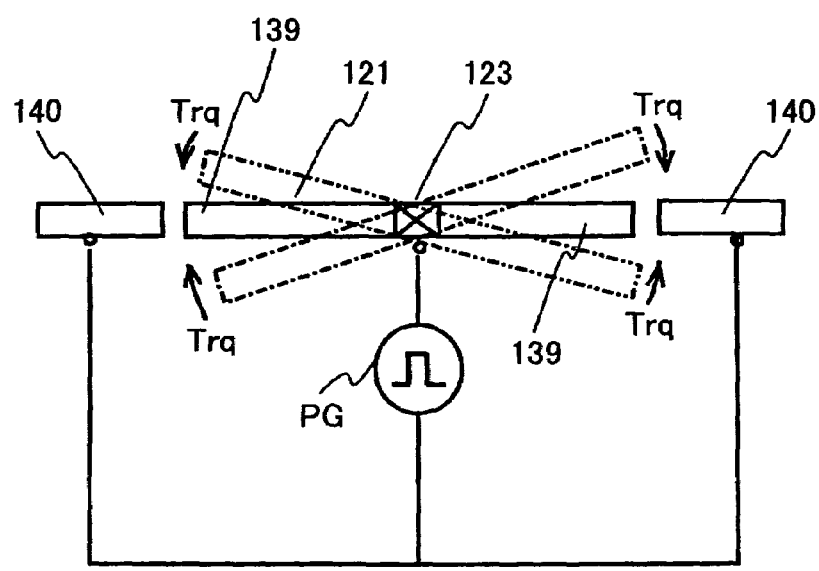
FIG. 27 is a diagram illustrating a method of driving the deflector mirror according to the seventh embodiment of the present invention.
Figure 28:
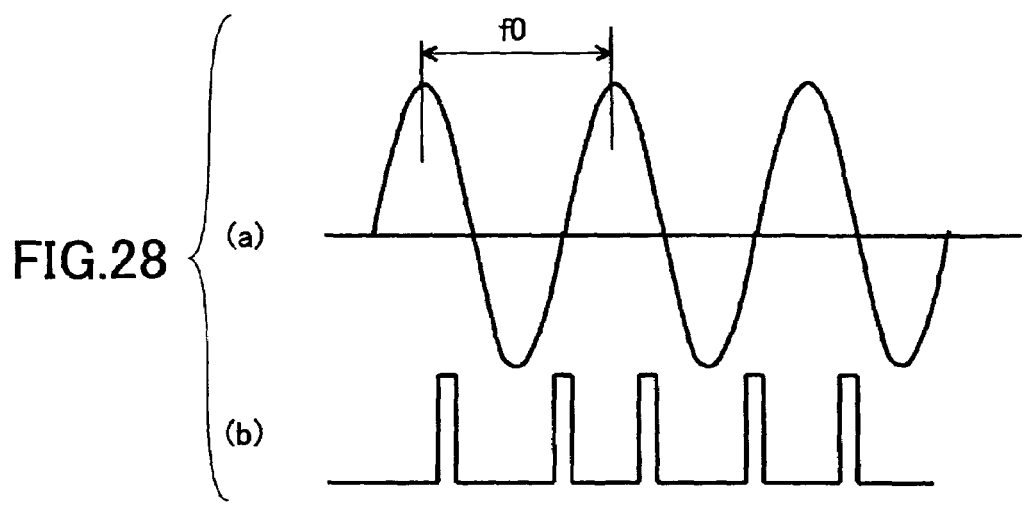
FIG. 28 is a waveform chart of the relationship between the deflection angle of a mirror substrate of the deflector mirror and a drive pulse signal according to the seventh embodiment of the present invention.

In the case of driving the deflector mirror according to this embodiment, for instance, the electrode pads for the movable electrodes 139 are grounded, and a drive pulse generator PG is connected to the electrode pads for the fixed electrodes 140 as illustrated in FIG. 27. Then, a drive pulse signal of a frequency twice the resonant frequency of the vibration system as illustrated in (b) of FIG. 28 is applied from the drive pulse generator PG. As a result, rotational torque is generated in the mirror substrate 121 by the electrostatic attraction between the movable electrodes 139 and the fixed electrodes 140, so that the mirror substrate 121 vibrates in a reciprocating manner at a resonant frequency on the torsion beams 123 as a torsional rotary shaft. The deflection angle of the mirror substrate 121 varies as illustrated in (a) of FIG. 28 in the stabilized state of this reciprocating vibration.

It is possible to form the same deflector mirror as that of this embodiment using a single silicon substrate as in a below described embodiment (11$^{th}$ embodiment).

Although not graphically illustrated, in the same configuration as the deflector mirror of this embodiment, the mirror substrate 121 may be provided with a flexural rigidity distribution as illustrated in FIG. 25 by forming multiple recesses as described with reference to FIGS. 22 through 25 on the bottom surface (a surface on the opposite side from the mirror surface) of the mirror substrate 121. Such a deflector mirror is also included in the present invention.

Eighth Embodiment

Figure 29:
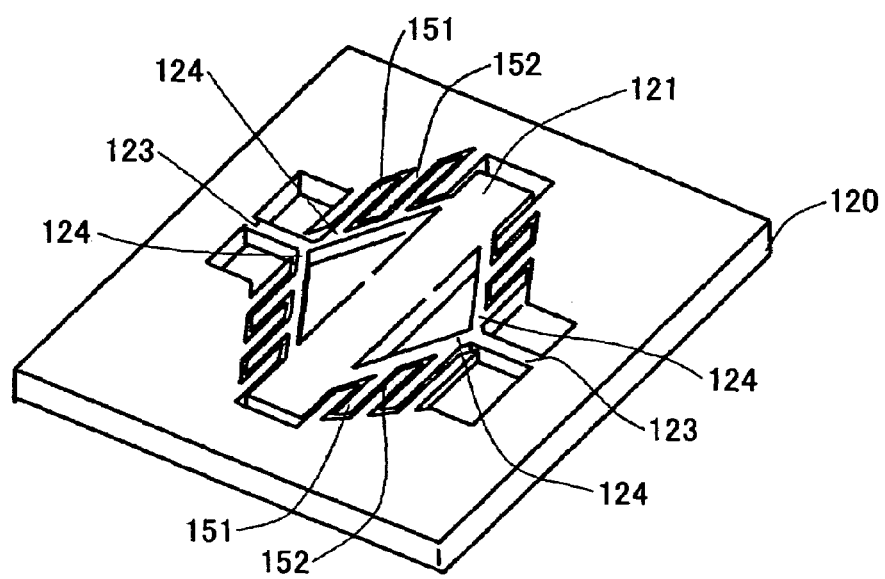
FIG. 29 is a schematic perspective view of a deflector mirror according to an eighth embodiment of the present invention.

A description is given, with reference to FIG. 29, of a deflector mirror according to an eighth embodiment of the present invention. The deflector mirror of this embodiment is different in the configuration of driving electrodes from the deflector mirror of the seventh embodiment.

FIG. 29 is a simplified perspective view of the deflector mirror of this embodiment for illustrating the above-described difference in the configuration of driving electrodes. A configuration not graphically illustrated in FIG. 29 is equal to that of the seventh embodiment.

Referring to FIG. 29, in the deflector mirror according to this embodiment, comb-teeth-like movable electrodes 151 are formed on the joining members 124 so as to extend outward therefrom, and comb-teeth-like fixed electrodes 152 are formed on the frame 120 so as to engage the movable electrodes 151 through a minute gap. A drive pulse is applied between the movable electrodes 151 and the fixed electrodes 152 so that the mirror substrate 121 can be driven by the electrostatic torque between the movable and fixed electrodes 151 and 152 so as to vibrate in a reciprocating manner at a resonant frequency on the torsion beams 123 as a torsional rotary shaft.

In the deflector mirror according to this embodiment, the driving electrodes (movable and fixed electrodes 151 and 152) are positioned close to the rotation center axis of the mirror substrate 121. As a result, compared with the deflector mirror of the seventh embodiment, a decrease in the electrostatic torque is small even when the deflection angle of the mirror substrate 121 is large, so that it is possible to secure a large deflection angle. Further, in the deflector mirror according to this embodiment, comb-teeth-like movable electrodes are not provided to the free ends of the mirror substrate 121. Accordingly, the mirror substrate 121 can be used up to the vicinity of its free ends as a mirror surface. In the case of using the mirror substrate 121 up to the vicinity of its free ends as a mirror surface, it is suitable that the joining members 124 are joined to the mirror substrate 121 in the vicinity of its free ends.

It is possible to form the same deflector mirror as that of this embodiment using a single silicon substrate as in a below described embodiment (11$^{th}$ embodiment).

Although not graphically illustrated, in the same configuration as the deflector mirror of this embodiment, the mirror substrate 121 may be provided with a flexural rigidity distribution as illustrated in FIG. 25 by forming multiple recesses as described with reference to FIGS. 22 through 25 on the bottom surface of the mirror substrate 121. Such a deflector mirror is also included in the present invention.

Ninth Embodiment

Figure 30:
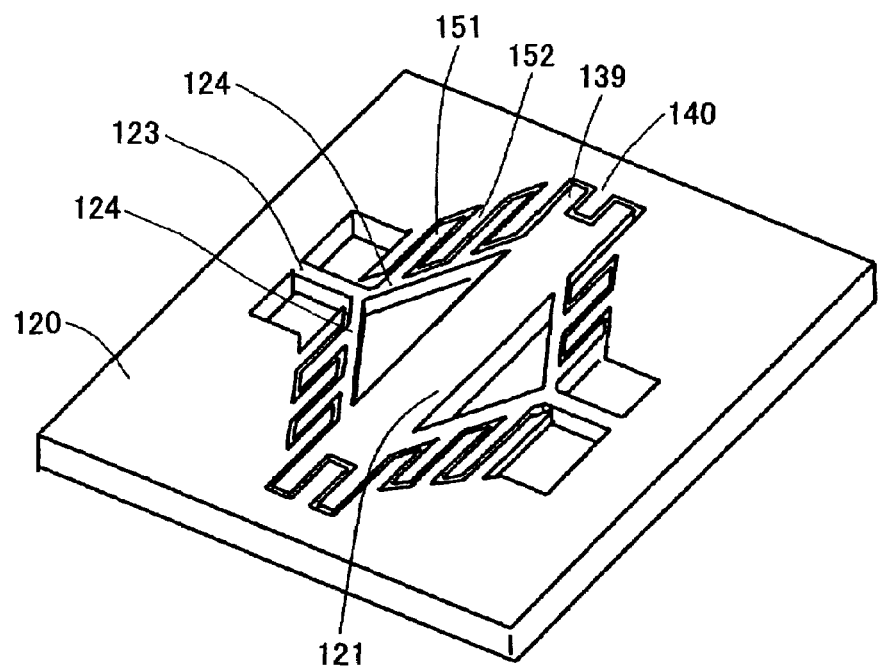
FIG. 30 is a schematic perspective view of a deflector mirror according to a ninth embodiment of the present invention.

A description is given, with reference to FIG. 30, of a deflector mirror according to a ninth embodiment of the present invention. The deflector mirror of this embodiment is different in the configuration of driving electrodes from the deflector mirror of the seventh embodiment. FIG. 30 is a simplified perspective view of the deflector mirror of this embodiment for illustrating the above-described difference in the configuration of driving electrodes. A configuration not graphically illustrated in FIG. 30 is equal to that of the seventh embodiment.

Referring to FIG. 30, in the deflector mirror according to this embodiment, in addition to the movable electrodes 139 formed on the free ends of the mirror substrate 121 and the fixed electrodes 140 formed on the frame 120 so as to engage the movable electrodes 139 through a minute gap, the comb-teeth-like movable electrodes 151 are formed on the joining members 124 so as to extend outward therefrom, and the comb-teeth-like fixed electrodes 152 are formed on the frame 120 so as to engage the movable electrodes 139 through a minute gap.

A drive pulse is applied between the movable electrodes 139 and the fixed electrodes 140 and between the movable electrodes 151 and the fixed electrodes 152 so that the mirror substrate 121 can be driven by the electrostatic torque between the movable and fixed electrodes 139 and 140 and the electrostatic torque between the movable and fixed electrodes 151 and 152 so as to vibrate in a reciprocating manner at a resonant frequency on the torsion beams 123 as a torsional rotary shaft.

Figure 31:
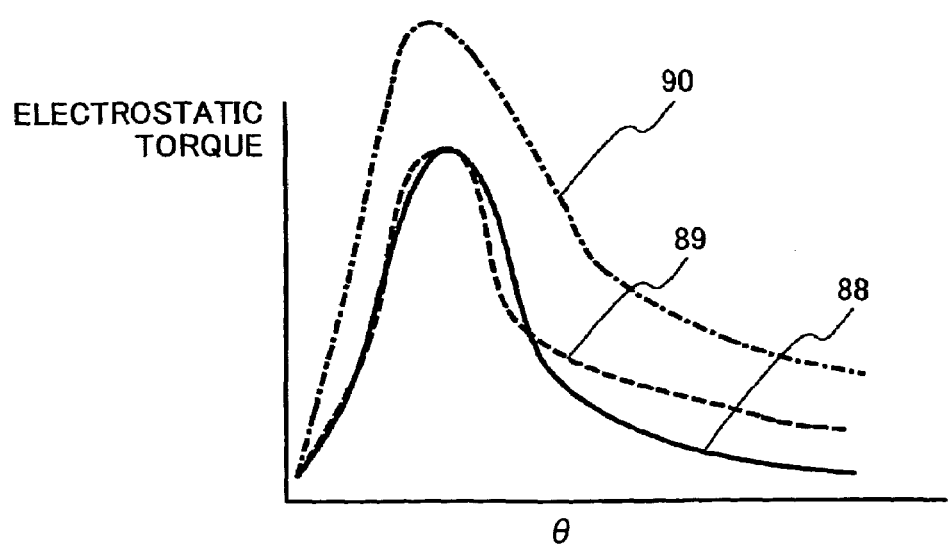
FIG. 31 is a graph for illustrating electrostatic torque by movable electrodes and fixed electrodes according to the ninth embodiment of the present invention.

FIG. 31 is a graph of the relationship between the electrostatic torque by the driving electrodes and the deflection angle of the mirror substrate 121 according to the ninth embodiment. In FIG. 31, a curved line 88 (solid line) indicates the calculation results of the electrostatic torque by the fixed electrodes 139 on the free ends of the mirror substrate 121 and the fixed electrodes 140. A curved line 89 (broken line) indicates the calculation results of the electrostatic torque by the movable electrodes 151 provided to the joining members 124 and the fixed electrodes 152. The curved line 89 shows that the electrostatic torque does not decrease so much even in the region of large deflection angles. A curved line 90 (dot-dash line) indicates a composite electrostatic torque into which the electrostatic torque of the curved line 88 and the electrostatic torque of the curved line 89 are combined. This composite electrostatic torque is exerted on the mirror substrate 121. Accordingly, compared with the deflector mirrors of the seventh and eighth embodiments, the deflector mirror of this embodiment can achieve a greater deflection angle of the mirror substrate 121 with the same driving voltage, and can achieve the same deflection angle with a reduced driving voltage.

It is possible to form the same deflector mirror as that of this embodiment using a single silicon substrate as in a below described embodiment (11$^{th}$ embodiment). Although not graphically illustrated, in the same configuration as the deflector mirror of this embodiment, the mirror substrate 121 may be provided with a flexural rigidity distribution as illustrated in FIG. 25 by forming multiple recesses as described with reference to FIGS. 22 through 25 on the bottom surface of the mirror substrate 121. Such a deflector mirror is also included in the present invention.

Tenth Embodiment

Figure 32:
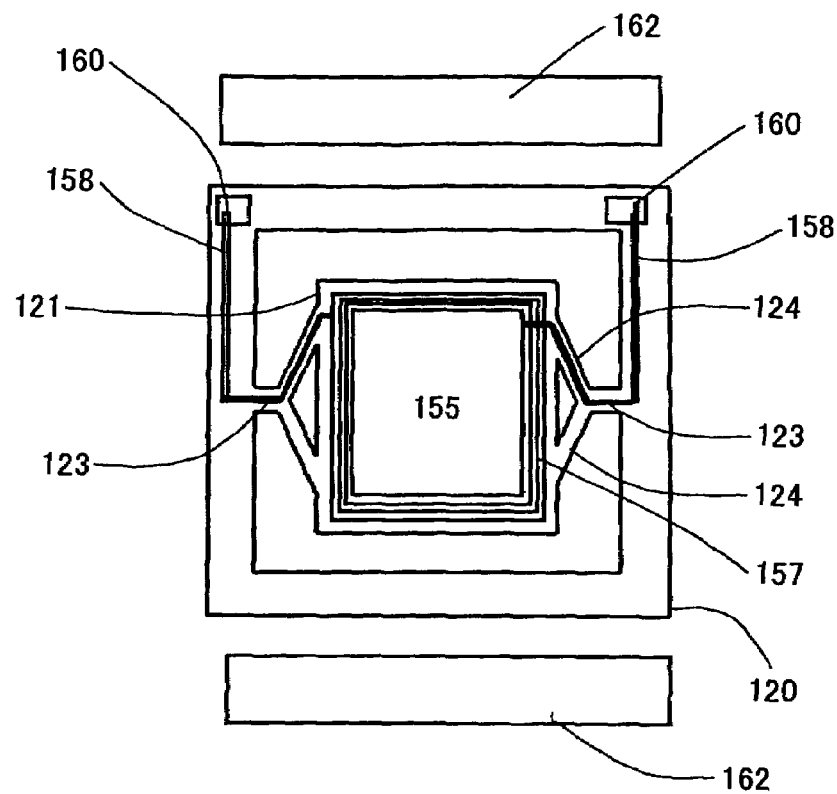
FIG. 32 is a schematic plan view of a deflector mirror according to a tenth embodiment of the present invention.
Figure 33:
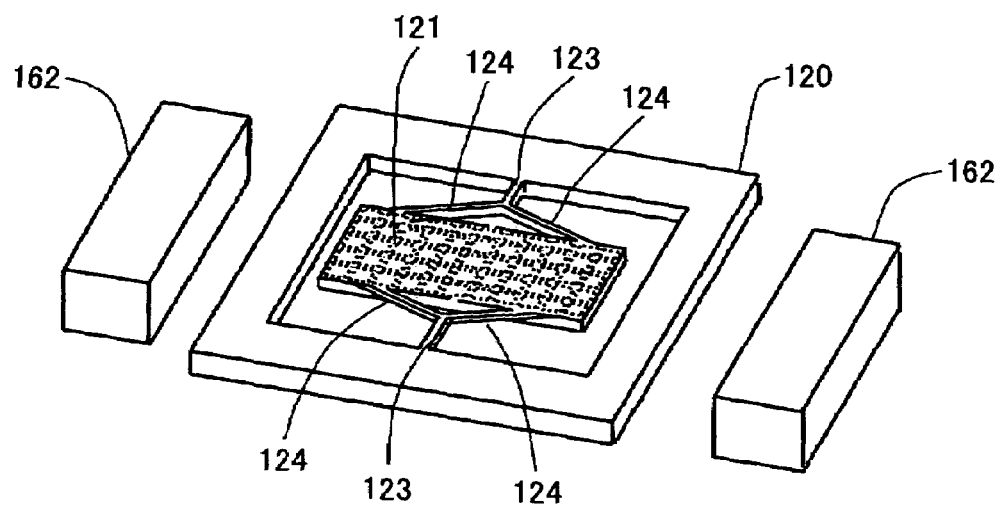
FIG. 33 is a schematic perspective view of the deflector mirror according to the tenth embodiment of the present invention.

FIG. 32 is a top plan view of a deflector mirror according to a tenth embodiment of the present invention. FIG. 33 is a simplified perspective view of the deflector mirror of FIG. 32.

The deflector mirror according to this embodiment is of an electromagnetic driving type. In the deflector mirror of this embodiment, a driving coil 157 is formed of, for instance, a thin copper film on the mirror surface side of the mirror substrate 121 so as to go around along the periphery of a mirror surface 155. Lead parts 158 on the respective ends of the driving coil 157 are extended to electrode pads 160 formed on the frame 120. The deflector mirror of this embodiment includes a pair of permanent magnets 162 for generating a static magnetic field substantially parallel to the mirror substrate 121 to be crossed by and interlinked with the driving coil 157. The permanent magnets 162 may be replaced with electromagnets. As indicated by broken lines in FIG. 33, multiple recesses (thinned parts) are formed on the bottom surface of the mirror substrate 121 so as to reduce the moment of inertia while maintaining the rigidity of the mirror substrate 121. These recesses may be sized and disposed so as to provide the mirror substrate 121 with a flexural rigidity distribution as illustrated in FIG. 25.

Figure 34:
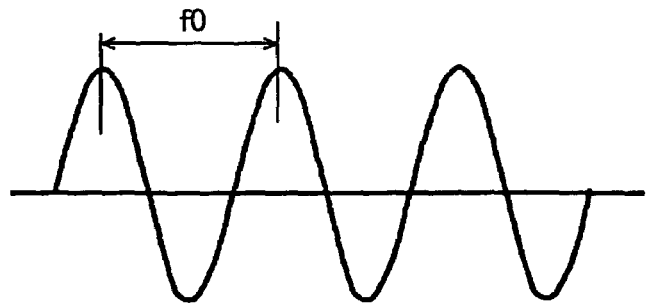
FIG. 34 is a waveform chart of a driving current of the deflector mirror according to the tenth embodiment of the present invention.

According to the deflector mirror of this embodiment, a sine wave current of a resonant frequency as illustrated in FIG. 34 is supplied to the driving coil 157 through the electrode pads 160. As a result, electromagnetic torque is generated in the driving coil 157 so that the mirror substrate 121 can be caused to vibrate in a reciprocating manner at the resonant frequency. The deflection angle θ of the mirror substrate 121 at this time can be given by the following equations:

$$f0 = (1/2\pi)\sqrt{(K\theta/I)}, \quad (10)$$

$$\theta = Trq/I*K(f0, C), \quad (11)$$

where K(f0, C) is a function of a resonant frequency f0 and the viscosity resistance coefficient C of a vibration space, and is inversely proportional to f0 and C. Further, Kθ is the torsion spring constant of the torsion beams 123, Trq is electromagnetic torque exerted on the driving coil 157, and I is the moment of inertia of the mirror substrate 121.

Such a deflector mirror of an electromagnetic driving type can generate great torque with ease, so that it is easy to obtain a large deflection angle.

The deflector mirror according to this embodiment is formed by a semiconductor process using, for instance, a silicon substrate. However, the silicon substrate does not necessarily have to be a low-resistance substrate because none of the mirror substrate 121, the joining members 124, and the frame 120 is employed as an electrode.

It is also possible to employ a flat surface as the bottom surface of the mirror substrate 121 and provide a driving coil thereon. In this case, the entire top surface of the mirror substrate 121 is employable as a mirror surface. A deflector mirror of such a configuration is also included in the present invention.

11$^{th}$ Embodiment

In a deflector mirror according to the present invention, if the rigidity of joining members connecting the unsupported ends of torsion beams and a mirror substrate is insufficient, torsional deformation occurs in the joining members so that a sufficient dynamic deflection deformation control effect cannot be obtained when the mirror substrate is caused to vibrate in a reciprocating manner at a large deflection angle. Accordingly, in order to prevent such inconvenience, a reinforcement member for controlling such deformation is provided to each pair of the joining members in a deflector mirror according to an 11$^{th}$ embodiment of the present invention.

Figure 35:
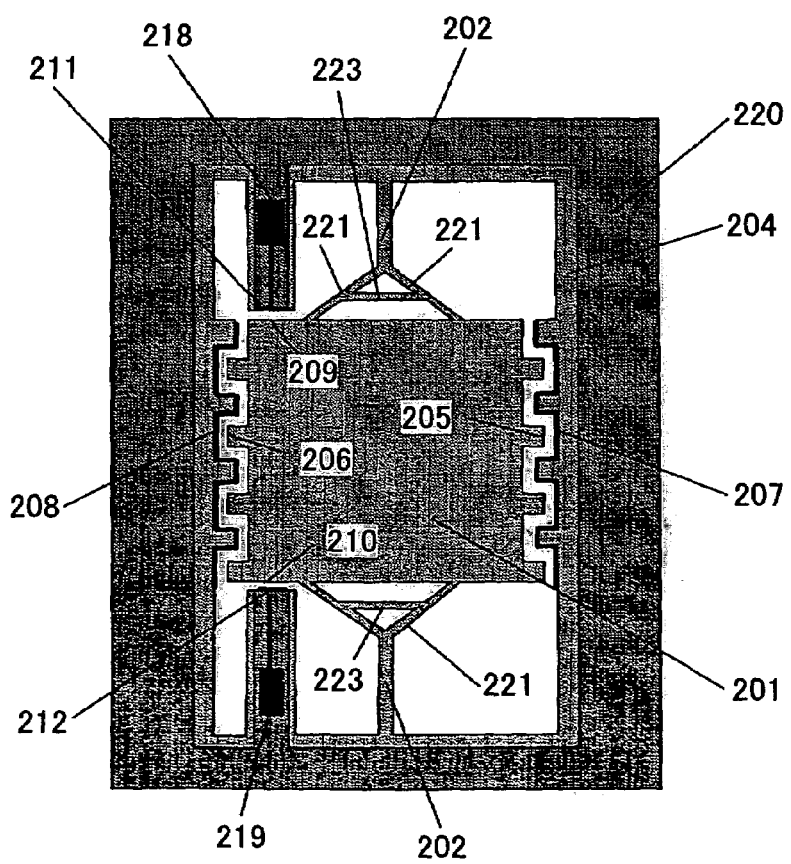
FIG. 35 is a schematic plan view of a deflector mirror according to an $11^{th}$ embodiment of the present invention.
Figure 36:
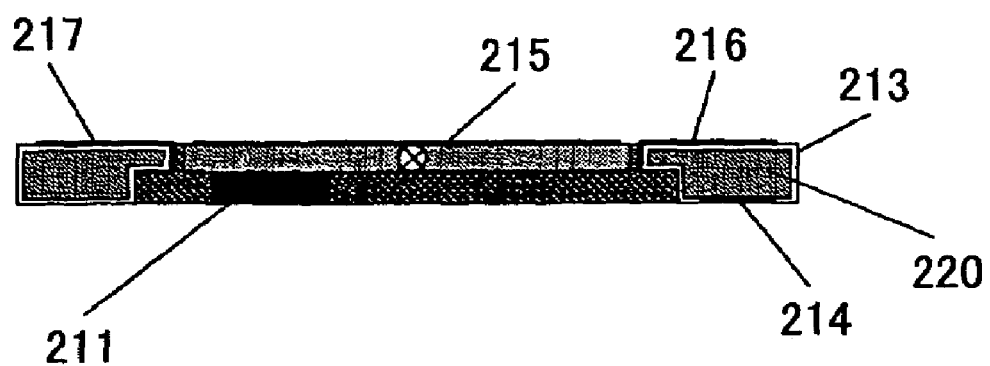
FIG. 36 is a cross-sectional view of a substantially center part of the deflector mirror of FIG. 35 according to the $11^{th}$ embodiment of the present invention.

FIG. 35 is a plan view of the deflector mirror, taken from the bottom surface side of a mirror substrate 201 according to the 11$^{th}$ embodiment. FIG. 36 is a cross-sectional view of a substantially center part of the deflector mirror of FIG. 35.

The mirror substrate 201 vibrates in a reciprocating manner on two torsion beams 202 provided on a straight line as a torsional rotary shaft. One end (an unsupported end) of each torsion beam 202 is joined via a pair of joining members 221 to a corresponding side of the mirror substrate 201. As described above, the joining positions of the mirror substrate 201 and the joining members 221 are selected so as to be able to control the dynamic deflection deformation of the mirror substrate 201 with efficiency. A reinforcement beam 223 is provided to each pair of the joining members 221 so as to be parallel to the corresponding side of the mirror substrate 201 as a member for reinforcing the paired joining members 221.

The other end (supported end) of each torsion beam 201 is joined to an inner frame body 204 of a frame surrounding the mirror substrate 201. The inner frame body 204 and an outer frame body 220, greater in thickness than the inner frame body 204, are integrated into the frame.

Comb-teeth-like movable electrodes 205 and 206 are formed on the free ends (sides not joined to the joining members 221) of the mirror substrate 201. Comb-teeth-like fixed electrodes 207 and 208 are formed on the internal frame body 204 so as to engage the movable electrodes 205 and 206, respectively, through a minute gap. First and second extension parts extend from the outer frame body 220 so as to correspond to free end vicinity parts 209 and 210 of the sides of the mirror substrate 201 to which the joining members 221 are joined. Activation electrodes 211 and 212 are formed on the end surfaces of the first and second extension parts, respectively.

The frame (the inner and outer frame bodies 204 and 220), the mirror substrate 201, the torsion beams 202, the joining members 221, and the reinforcement beams 223 are integrally formed of a conductive material such as a low-resistance single crystal silicon substrate), and an insulating film 213 (FIG. 36) is formed on a surface thereof. A part of the insulating film 213 of the outer frame body 220 is removed so that the conductive material is exposed. An electrode pad 214

(FIG. 36) of a thin metal film for the movable electrodes 205 and 206 is formed on this exposed part. A thin metal film is formed on the surface of each of the fixed electrodes 207 and 208, and is extended to a corresponding one of electrode pads 216 and 217 of a thin metal film formed on the surface of the outer frame body 120. A thin metal film is also formed on the surface of each of the activation electrodes 211 and 212, and is extended to a corresponding one of electrode pads 218 and 219 of a thin metal film formed on the surfaces of the first and second extension parts, respectively, of the outer frame body 120. A mirror surface 215 (FIG. 36) of a thin metal film having a sufficiently high reflectance with respect to the wavelength of employed light is formed on the surface of the mirror substrate 201.

Next, a description is given, with reference to FIGS. 37A through 37K, of a method of manufacturing the deflector mirror according to this embodiment.

Figure 37A:
FIGS. 37A through 37K are diagrams for illustrating a method of manufacturing the deflector mirror according to the $11^{th}$ embodiment of the present invention.

Process of FIG. 37A: A highly viscous heat-resisting resist 302 is applied on one of the polished surfaces of a 200 μm thick silicon substrate 301 so as to be 100 μm in thickness as a mask for deeply etching the silicon substrate 301. Any material that has good adhesion to silicon, has high etching selectivity so as to remain as a mask even at the time of 100 μm silicon etching, and can be removed easily after etching is employable as a mask material. For instance, a Ni-plated film may be employed.

Figure 37B:

Process of FIG. 37B: The resist 302 is exposed to light and developed so as to be patterned with an inner frame body shape.

Figure 37C:

Process of FIG. 37C: Using the patterned resist 302 as a mask, the silicon substrate 301 is etched up to 100 μm deep using a dry etching device (ICP-RIE) having high etching speed and high anisotropy so as to form the inner frame body shape in the silicon substrate 301. In a later process, activation electrodes are formed on the step part of the etching end surface formed in this process.

Figure 37D:

Process of FIG. 37D: After the resist 302 is dissolved to be removed, a highly viscous heat-resisting resist 303 is applied on the stepped substrate 302 so as to be 100 μm in thickness, and is exposed to light and developed so as to be patterned with a reinforcement beam shape.

Figure 37E:

Process of FIG. 37E: The resist mask 303 is removed.

Figure 37F:

Process of FIG. 37F: A highly viscous heat-resisting resist 304 is applied on the bottom surface of the silicon substrate 301 so as to be 100 μm in thickness. Here, the bottom surface of the silicon substrate 301 refers to a surface on the opposite side from the surface on which etching has been performed to form the inner frame body shape in the silicon substrate 301. The resist 304 is patterned with the shape of a mirror substrate, torsion beams, and reinforcement beams on the bottom surface of the silicon substrate 301.

Figure 37G:

Process of FIG. 37G: Using the resist 304 after the patterning as a mask, dry etching is performed until the silicon substrate 301 is penetrated through using a dry etching device (ICP-RIE) having high etching speed and high anisotropy.

Figure 37H:

Process of FIG. 37H: After the resist 304 is dissolved to be removed, the entire silicon substrate 301 is subjected to thermal oxidation, so that a 1 μm thick $SiO_2$ film 305 is formed on the surface of the silicon substrate 301 as an insulating film.

Figure 37I:
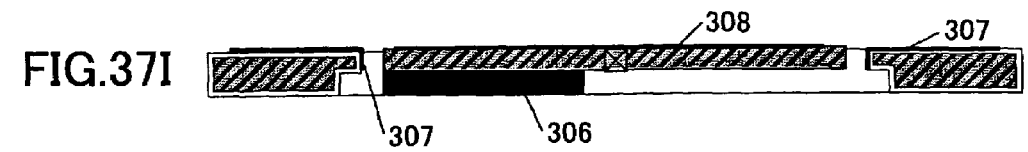

Process of FIG. 37I: On the $SiO_2$ film 305 of the internal end surface of the frame, a Ti thin film is formed to be 300 Å and then a Pt thin film is formed to be 1200 Å by sputtering as a thin metal film 306 for activation electrodes and electrode pads therefor and a thin metal film 307 for driving fixed electrodes and electrode pads therefor. Further, an Al thin film 308 serving as a mirror surface is formed. In the case of film formation, a region other than electrodes is covered with a metal stencil mask so as to prevent a thin metal film from being formed thereon. Further, the driving fixed electrodes, which are positioned opposite and close to the mirror substrate, are formed from an angled direction with the mirror substrate being inclined using a jig. The Ti thin film is provided to increase the adhesion of the Pt thin film on the $SiO_2$ film 305. The electrode material is not limited to the Pt thin film. Other materials having high conductivity and securing adhesion to $SiO_2$, such as Au and Ti, are also employable. Further, the film formation method is not limited to sputtering, and other film formation methods such as vacuum deposition and ion plating are also employable.

Figure 37J:

Process of FIG. 37J: A part of the SiO2 film 305 on the bottom surface of the frame body is removed by etching using a metal mask, thereby forming a contact hole 309 to expose silicon.

Figure 37K:

Process of FIG. 37K: An Al thin film 310 serving as an electrode pad for movable electrodes is formed in the contact hole 309 using a metal mask. Thereafter, heat treatment is performed at 400° C. in order to reduce the electric resistance between the Al thin film 310 and the silicon substrate 301. Here, the Al thin film 310 is formed as a thin metal film. However, other materials such as Au may also be selected if the thin metal film can provide necessary and sufficient reflectance with respect to laser light to be employed. Further, vacuum deposition is employed as a film formation method, but other film formation methods such as sputtering and ion plating are also employable.

Figure 38A:
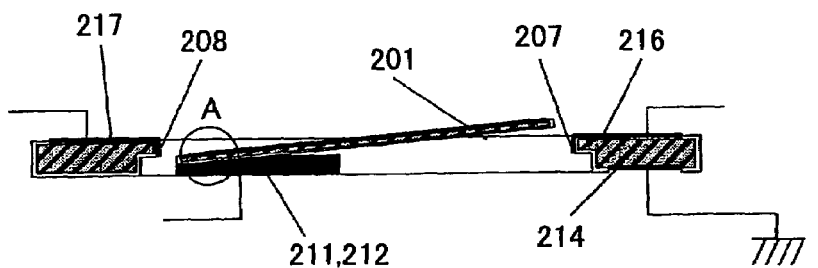
FIGS. 38A through 38D are diagrams illustrating an operation of the deflector mirror according to the $11^{th}$ embodiment of the present invention.
Figure 38B:
Figure 38C:
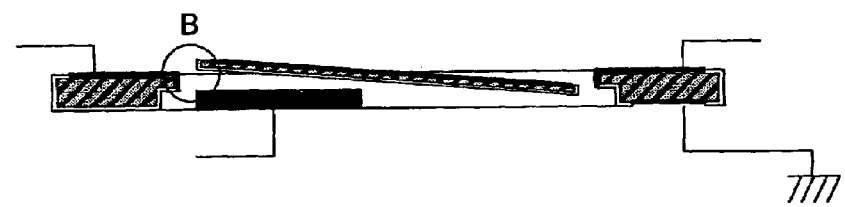
Figure 38D:

Next, a description is given, with reference to FIGS. 38A through 38D, of an operation of the deflector mirror according to this embodiment. The electrode pad 214 for the movable electrodes is grounded. When a voltage of, for instance, 50 V is applied to the electrode pads 218 and 219 for the activation electrodes 211 and 212, an electrostatic force to rotate the mirror substrate 201 counterclockwise in FIG. 38A is exerted between the mirror substrate 201 and the activation electrodes 211 and 212, so that the mirror substrate 201 is inclined up to an angle illustrated in FIG. 38A. At this point, steps necessary for the start of vibration are formed between the movable electrodes 205 and 206 and the fixed electrodes 207 and 208 for driving. Activation is facilitated by thus providing the activation electrodes 211 and 212 even in the case where the torsion beams 202 have high torsional rigidity.

Next, at the same time that the application of voltage to the activation electrodes 211 and 212 is stopped, a voltage of, for instance, 50 V is applied to the electrode pads 216 and 217 of the fixed electrodes 207 and 208 for driving. As a result, the mirror substrate 201 deflects clockwise because of the electrostatic attraction between the fixed electrodes 207 and 208 and the movable electrodes 205 and 206 and the torsional rigidity of the torsion beams 202. When the mirror substrate 201 returns to a horizontal position illustrated in FIG. 38B, the application of voltage to the electrode pads 216 and 217 is stopped. The mirror substrate 201 further deflects because of the moment of inertia to stop at an angle illustrated in FIG. 38C where the moment of inertia is balanced with the torsional rigidity of the torsion beams 202. Thereafter, when voltage is reapplied to the electrode pads 216 and 217, the mirror substrate 201 deflects counterclockwise because of the electrostatic attraction between the fixed electrodes 207 and 208 and the movable electrodes 205 and 206 and the torsional rigidity of the torsion beams 202 so as to return again to the horizontal position illustrated in FIG. 38D. By matching the frequency of a drive pulse signal applied to the electrode pads 216 and 217 with a frequency twice the resonant frequency of the vibration system, the mirror substrate 201 continues reciprocating vibration at a deflection angle greater than that at the time of its activation.

Figure 39:
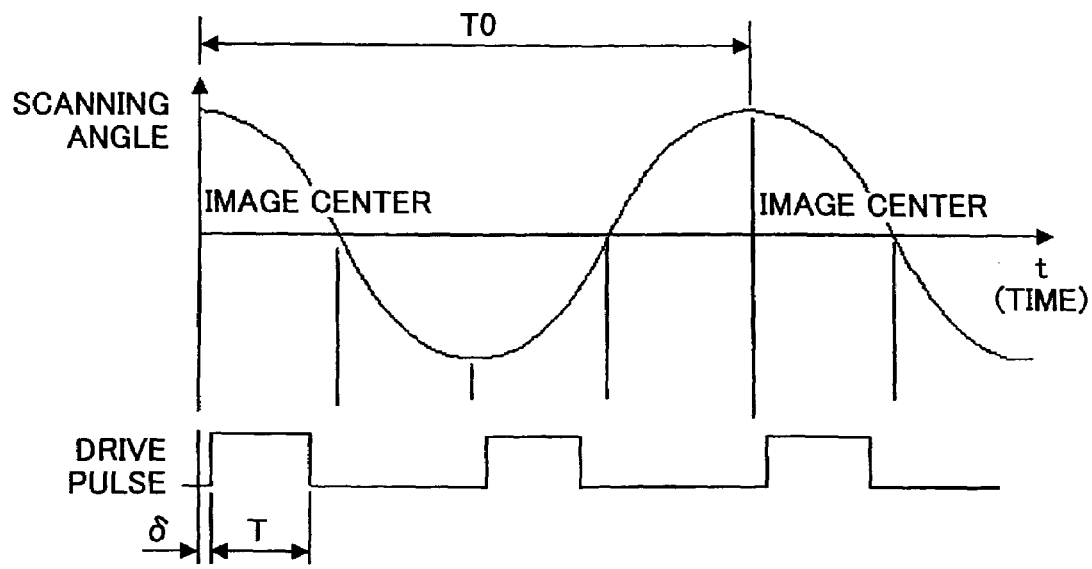
FIG. 39 is a waveform chart of the relationship between the angle of deflection of a mirror substrate of the deflector mirror and a drive pulse signal according to the $11^{th}$ embodiment of the present invention.

FIG. 39 is a graph illustrating the timing relationship between the deflection angle of the mirror substrate 201 and the drive pulse signal in the stabilized state of the reciprocating vibration of the mirror substrate 201. The deflection angle (scanning angle) is illustrated in the upper part and the drive pulse signal is illustrated in the lower part. As is understood from FIG. 39, the drive pulse signal rises with a delay of δ from a time at which the deflection angle (scanning angle) is maximized, and falls after passage of a time T for which the mirror substrate 201 deflects in a direction to make the scanning angle 0°. Accordingly, two drive pulses are generated during one period of vibration T0 of the mirror substrate 201.

In the deflector mirror according to this embodiment, each pair of the joining members 221 joining the unsupported end of the corresponding torsion beam 202 and the mirror substrate 201 is reinforced by the corresponding reinforcement beam 223. Accordingly, even when the mirror substrate 201 vibrates at a large deflection angle, torsional deformation is less likely to occur in the joining members 221, so that the dynamic deflection deformation of the mirror substrate 201 can be controlled with more certainty.

Figure 40:
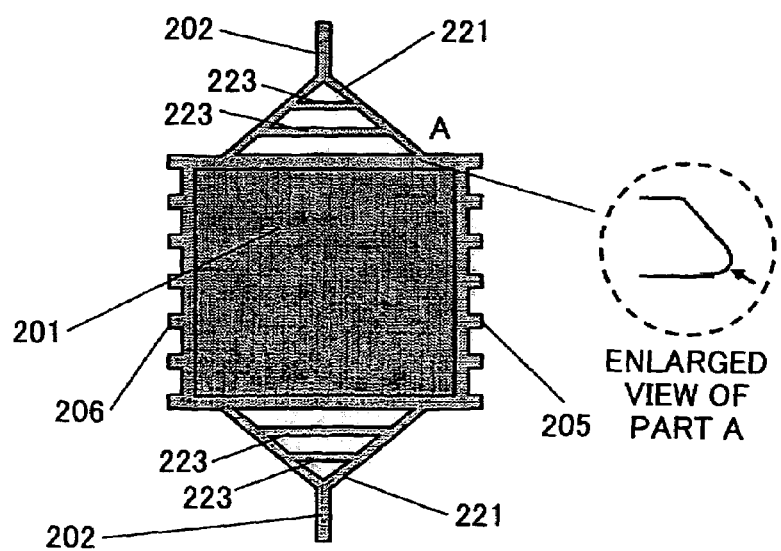
FIG. 40 is a diagram for illustrating a variation of the $11^{th}$ embodiment of the present invention.
Figure 41:
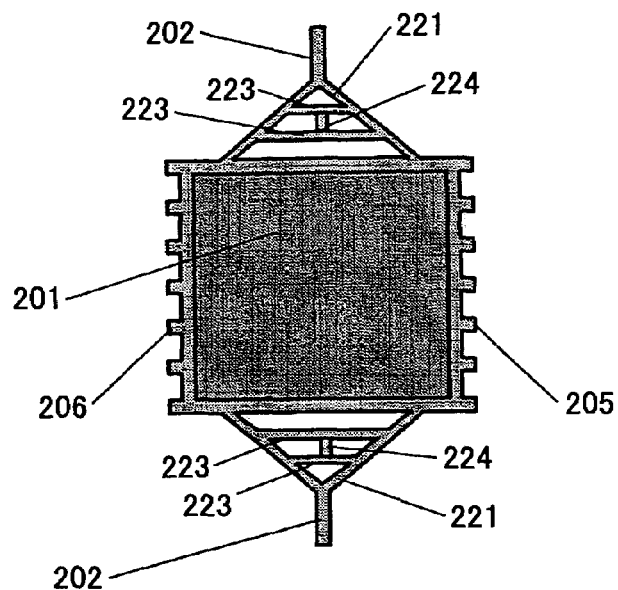
FIG. 41 is a diagram for illustrating another variation of the $11^{th}$ embodiment of the present invention.
Figure 42:
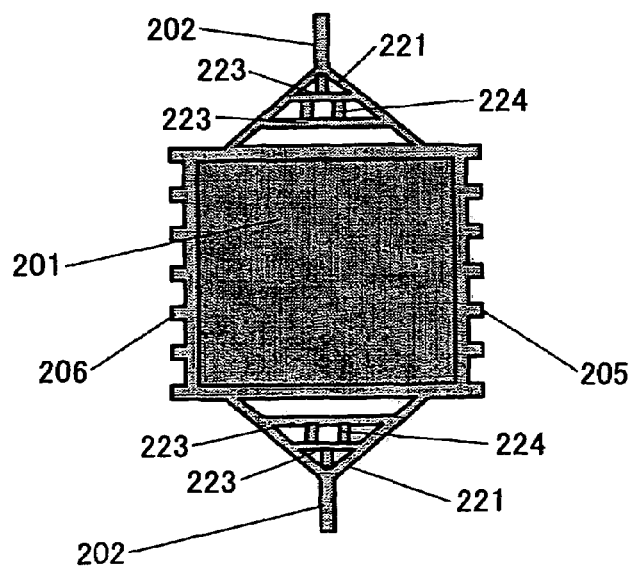
FIG. 42 is a diagram for illustrating another variation of the $11^{th}$ embodiment of the present invention.
Figure 43:
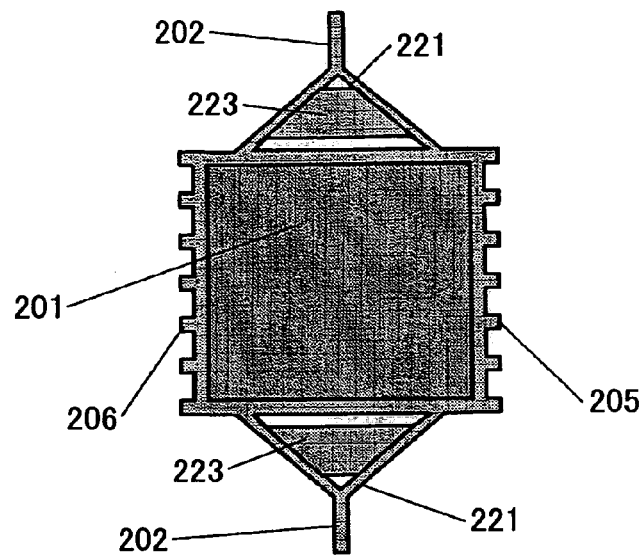
FIG. 43 is a diagram for illustrating another variation of the $11^{th}$ embodiment of the present invention.

The reinforcement structure of the joining members 221 can be provided in a variety of forms. For instance, as illustrated in FIG. 40, the multiple (two or more) reinforcement beams 223 may be provided to each pair of the joining members 221 so as to further control the deformation of the joining members 221. Alternatively, as illustrated in FIG. 41 or 42, with respect to each pair of the joining members 221, the multiple reinforcement beams 223 may be joined by one or more reinforcement beams 224 extending in a direction perpendicular to the reinforcement beams 223 so as to increase the reinforcement effect, thereby further controlling the deformation of the joining members 221. Further, as illustrated in FIG. 43, the reinforcement beams 223 may be shaped like a flat plate. As a result, the reinforcement effect greater than or equal to that of multiple bar-like reinforcement beams can be produced.

In order to relax stress concentration on the joining part of the joining members 221 and the mirror substrate 201, the joining part of the reinforcement beams 223 and the joining members 221, and the joining part of the reinforcement beams 223 and 224, it is preferable that a corner part of each of the above-described joining parts be curved as illustrated in an enlarged view of Part A in FIG. 40.

As in this embodiment, a reinforcement member may also be provided on the joining members of the deflector mirrors of the above-described seventh and tenth embodiments and the embodiments subsequent to this embodiment.

Although not graphically illustrated, in the same configuration as the deflector mirror according to this embodiment, the mirror substrate 201 may be provided with a flexural rigidity distribution as illustrated in FIG. 25 by forming multiple recesses as described with reference to FIGS. 22 through 25 on the bottom surface of the mirror substrate 201 except the movable electrode part.

[Description of Feature (c)]

The deflector mirror according to the present invention may have the supported end of each torsion beam supported so that the supported end of each torsion beam is provided with elasticity in its rotational directions. Such supporting having rotational elasticity can be realized by a combination of means such as bearings restricting the movement of the torsion beams in the axial directions of their supported ends and the directions perpendicular thereto and a spiral spring joined to the supported end of each torsion beam. Such supporting can also be realized by a structure in which the supported end of each torsion beam is joined to a support member that is elastically deformable in the same direction as the torsion beam with its rotation.

Figure 44:
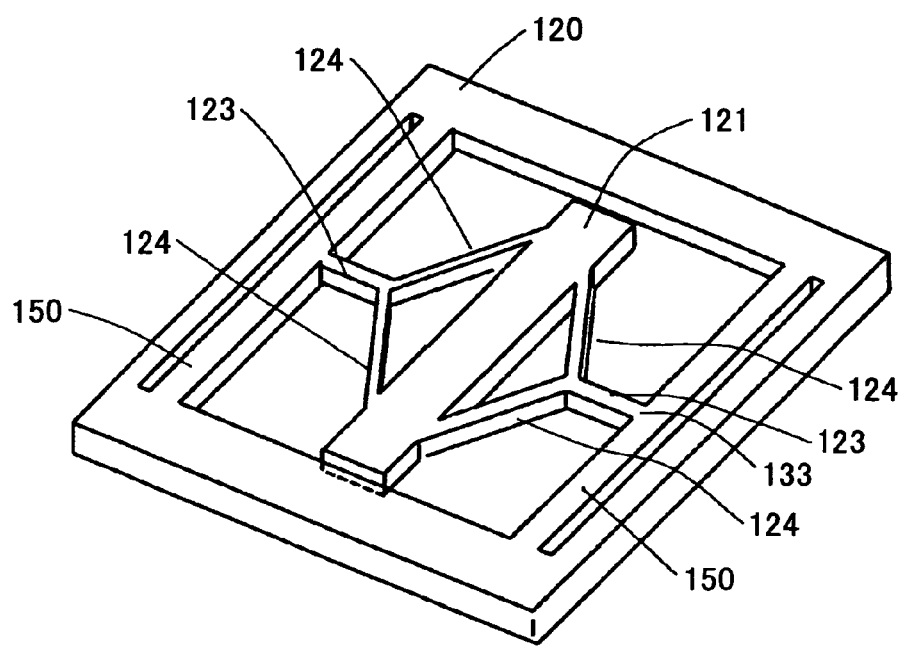
FIG. 44 is a diagram for illustrating another characteristic configuration of the deflector mirror according to the present invention.

A description is given, with reference to FIG. 44, of an example of the latter support structure. In FIG. 44, the same elements as those of FIG. 17 are referred to by the same numerals. As illustrated in FIG. 44, a supported end 133 of each torsion beam 123 is joined to a support part 150 integrated with the frame 120. Each torsion beam 123 performs torsional rotation at the time of the reciprocating vibration of the mirror substrate 121. The width, thickness, and length of the support part 150 are selected so that the support part 150 elastically deforms as required in the same direction as the torsion beam 123 with its rotation. A description is given of the effects of the support part 150 with reference to FIGS. 45 and 46A through 46E.

Figure 45:
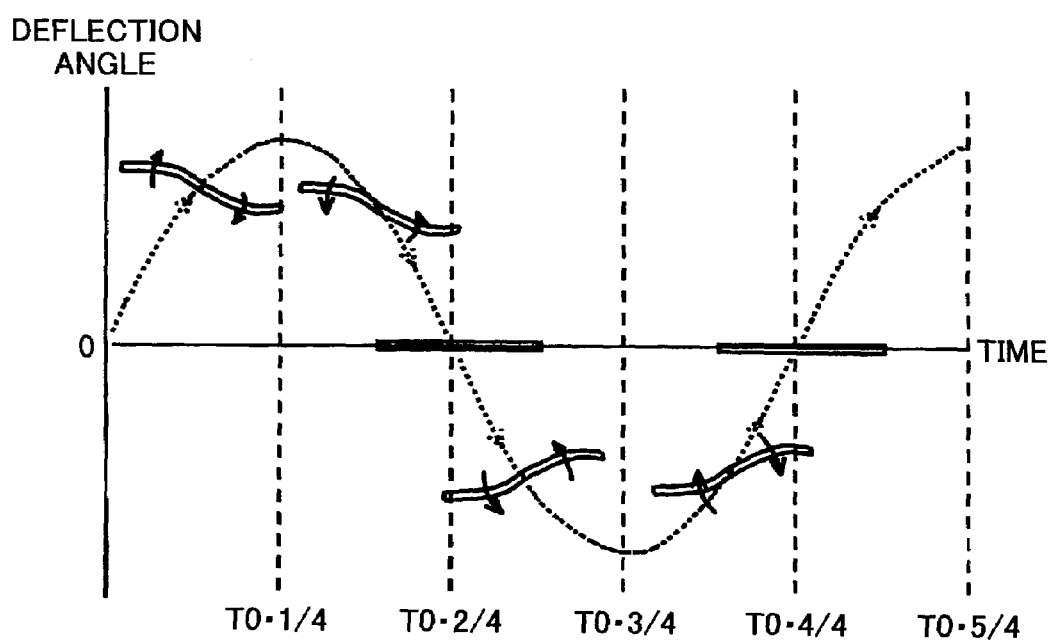
FIG. 45 is a graph of the transition of the dynamic deflection deformation of the mirror substrate at a time of its vibration according to the present invention.
Figure 46A:
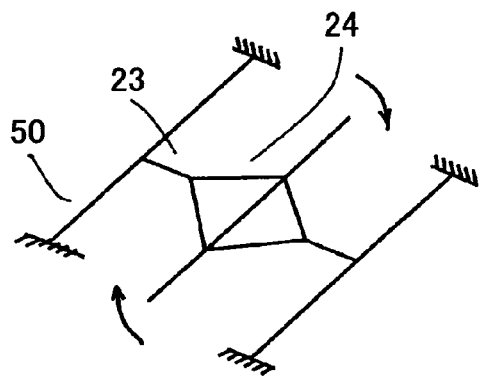
FIGS. 46A through 46E are diagrams illustrating a three-dimensional beam model for illustrating the behavior of a support part supporting the supported end of a torsion beam so that the supported end is provided with rotational elasticity according to the present invention.
Figure 46B:
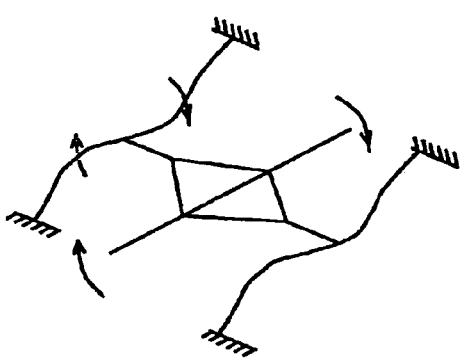
Figure 46C:
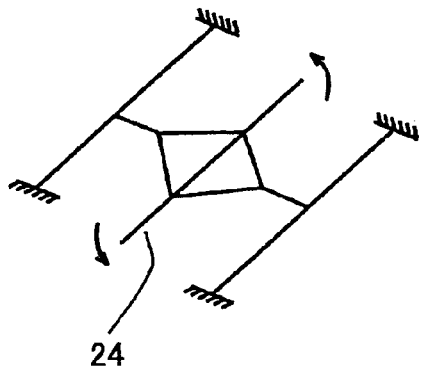
Figure 46D:
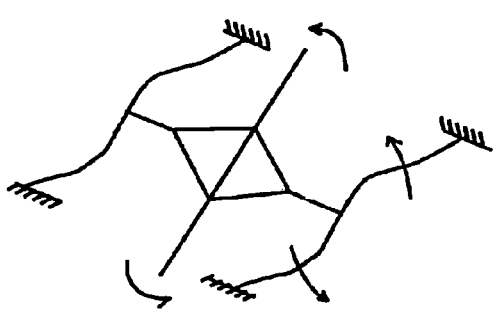
Figure 46E:
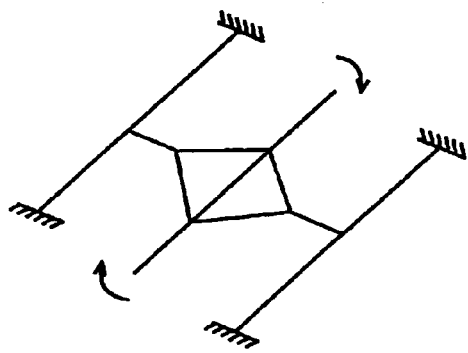

FIG. 45 is a graph of the transition of the dynamic deflection deformation of the mirror substrate 121 at the time of its vibration. Here, T0 is a vibration period, the horizontal axis is time (t), and the dotted line is the deflection angle of the mirror substrate 121.

In FIG. 45, in the period of 0<t<T0·1/4, the mirror substrate 121 rotates in the direction indicated by arrows, and the deflection deformation of the mirror substrate 121 is maximized at the point of t=T0·1/4.

In the period of T0·1/4<t<T0·2/4, the mirror substrate 121 starts to rotate in the opposite direction. The deflection deformation decreases as the deflection angle decreases, and the deflection deformation is reduced to zero at the point of t=T0·2/4.

In the period of T0·2/4<t<T0·3/4, the mirror substrate 121 continues to rotate in the same direction. The deflection deformation again increases as the deflection angle increases, and the deflection deformation is maximized at the point of t=T0·3/4.

In the period of T0·3/4<t<T0·4/4, the mirror substrate 121 starts to rotate in the opposite direction. The deflection deformation decreases as the deflection angle decreases, and the deflection deformation is reduced to zero at the point of t=T0·4/4.

FIGS. 46A through 46E are diagrams illustrating a three-dimensional beam model illustrating the behavior of each support part 150 at the points of t=0, t=T0·1/4, t=T0·2/4, t=T0·3/4, and t=T0·4/4 during the reciprocating vibration of the mirror substrate 121. As graphically illustrated, each support part 150 deforms in the same direction as the rotational direction of the mirror substrate 121 at the points of t=T0·1/4 and t=T0·3/4, where the deflection deformation of the mirror substrate 121 is maximized. Such deformation of the support parts 150 reduces an inertia force exerted on the mirror substrate 121. Accordingly, the bending moment exerted on the mirror substrate 121 is reduced, so that the dynamic deflection deformation of the mirror substrate 121 is reduced.

A description is given of specific examples of the above-described deflector mirror according to the present invention.

12th Embodiment

Figure 47:
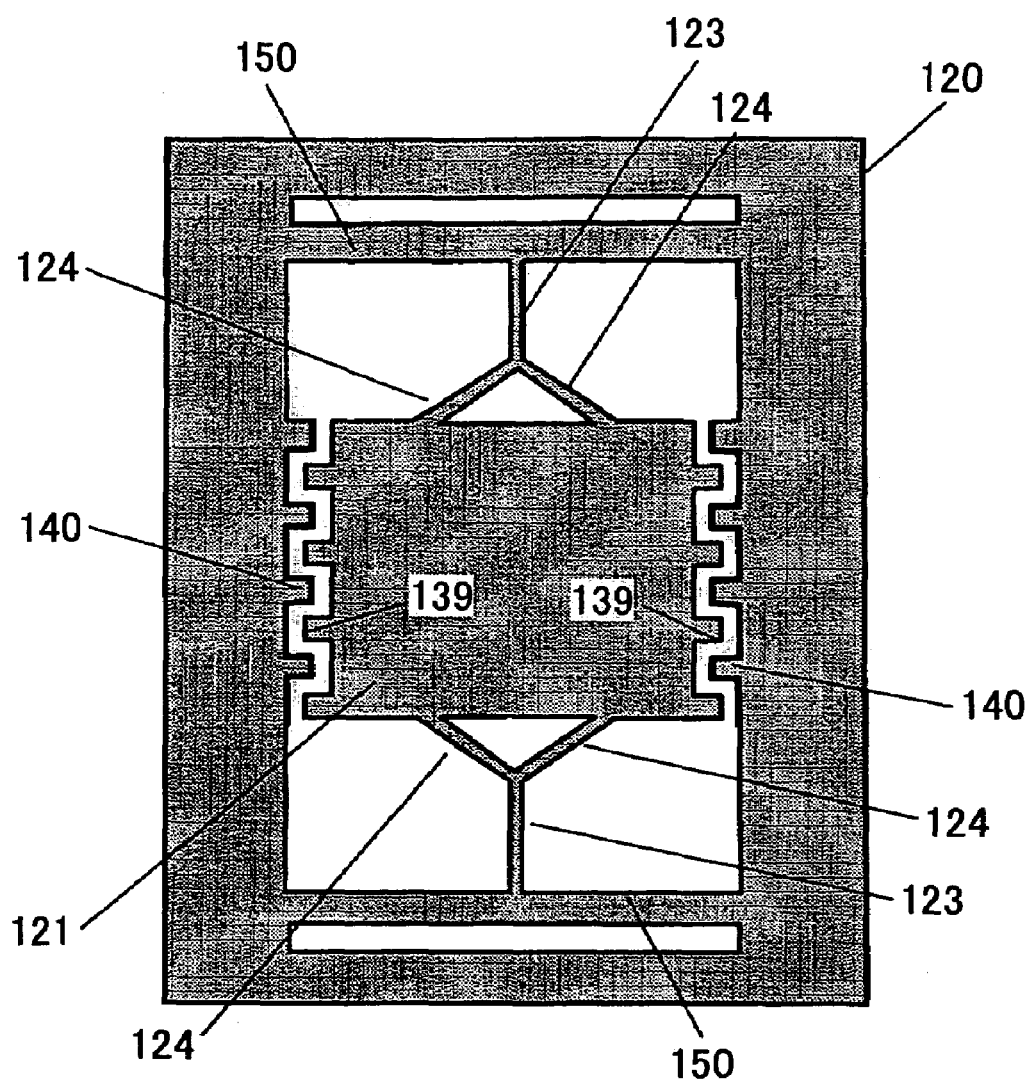
FIG. 47 is a schematic plan view of a deflector mirror according to a $12^{th}$ embodiment of the present invention.

FIG. 47 is a schematic plan view of a deflector mirror according to a 12th embodiment of the present invention. In FIG. 47, the same elements as described above are referred to by the same numerals. The deflector mirror according to this embodiment may be realized by a semiconductor process using an SOI substrate as in the above-described seventh embodiment as well as by a semiconductor process using a single silicon substrate as in the above-described 11$^{th}$ embodiment.

As illustrated in FIG. 47, in the deflector mirror according to this embodiment, the comb-teeth-like movable electrodes 139 are formed on the free ends of the mirror substrate 121, and the comb-teeth-like fixed electrodes 140 are formed on the frame 120 so as to engage the movable electrodes 139 through a minute gap. That is, according to the deflector mirror of this embodiment, the mirror substrate 121 is driven by electrostatic torque by the movable electrodes 139 and the fixed electrodes 140.

Although not graphically illustrated, in the deflector mirror according to this embodiment, the mirror substrate 121 may be provided with a flexural rigidity distribution as illustrated in FIG. 25 by forming multiple recesses as described with reference to FIGS. 22 through 25 on the bottom surface of the mirror substrate 121 except the movable electrode part.

13$^{th}$ Embodiment

Figure 48:
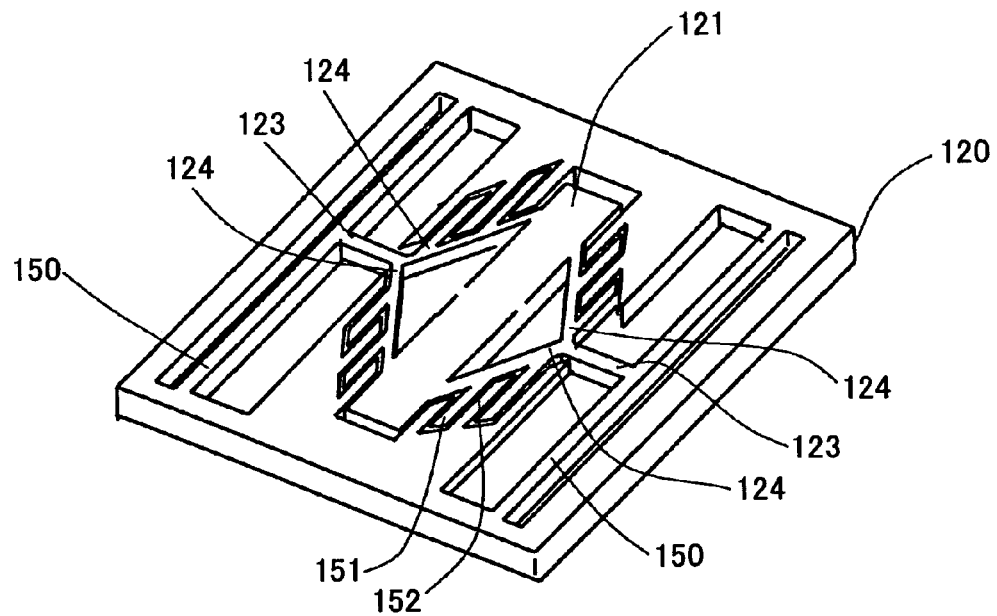
FIG. 48 is a schematic perspective view of a deflector mirror according to a $13^{th}$ embodiment of the present invention.

FIG. 48 is a schematic perspective view of a deflector mirror according to a 13$^{th}$ embodiment of the present invention for illustrating a structure thereof. The deflector mirror according to this embodiment may be realized by a semiconductor process using an SOI substrate as in the above-described seventh embodiment as well as by a semiconductor process using a single silicon substrate as in the above-described 11$^{th}$ embodiment.

As illustrated in FIG. 48, in the deflector mirror according to this embodiment, as in the above-described eighth embodiment, the comb-teeth-like movable electrodes 151 are formed on the joining members 124 so as to extend outward therefrom, and the comb-teeth-like fixed electrodes 152 are formed on the frame 120 so as to engage the movable electrodes 151 through a minute gap. That is, according to the deflector mirror of this embodiment, a drive pulse is applied between the movable electrodes 151 and the fixed electrodes 152 so that the mirror substrate 121 is driven by the electrostatic torque between the movable and fixed electrodes 151 and 152.

In the deflector mirror according to this embodiment, the driving electrodes (movable and fixed electrodes 151 and 152) are positioned close to the rotation center axis of the mirror substrate 121. As a result, compared with the deflector mirror of the 12$^{th}$ embodiment, a decrease in the electrostatic torque is small even when the deflection angle of the mirror substrate 121 is large, so that it is possible to secure a large deflection angle. Further, in the deflector mirror according to this embodiment, comb-teeth-like movable electrodes are not provided to the free ends of the mirror substrate 121. Accordingly, the mirror substrate 121 can be used up to the vicinity of its free ends as a mirror surface. In the case of using the mirror substrate 121 up to the vicinity of its free ends as a mirror surface, it is suitable that the joining members 124 are joined to the mirror substrate 121 in the vicinity of the free ends.

Although not graphically illustrated, in the deflector mirror according to this embodiment, the mirror substrate 121 may be provided with a flexural rigidity distribution as illustrated in FIG. 25 by forming multiple recesses as described with reference to FIGS. 22 through 25 on the bottom surface of the mirror substrate 121.

14$^{th}$ Embodiment

Figure 49:
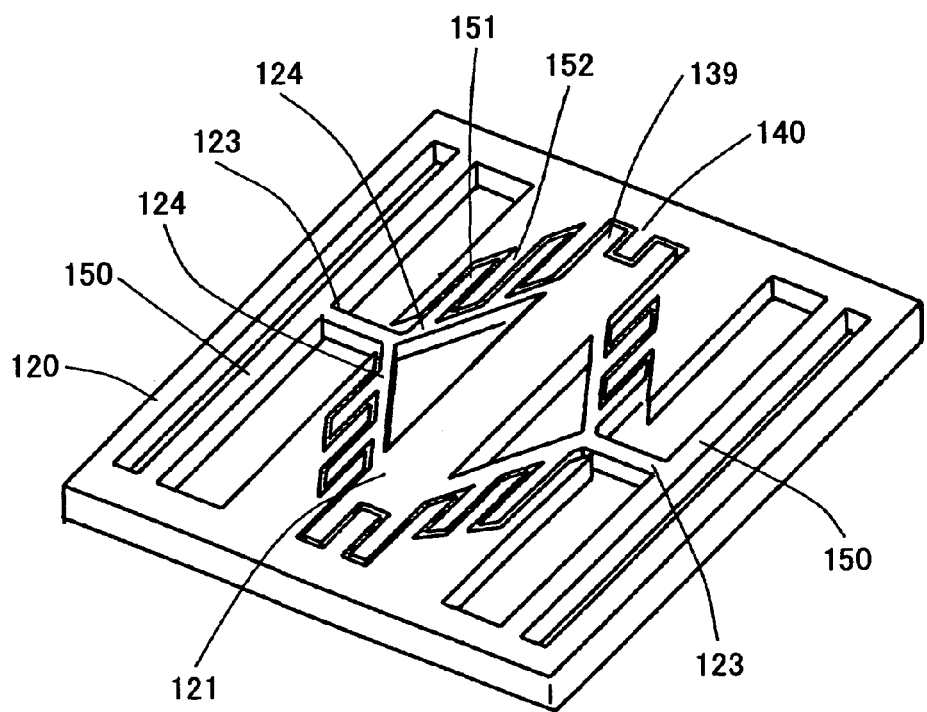
FIG. 49 is a schematic perspective view of a deflector mirror according to a $14^{th}$ embodiment of the present invention.

FIG. 49 is a schematic perspective view of a deflector mirror according to a 14$^{th}$ embodiment of the present invention for illustrating a structure thereof. The deflector mirror according to this embodiment may be realized by a semiconductor process using an SOI substrate as in the above-described seventh embodiment as well as by a semiconductor process using a single silicon substrate as in the above-described 11$^{th}$ embodiment.

As illustrated in FIG. 49, in the deflector mirror according to this embodiment, as in the above-described ninth embodiment, in addition to the movable electrodes 139 formed on the free ends of the mirror substrate 121 and the fixed electrodes 140 formed on the frame 120 so as to engage the movable electrodes 139 through a minute gap, the comb-teeth-like movable electrodes 151 are formed on the joining members 124 so as to extend outward therefrom, and the comb-teeth-like fixed electrodes 152 are formed on the frame 120 so as to engage the movable electrodes 139 through a minute gap.

According to the deflector mirror of this embodiment, a drive pulse is applied between the movable electrodes 139 and the fixed electrodes 140 and between the movable electrodes 151 and the fixed electrodes 152 so that the mirror substrate 121 is driven by the electrostatic torque between the movable and fixed electrodes 139 and 140 and the electrostatic torque between the movable and fixed electrodes 151 and 152. As described above in relation to the above-described ninth embodiment, it is possible to vibrate the mirror substrate 121 at a large deflection angle with low driving voltage.

Although not graphically illustrated, in the deflector mirror according to this embodiment, the mirror substrate 121 may be provided with a flexural rigidity distribution as illustrated in FIG. 25 by forming multiple recesses as described with reference to FIGS. 22 through 25 on the bottom surface of the mirror substrate 121 except the movable electrode part.

15$^{th}$ Embodiment

Figure 50:
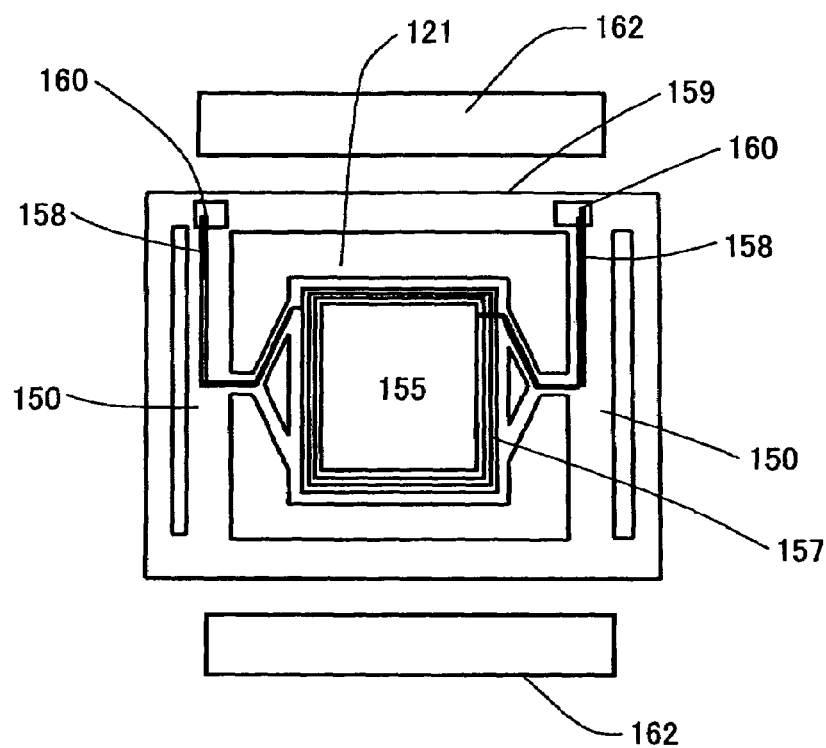
FIG. 50 is a schematic plan view of a deflector mirror according to a $15^{th}$ embodiment of the present invention.
Figure 51:
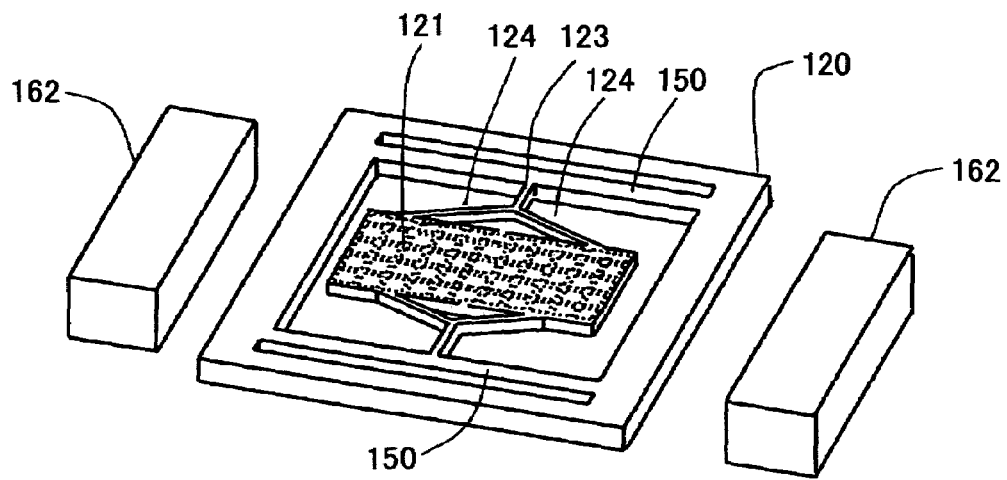
FIG. 51 is a schematic perspective view of the deflector mirror according to the $15^{th}$ embodiment of the present invention.

FIG. 50 is a schematic plan view of a deflector mirror according to a 15$^{th}$ embodiment of the present invention for illustrating a structure thereof. FIG. 51 is a schematic perspective view of the deflector mirror of FIG. 50. The deflector mirror according to this embodiment may be realized by a semiconductor process using an SOI substrate as in the above-described seventh embodiment as well as by a semiconductor process using a single silicon substrate as in the above-described 11$^{th}$ embodiment.

The deflector mirror according to this embodiment is of an electromagnetic driving type. As in the above-described tenth embodiment, in the deflector mirror of this embodiment, the driving coil 157 is formed of, for instance, a thin copper film on the mirror surface side of the mirror substrate 121 so as to go around along the periphery of a mirror surface 155. The lead parts 158 on the respective ends of the driving coil 157 are extended to the electrode pads 160 formed on the frame 120. The deflector mirror of this embodiment includes the paired permanent magnets 162 for generating a static magnetic field substantially parallel to the mirror substrate 121. The permanent magnets 162 may be replaced with electromagnets. As indicated by broken lines in FIG. 51, multiple recesses are formed on the bottom surface of the mirror substrate 121. The driving method is as described above in relation to the tenth embodiment.

[Description of Feature (d)]

The deflector mirror according to the present invention may have a fixed electrode for driving divided into two or more electrodes disposed in positions offset in a direction in which a movable electrode moves. Such a "multi-tier" divided electrode structure makes it possible to increase the deflection angle of the mirror substrate and to stabilize the vibration of the mirror substrate at frequencies deviating from a resonance point.

The deflector mirror according to the present invention may also include a mirror for enlarging the angle of deflection (scanning angle) of a light beam based on the principle of the optical lever, the mirror being provided to oppose the mirror substrate. An incident light beam is reflected back and forth multiple times between the mirror and the mirror substrate. This increases the region of the mirror substrate employed as a mirror surface. Therefore, it is highly necessary that a region of small deflection deformation be increased by controlling dynamic deflection deformation.

A description is given below of examples of the above-described deflector mirror.

16th Embodiment

Figure 52:
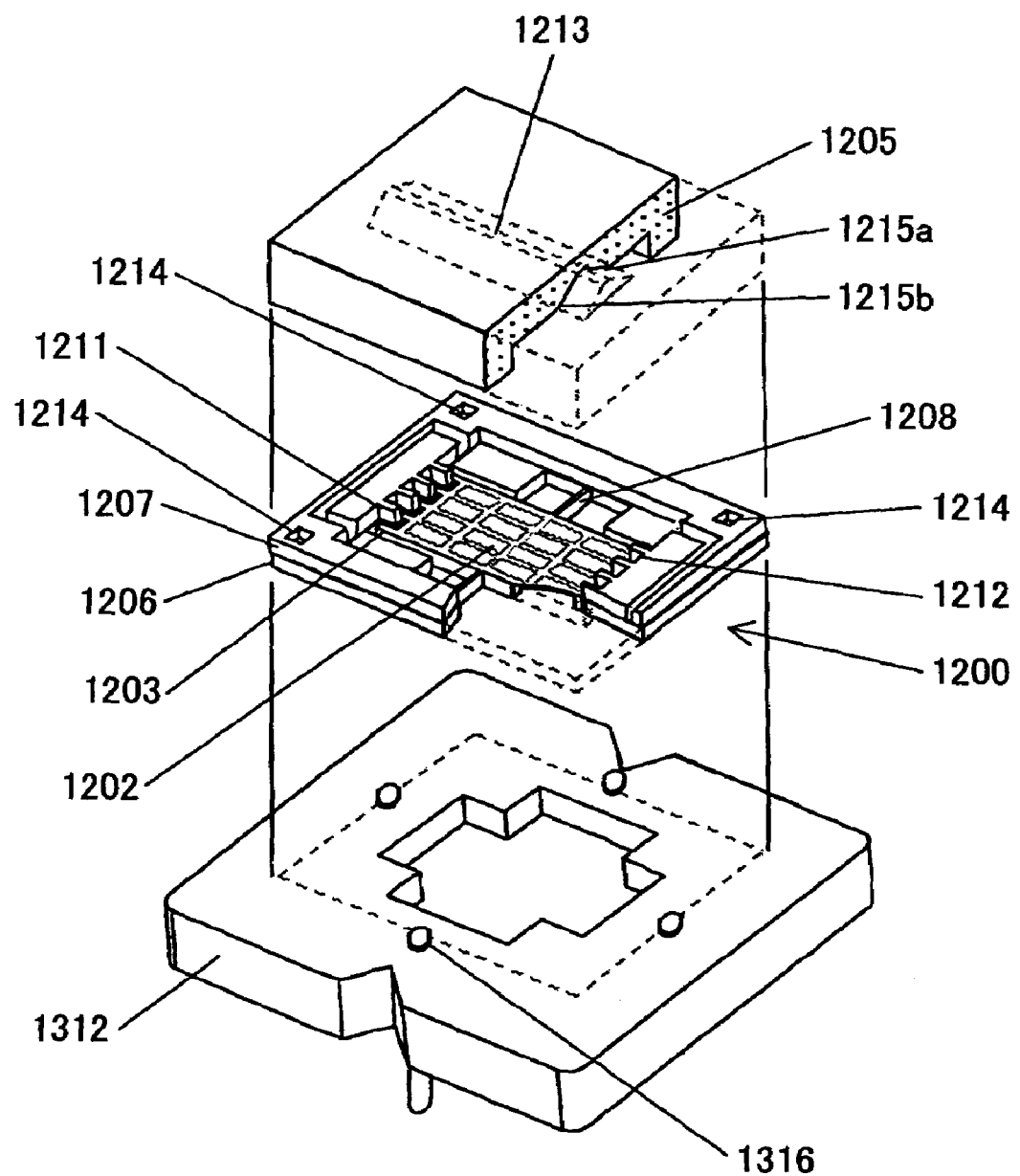
FIG. 52 is a schematic exploded perspective view of a deflector mirror according to a $16^{th}$ embodiment of the present invention.
Figure 53B:
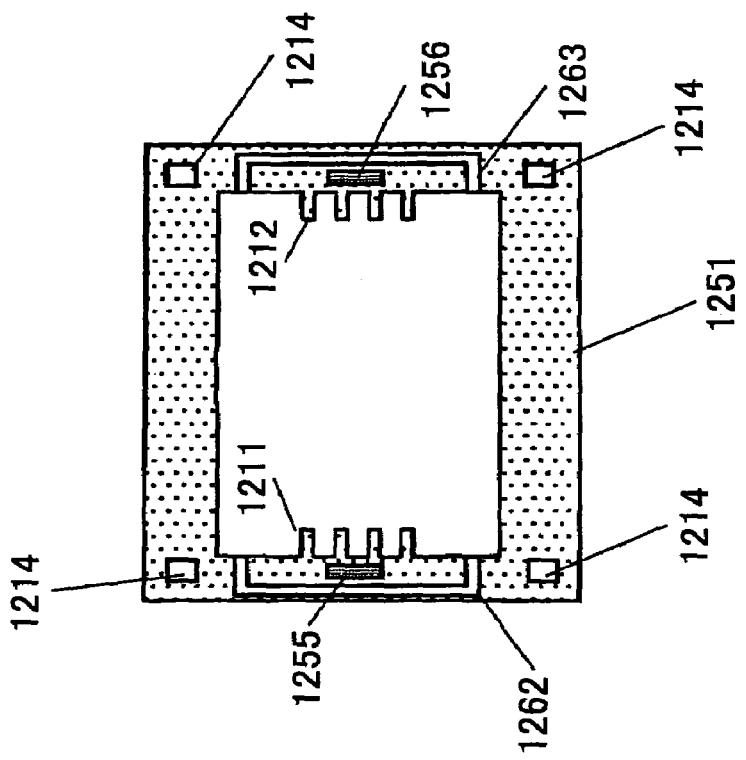
FIGS. 53A and 53B are diagrams for illustrating a structure of a main body of the deflector mirror according to the $16^{th}$ embodiment of the present invention.
Figure 53A:
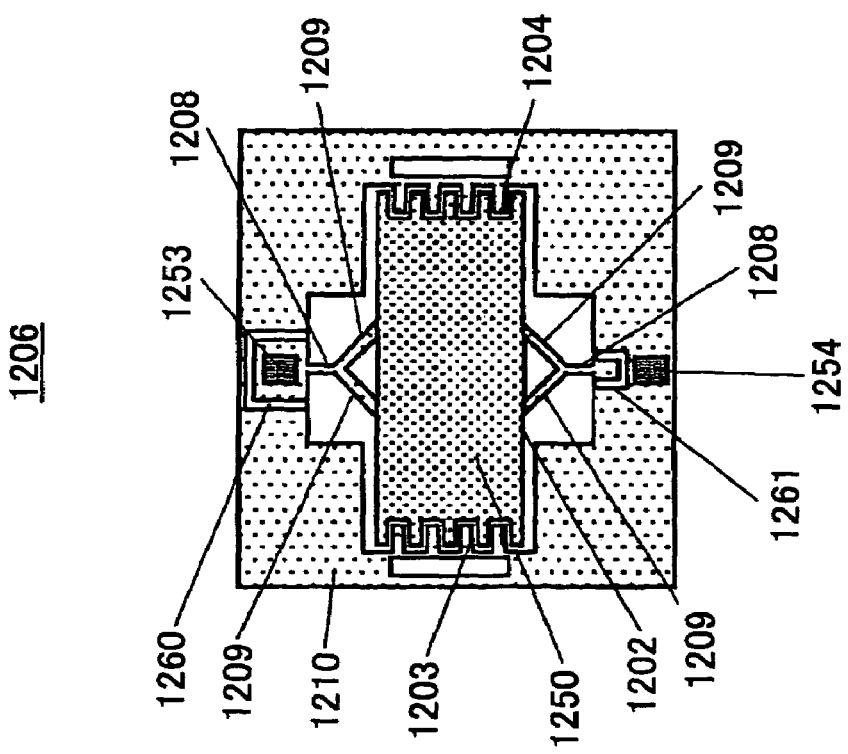

FIG. 52 is a schematic exploded perspective view of a deflector mirror according to a 16th embodiment of the present invention for illustrating the general structure thereof. FIGS. 53A and 53B are schematic plan views for illustrating a structure of a main body 1200 of the deflector mirror of FIG. 52.

The deflector mirror main body 1200 is formed as a unit by etching an SOI substrate into which first and second silicon substrates 1206 and 1207 are joined into through an insulating film such as an oxide film. The deflector mirror of this embodiment has a two-tier fixed electrode structure.

The first silicon substrate 1206 is, for instance, a 60 μm thick low-resistance silicon substrate (conductor). Referring to FIGS. 52 and 53A, a mirror substrate 1202, torsion beams 1208, joining members 1209 joining the unsupported ends of the torsion beams 1208 to the corresponding sides of the mirror substrate 1202, and a frame-like support part 1210 joined to the supported ends of the torsion beams 1208 are integrally formed by etching in the first silicon substrate 1206. Comb-teeth-like movable electrodes 1203 are formed on the free ends of the mirror substrate 1202. First comb-teeth-like fixed electrodes 1204 are formed on the frame-like support part 1210 so as to engage the movable electrodes 1203 through a gap of several μm. A mirror surface 1250 is formed on the surface of the mirror substrate 1202 by vapor-depositing a coat of metal such as Au.

The second silicon substrate 1207 is, for instance, a 140 μm thick low-resistance silicon substrate (conductor). Referring to FIGS. 52 and 53B, second comb-teeth-like fixed electrodes 1211 and 1212, planarly overlapping the first fixed electrodes 1204, and a frame-like support part 1251 are formed as a unit by etching in the second silicon substrate 1207.

An oxide film on the surface of part of the frame-like support part 1210 is partially etched in a concave manner so as to expose a silicon surface. This part serves as an electrode pad 1253 of the movable electrodes 1203 and an electrode pad 1254 of the first fixed electrodes 1204. Further, an oxide film on part of the frame-like support part 1251 is etched in a concave manner until the frame-like support part 1251 is reached, so that silicon is exposed. This part serves as electrode pads 1255 and 1256 of the second fixed electrodes 1211 and 1212. Slit grooves 1260 and 1261 for isolating the movable electrodes 1203 and the first fixed electrodes 1204 are formed in the frame-like support part 1210. Slit grooves 1262 and 1263 for isolating the second fixed electrodes 1211 and 1212 are formed in the frame-like support part 1251. These slit grooves 1260 through 1263 communicate with the vibration space of the mirror substrate 1202.

A cover substrate 1205, formed of a transparent insulating material such as glass, is joined to the frame-like support part 1251 of the deflector mirror main body 1200. A base substrate 1312 is joined to the frame-like support part 1210. As a result, the vibration space of the mirror substrate 1202 is hermetically sealed. A non-evaporable getter is provided in one of the slit grooves 1260 through 1263 communicating with the vibration space of the mirror substrate 1202. The vibration space of the mirror substrate 1202 is maintained in a reduced-pressure state of 1 torr or less by activating the non-evaporable getter by external heating.

A light beam enters and exits through a slit window 1213 formed in the cover substrate 1205. A roof mirror is formed on the internal surface of the cover substrate 1205. The roof mirror includes a pair of mirror surfaces 1215a and 1215b opposing the mirror surface 1250 on the mirror substrate 1202 and extending in a direction perpendicular to the torsion beams 1208. The mirror surfaces 1215a and 1215b of the roof mirror are formed by vapor-depositing a coat of metal on the surfaces inclined at angles of 9° and 26.3°, respectively, to the substrate surface so that the mirror surfaces 1215a and 1215b form an angle of 144.7° in a roof-like manner with the slit window 1213 being interposed therebetween.

The cover substrate 1205 and the deflector mirror main body 1200 require precise alignment. Accordingly, alignment indexes 1214 are formed by etching in the four corners of the frame-like support part 1251 of the deflector mirror main body 1200. The roof mirror and the deflector mirror main body 1200 can be aligned with precision in the main scanning direction by aligning the edge of the cover substrate 1205 with the indexes 1214.

Lead terminals 1316 serving as an electric connection part in mounting the base substrate 1312 on a circuit board are provided on the base substrate 1312. The lead terminals 1316 and the concave electrode pads on the deflector mirror main body 1200 side are electrically connected by, for instance, solder balls.

A description is given below of an operation of the deflector mirror according to this embodiment. The movable electrodes 1203 are grounded. Voltage pulse signals in phase with each other are applied to the two first fixed electrodes 1204. A voltage pulse signal advanced in phase with respect to the voltage pulse signals of the first fixed electrodes 1204 is applied to the second fixed electrode 1211. A voltage pulse signal delayed in phase with respect to the voltage pulse signals of the first fixed electrodes 1204 is applied to the second fixed electrode 1212.

Figure 54:
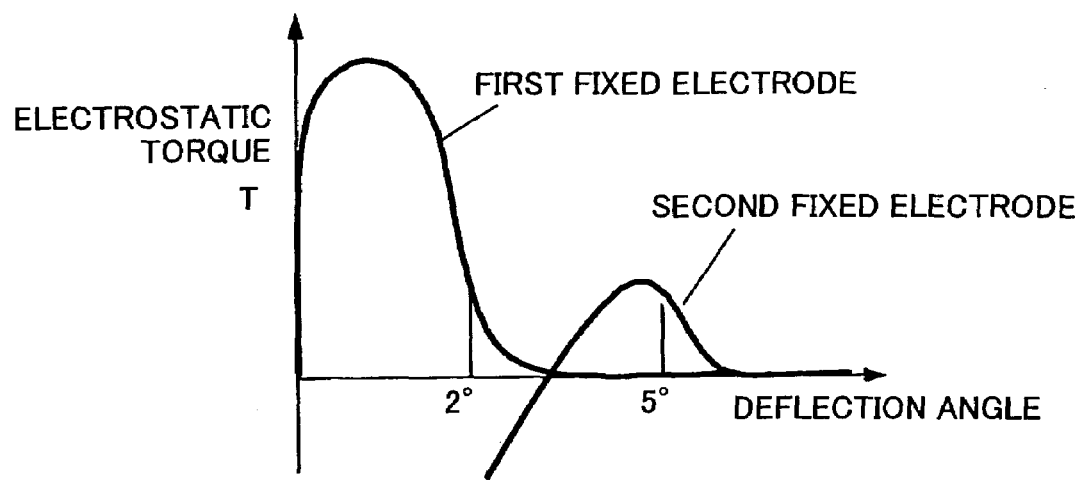
FIG. 54 is a graph of the relationship between electrostatic torque by driving electrodes of the deflector mirror and the deflection angle thereof according to the $16^{th}$ embodiment of the present invention.
Figure 55:
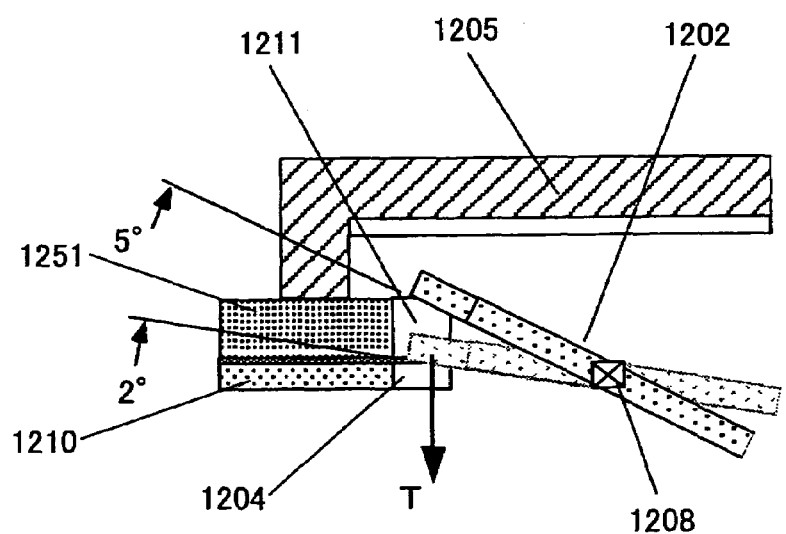
FIG. 55 is an enlarged view of an electrode part of the deflector mirror for illustrating the relationship between electrostatic torque by two-tier structure fixed electrodes and the deflection angle according to the 16$^{th}$ embodiment of the present invention.

FIG. 54 is a graph illustrating the electrostatic torque generated between the movable electrodes 1203 and the first electrodes 1204 and between the movable electrodes 1203 and the second electrodes 1211 and 1212 in correspondence to the deflection angle of the mirror substrate 1202. FIG. 55 is an enlarged view of an electrode part of the deflector mirror. In FIG. 55, the electrostatic torque in the counterclockwise direction is electrostatic torque in the positive direction.

The mirror substrate 1202 is horizontal in its initial state. When voltage is applied to the fixed electrode 1211, electrostatic torque in the negative direction is generated between the fixed electrode 1211 and the opposing (corresponding) movable electrode 1203, so that the mirror substrate 1202 rotates, twisting the torsion beams 1208, and is inclined up to a deflection angle balancing with the returning force of the torsion beams 1208. When the application of voltage is stopped, the mirror substrate 1202 returns to the horizontal position because of the returning force of the torsion beams 1208. By applying voltage to the first fixed electrodes 1204 immediately before the mirror substrate 1202 returns to the horizontal position, electrostatic torque in the positive direction is generated, so that the mirror substrate 1202 is accelerated. The electrostatic torque in the positive direction is further increased by a subsequent application of voltage to the fixed electrode 1212. By repeating such an operation of switching fixed electrodes to which voltage is applied, the mirror substrate 1202 can be caused to vibrate in a reciprocating manner at a deflection angle (approximately 2° in this embodiment) at which the movable electrodes 1203 pass the first fixed electrodes 1204.

Here, designing is performed so that the band of the first mode of resonance employing the torsion beams 1208 as a torsional rotary shaft is entered, setting the moment of inertia of the mirror substrate 1202 and the width and length of each torsion beam 1208 to a desired driving frequency. Thereby, the vibration amplitude can be increased up to a deflection angle at which the corresponding movable electrode 1203 passes the second fixed electrode 1211. As a result, even at a deflection angle passing the second fixed electrode 1211, electrostatic torque in a direction to return the mirror substrate 1202 to a horizontal position, that is, an electrostatic torque force in the positive direction at the second fixed electrode 1211, is generated, so that the deflection angle range in which electrostatic torque works can be expanded. Therefore, according to a "two-tier" electrode structure as in this embodiment, it is possible to cause vibration at a large deflection angle even at driving frequencies deviating from a resonance point.

Figure 56:
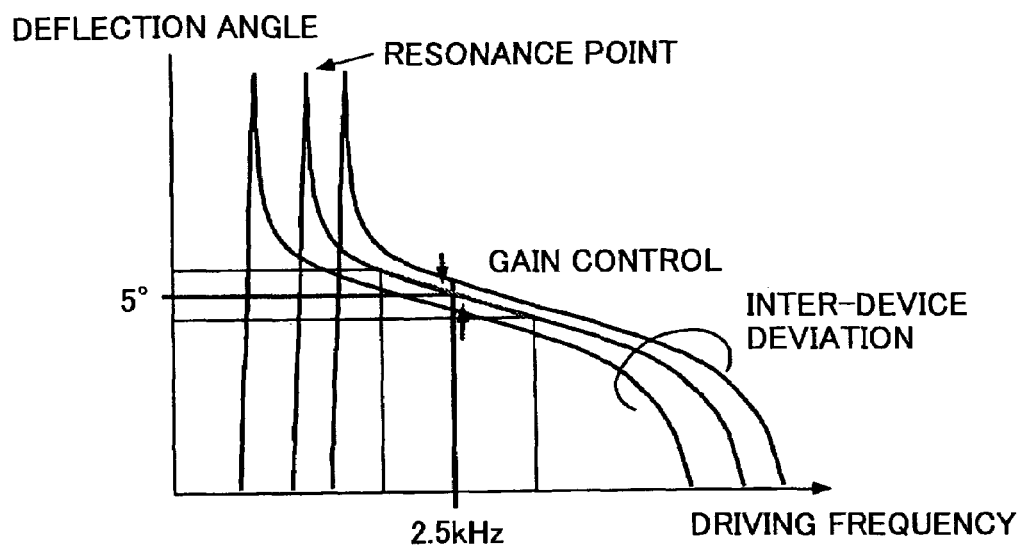
FIG. 56 is a graph of the relationship between a driving frequency and the deflection angle in the deflector mirror of two-tier electrode structure according to the 16$^{th}$ embodiment of the present invention.

FIG. 56 is a graph illustrating a deflection angle characteristic with respect to a driving frequency. FIG. 56 shows that the deflection angle is maximized when the driving frequency coincides with a resonance point but sharply changes around the resonance point. That is, the driving frequency of the fixed electrode can be set to coincide with the resonance point at the stage of activation, but the deflection angle decreases sharply if the resonance point changes because of a change in temperature, thus resulting in poor stability over time. Further, in the case of using multiple deflector mirrors, the deflector mirrors vary in their resonance points. Accordingly, it is impossible to drive all the deflector mirrors at a common driving frequency if the deflector mirrors are to be driven at their respective resonance points.

Accordingly, the deflector mirror (mirror substrate) can be driven at a stable deflection angle by setting a driving frequency in a frequency band higher than a resonance point in the vicinity thereof, the resonance point being characteristic of the vibration system formed of the mirror substrate and the torsion beams. In this embodiment, as illustrated in FIG. 56, a deflector mirror having a resonance point of, for instance, 2 kHz, was caused to vibrate stably at deflection angles of ±5° by setting its driving frequency to 2.5 kHz and controlling the voltage value (gain) of a voltage pulse signal to be applied. At this point, it is desirable to set the driving frequency within a frequency band in which the driving frequency does not coincide with any resonance point even if there is a variation in the resonance point due to processing error in the deflector mirror (300 Hz in this embodiment) and there is a change in the resonance point due to temperature (3 Hz in this embodiment). For instance, if the resonance point is 2 kHz, it is desirable to set the driving frequency to values higher than or equal to 2.303 kHz or to values lower than or equal to 1.697 kHz.

Letting the dimensions of the mirror substrate be 2a in length, 2b in width, and d in thickness, letting the length and the width of a torsion beam part be L and c, respectively, and letting the density of the silicon substrate and a material constant be ρ and G, respectively, the moment of inertia I and a spring constant K are given as follows:

$$I = (4ab\rho d/3) \cdot a^2, \quad (12)$$

$$K = (G/2L) \cdot \{cd(c^2 + d^2)/12\}, \quad (13)$$

and a resonant frequency f is given by $$f = (1/2\pi) \cdot (k/I)^{1/2} \quad (14)$$
$$= (1/2\pi) \cdot \{Gcd(c^2 + d^2)/24LI\}^{1/2}.$$

Since there is proportionality between the length L of the torsion beam and a deflection angle θ, the deflection angle θ is given by $$\theta = A/I \cdot f^2, \quad (15)$$

where A is a constant. The deflection angle θ is inversely proportional to the moment of inertia I. In order to increase the resonant frequency f, it is necessary to reduce the moment of inertia I. Otherwise, the deflection angle θ is reduced.

Therefore, according to this embodiment, on the bottom surface of the mirror substrate 1202 on the opposite side from the mirror surface 1250, a matrix-like rib having the same thickness as the substrate thickness d is left by thinning by etching the remaining part until its thickness is reduced to d/10 or less. Thereby, the moment of inertia I is reduced to approximately one fifth.

Meanwhile, letting the dielectric constant of air, electrode length, applied voltage, and inter-electrode distance be ∈, H, V, and δ, respectively, the electrostatic force between electrodes F is given by $$F = \in \cdot H \cdot V^2 / 2\delta, \quad (16)$$

and the deflection angle θ is also given by $$\theta = B \cdot F/I, \quad (17)$$

where B is a constant. Accordingly, the deflection angle θ increases as the electrode length H increases. Therefore, according to this embodiment, the electrodes are shaped like comb teeth, so that with respect to the number of comb teeth n, 2n driving torque is obtained. By thus increasing the electrode length by increasing the perimeter as much as possible, greater electrostatic torque can be obtained with low voltage.

Letting air density be η with respect to the velocity v and the area E of the mirror substrate, air viscosity resistance P is given by $$P = C \cdot \eta \cdot v^2 \cdot E^3, \quad (18)$$

which serves as a load on the rotation of the mirror substrate. In Eq. (18), C is a constant. Accordingly, it is desirable to seal the vibration space of the mirror substrate in a reduced-pressure state. Therefore, according to this embodiment, a non-evaporable getter is provided in one of the slit grooves 1260 through 1263 communicating with the vibration space of the mirror substrate 1202, and the vibration space of the mirror substrate 1202 is maintained in a reduced-pressure state of 1 torr or less by activating the non-evaporable getter by heating the non-evaporable getter externally. By sealing the vibration space of the mirror substrate in a reduced-pressure state, the viscosity resistance of the mirror substrate at the time of its vibration can be reduced, so that the mirror substrate can be caused to vibrate at a large deflection angle by low driving energy. Further, it is possible to prevent a foreign material such as dust from entering the vibration space of the mirror substrate, so that the reliability of the deflector mirror can be increased.

Figure 57:
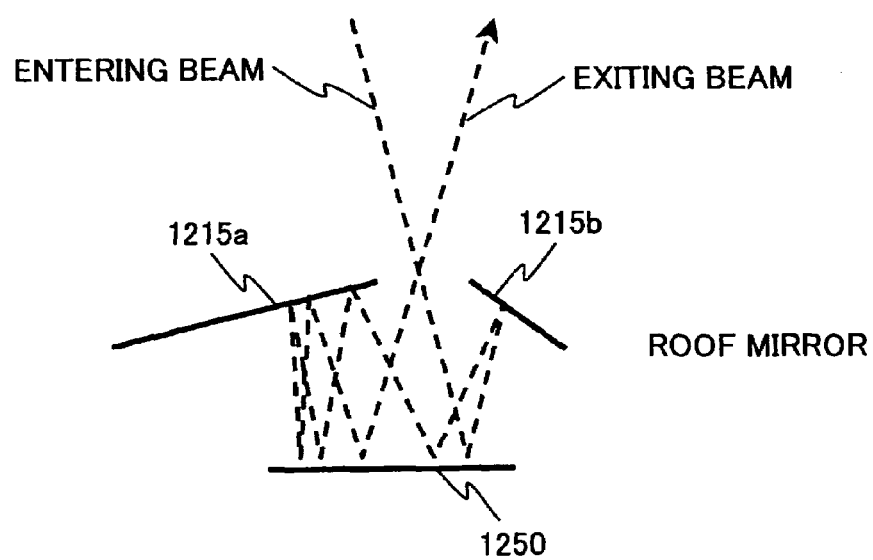
FIG. 57 is a diagram for illustrating multiple reflections by a mirror substrate and half mirrors according to the 16$^{th}$ embodiment of the present invention.

In the deflector mirror according to this embodiment, a light beam enters and exits through the slit window 1213 formed in the cover substrate 1205. It is assumed that a light beam enters the cover substrate 1205 at an angle of 20° to a normal in a sub scanning cross section including the torsion beams 1208. As illustrated schematically in FIG. 57, the light beam reflected from the mirror surface 1250 is made incident on the opposing mirror surface 1215b to be reflected therefrom toward the mirror surface 1250. The light beam reflected from the mirror surface 1250 passes the slit window 1213 to be made incident on the opposing mirror surface 1215a. While traveling back and forth three-times between the mirror surface 1215a and the mirror surface 1250, the light beam shifts the reflection position gradually in the sub scanning direction, and exits from the slit window 1213. The light beam is reflected by the mirror surface 1250 five times in total before going out from the slit window 1213.

Thus, in the deflector mirror according to this embodiment, a light beam is reflected multiple times between the mirror surface 1250 of the mirror substrate 1202 and the mirror surfaces 1215a and 1215b of the roof mirror. As a result, the angle of deflection (scanning angle) of the light beam can be greater than the deflection angle of the mirror substrate 1202. Letting the total number of reflections and the deflection angle be N and $\alpha$, respectively, the scanning angle $\theta$ is $2N\alpha$. In this embodiment, N=5 and $\alpha$=5°. Accordingly, the maximum scanning angle is 50°.

Further, the point of reflection of the light beam shifts on the mirror surface 1250 of the mirror substrate 1202 in the sub scanning direction. Therefore, the deflection deformation of the mirror substrate 1202 in the region of the shifting (that is, the deflection deformation of the mirror surface 1250) degrades the optical characteristics of an exiting light beam. According to this embodiment, by joining the unsupported end of each torsion beam 1208 to the corresponding side of the mirror substrate 1202 through the corresponding pair of the joining members 1209, it is possible to expand a region of small deflection deformation in the mirror substrate 1202 and to reduce deflection in the region. Accordingly, the optical characteristics of the exiting beam are improved.

In the deflector mirror main body 1200 according to this embodiment, the electrode pads 1255 and 1256 of the second fixed electrodes 1211 and 1212 are formed in a plane different from a plane in which the electrode pad 1254 of the first fixed electrodes 1204 is formed. Alternatively, all electrode pads may be formed in the same plane. A description is given, with reference to FIGS. 58 and 59, of such a configuration.

Figure 58:
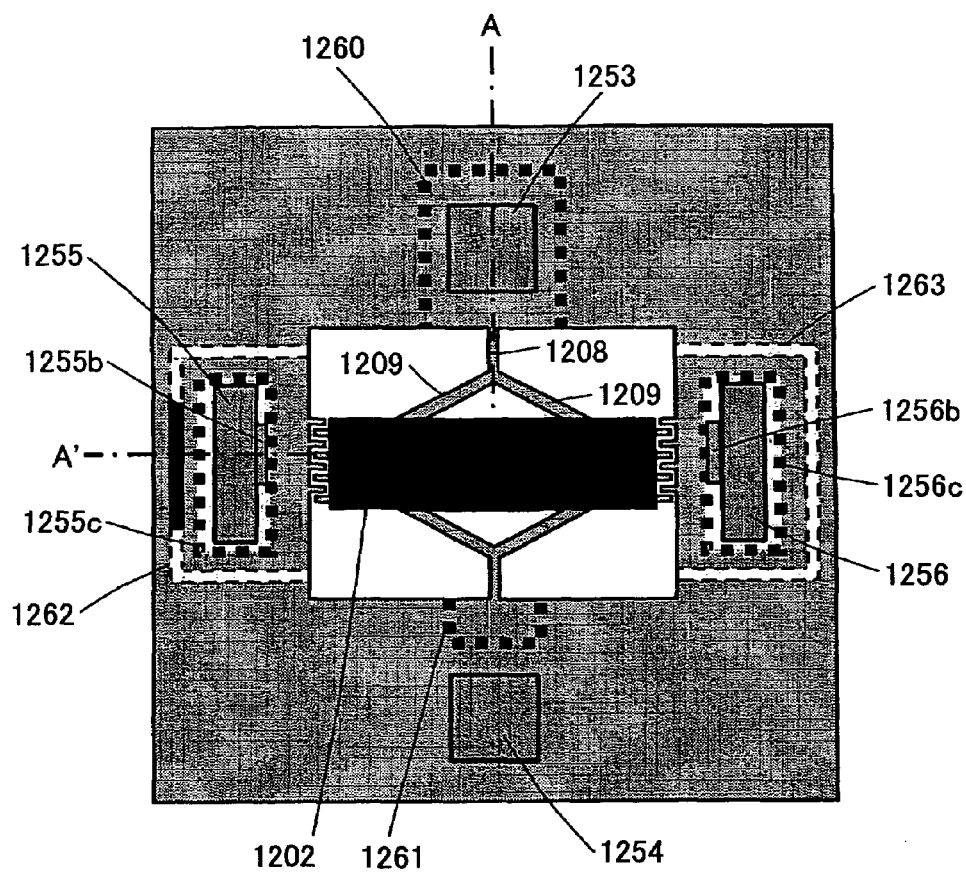
FIG. 58 is a diagram for illustrating a variation of a deflector mirror main body according to the 16$^{th}$ embodiment of the present invention.
Figure 59:
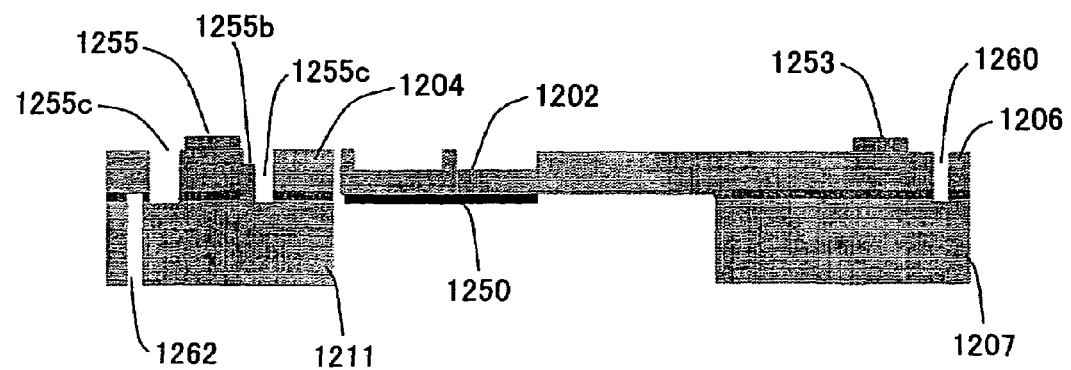
FIG. 59 is a schematic cross-sectional view of the deflector mirror main body of FIG. 58 taken along the line A-A' according to the 16$^{th}$ embodiment of the present invention.

FIG. 58 is a schematic plan view of the deflector mirror main body 1200, taken from the first silicon substrate 1206 side. FIG. 59 is a schematic cross-sectional view of the deflector mirror main body 1200 of FIG. 58 taken along the line A-A'. In a variation illustrated in FIGS. 58 and 59, like the electrode pad 1253 for the movable electrodes 1203 and the electrode pad 1254 for the first fixed electrodes 1204, the electrode pads 1255 and 1256 for the second fixed electrodes 1211 and 1212 are formed on the surface of the first silicon substrate 1206. The electrode pads 1255 and 1256 are electrically connected to the second fixed electrodes 1211 and 1212, respectively, by conductive materials 1255b and 1256b penetrating through the first silicon substrate 1206 to reach the second silicon substrate 1207. Further, slit grooves 1255c and 1256c for isolating the electrode pads 1255 and 1256 from the other part are formed in the first silicon substrate 1206. A configuration where all electrode pads are formed in the same plane as in this variation improves the reliability of a mounting process including sealing, and facilitates a mounting process including external electric connection.

Further, in the deflector mirror main body 1200 according to this embodiment, it is also possible to provide movable electrodes on the joining members 1209 between the torsion beams 1208 and the mirror substrate 1202 and to provide fixed electrodes of a "two-tier" structure corresponding thereto. A description is given, with reference to FIGS. 60A through 61B, of such a configuration. In FIGS. 60A through 61B, the same elements as those of FIGS. 53A and 53B are referred to by the same numerals, and a description thereof is omitted.

Figure 60A:
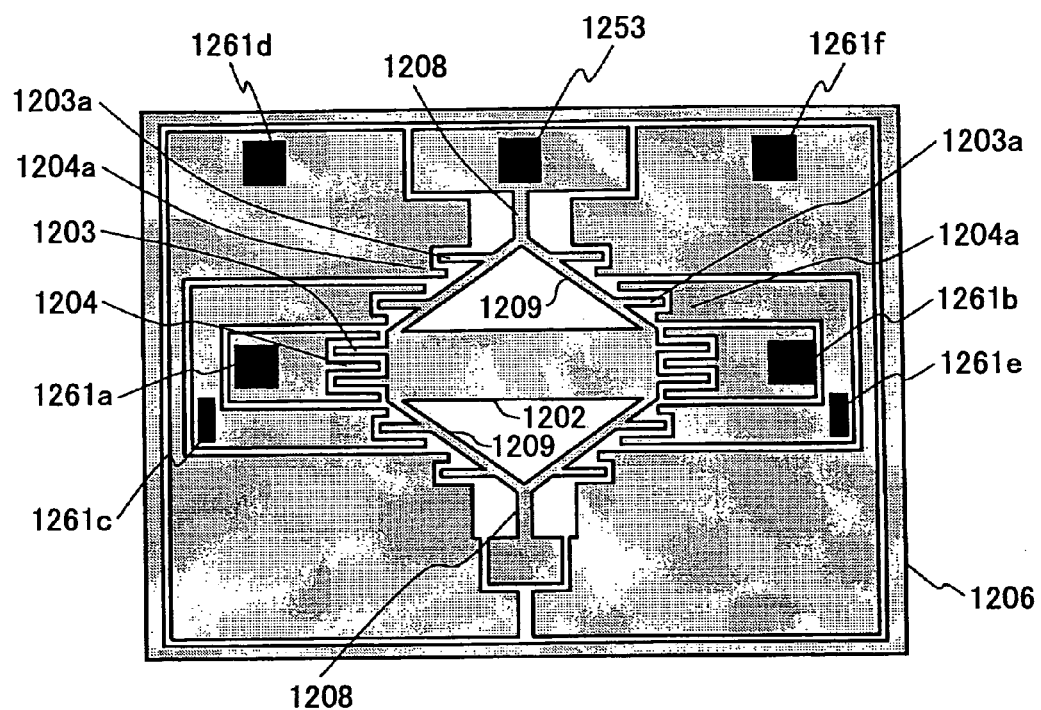
FIGS. 60A and 60B are diagrams for illustrating another variation of the deflector mirror main body according to the 16$^{th}$ embodiment of the present invention.
Figure 60B:
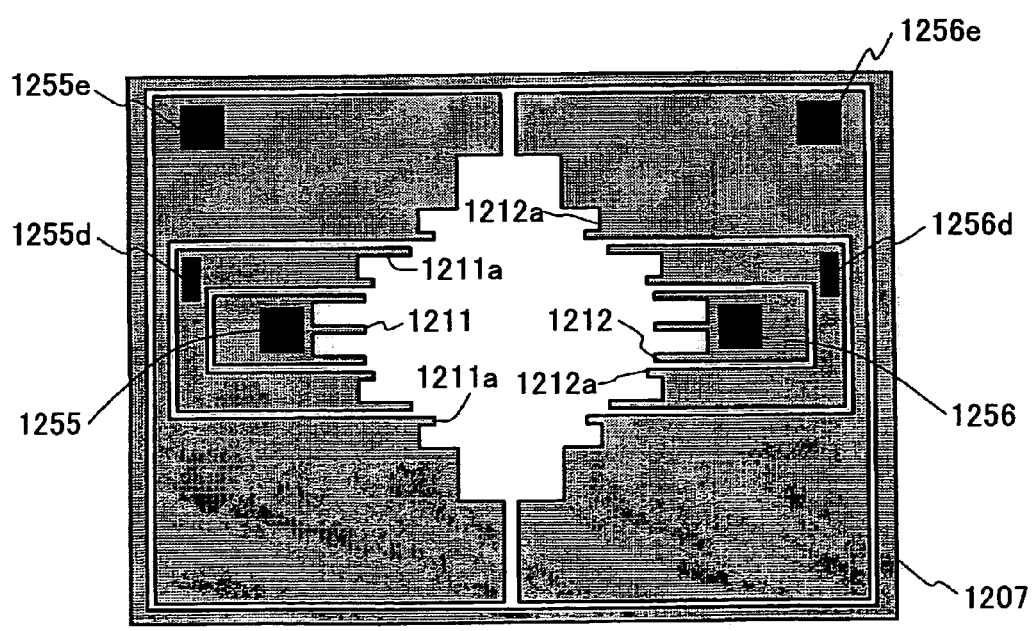

In a variation illustrated in FIGS. 60A and 60B, movable electrodes 1203a are formed on the joining members 1209 so as to extend outward therefrom, and comb-teeth-like fixed electrodes (first fixed electrodes) 1204a corresponding to the movable electrodes 1203a are formed on the frame-like support part 1210 in a silicon substrate (referred to by reference numeral 1206 in FIG. 60A for convenience of description) corresponding to the first silicon substrate 1206 as illustrated in FIG. 60A. The part of the added fixed electrodes 1204a is divided into multiple portions isolated and separated from each other by slit grooves in a direction toward the rotation center axis of the mirror substrate 1202, and electrode pads 1261c through 1261f for the divided portions are formed as illustrated in FIG. 60A. As illustrated in FIG. 60B, fixed electrodes (second fixed electrodes) 1211a and 1212a corresponding to the fixed electrodes 1204a added to the first silicon substrate are formed in a silicon substrate (referred to by reference numeral 1207 in FIG. 60B for convenience of description) corresponding to the second silicon substrate 1207. The part of the fixed electrode 1211a and the part of the fixed electrode 1212a are also divided into multiple portions isolated and separated from each other by slit grooves in a direction toward the rotation center axis of the mirror substrate 1202. Electrode pads 1255d, 1255e, 1256d, and 1256e for the respective divided portions are formed.

In this variation, the driving electrodes are provided so as to surround the mirror substrate 1202. This increases the electrode area, thus resulting in an increase in electrostatic torque. Further, as described above in relation to the eighth embodiment, the movable electrodes 1203a provided on the joining members 1209 are positioned close to the rotation center axis of the mirror substrate 1202, so that a decrease in electrostatic torque is small even when the deflection angle of the mirror substrate 1202 is large. This is also favorable for increasing the deflection angle. Further, since the fixed electrodes 1204a, 1211a, and 1212a are divided into multiple portions in a direction toward the rotation center axis of the mirror substrate 1202, driving timing can be controlled divided portion by divided portion. By performing such control appropriately, electrostatic torque can be exerted continuously from a point at which the deflection angle of the mirror substrate 1202 is small to a point at which the deflection angle of the mirror substrate 1202 is large. Thus, the mirror substrate 1202 can be driven with efficiency.

Figure 61A:
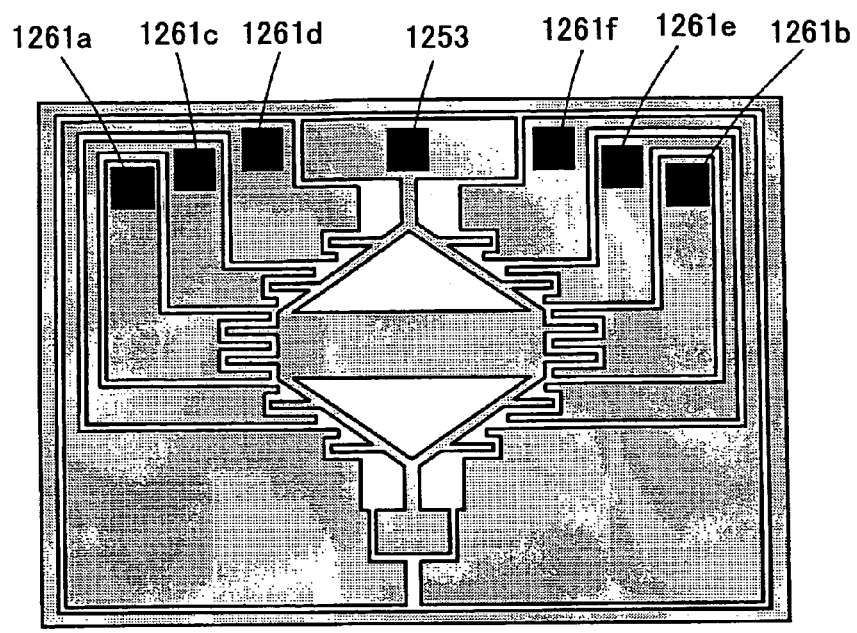
FIGS. 61A and 61B are diagrams for illustrating another variation of the deflector mirror main body according to the 16$^{th}$ embodiment of the present invention.
Figure 61B:
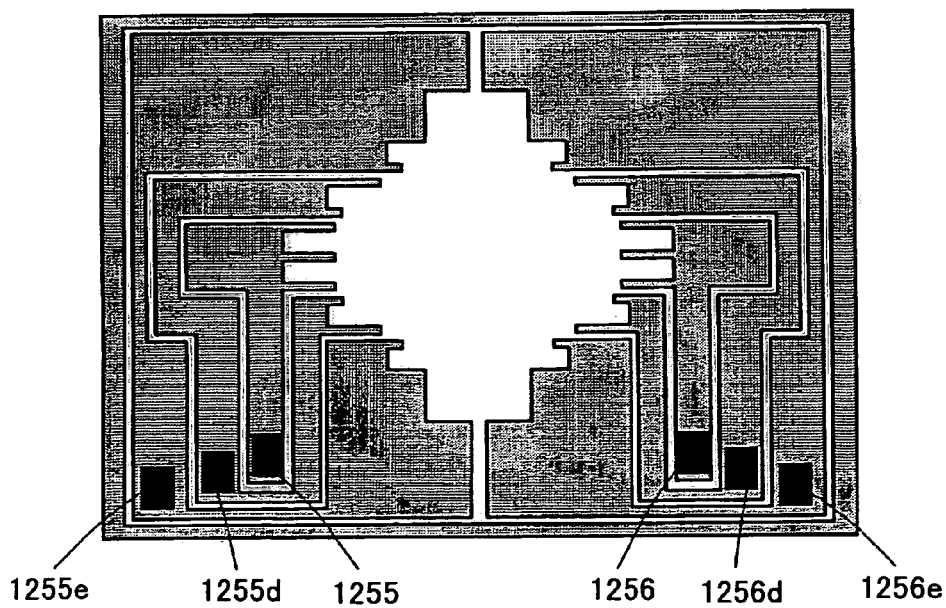

A variation illustrated in FIGS. 61A and 61B is different from the variation illustrated in FIGS. 60A and 60B in that the electrode pads of the movable electrodes and the fixed electrodes are concentrated along one side of each silicon substrate. This configuration facilitates external connection of the electrode pads at the time of mounting. As is apparent from a comparison between FIGS. 61A and 61B, the island-like regions separated by the slit grooves of the two silicon substrates are positioned so as to cross each other. This increases the strength (substrate strength) of the deflector mirror main body 1200.

In this embodiment and the above-described variations, the supported end of each torsion beam 1208 may also be supported so as to have rotational elasticity as in the above-described $12^{th}$, $13^{th}$, and $14^{th}$ embodiments. Further, the deflector mirror main body 1200 of this embodiment may be replaced with any of the deflector mirrors according to the above-described seventh through $15^{th}$ embodiments.

[Description of Feature (e)]

An optical scanning device according to the present invention employs the above-described deflector mirror according to the present invention as an optical deflection part. The optical scanning device according to the present invention enjoys good light beam optical characteristics, and can have a large angle of deflection (scanning angle). Accordingly, the optical scanning device according to the present invention is suitable for reading scanning in an image scanner and optical writing scanning in an image forming apparatus. An image forming apparatus according to the present invention employs one or more optical scanning devices according to the present invention as an optical writing scanning part.

According to the optical scanning device according to the present invention, it is possible to scan a scanned surface (a surface to be scanned) with a light beam having good optical characteristics, and it is also possible to perform high-speed scanning by reciprocating scanning. Further, the optical scanning device according to the present invention is superior in silence and power saving to the conventional optical scanning device using a polygon mirror.

According to the image forming apparatus according to the present invention, it is possible to form a high-quality image by performing optical writing on a photosensitive body with a light beam having good optical characteristics. Further, since it is possible to perform high-speed optical writing by reciprocating scanning, it is possible to form an image at high speed. Further, the image forming apparatus according to the present invention is superior in silence and power saving to the conventional image forming apparatus employing the optical scanning device using a polygon mirror.

$17^{th}$ Embodiment

Figure 62:
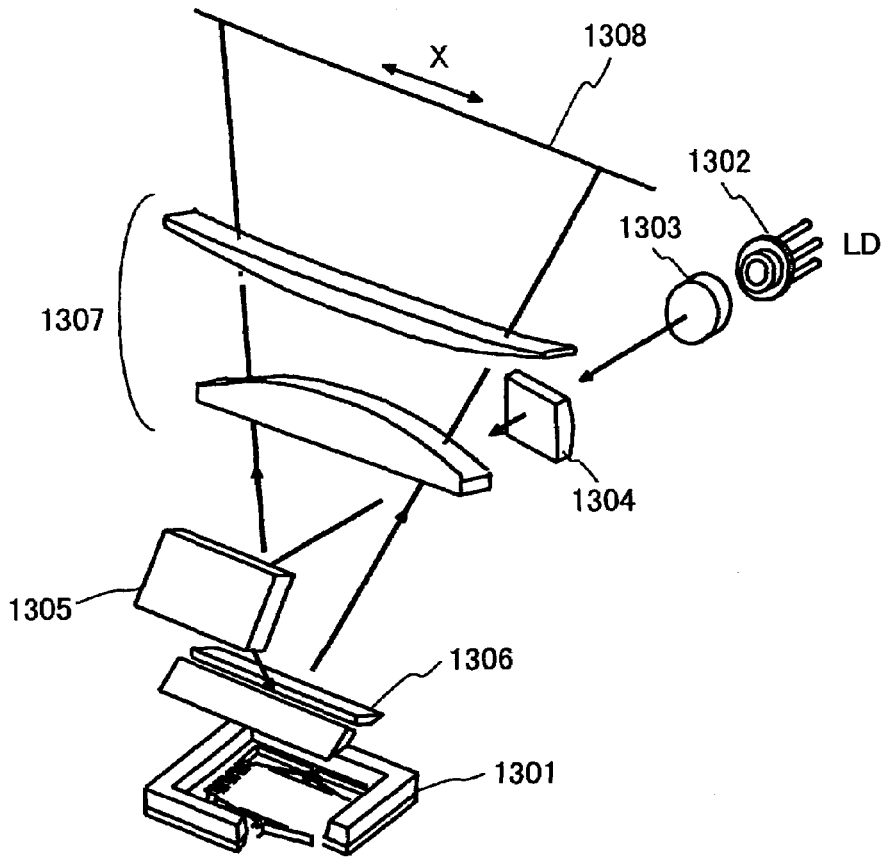
FIG. 62 is a diagram illustrating a basic configuration of an optical scanning device according a 17$^{th}$ embodiment of the present invention.

FIG. 62 is a diagram illustrating a basic configuration of an optical scanning device according a $17^{th}$ embodiment of the present invention. The optical scanning device of this embodiment includes a deflector mirror 1301, which is a deflector mirror according to the present invention. The deflector mirror 1301 is of a type without a built-in roof mirror. A laser light beam emitted from a semiconductor laser 1302 serving as a light source travels through an optical system formed of a coupling lens 1303, a cylindrical lens 1304, and an entrance mirror 1305 so as to be made incident on the mirror surface of the deflector mirror 1301 through the slit window of the roof mirror 1306. After being reflected multiple times between the mirror surface of the deflector mirror 1301 and the roof mirror 1306, the incident laser light beam exits from the slit window of the roof mirror 1306 so as to be focused into a spot on a scanned surface (a surface to be scanned) 1308 by an imaging optical system 1307 (a correction optical system) including an fθ lens. This scanning spot moves in the main scanning direction X in accordance with the reciprocating vibration of the mirror substrate of the deflector mirror 1301.

According to the deflector mirror 1301 of this embodiment, the dynamic deflection deformation of the mirror substrate is controlled with efficiency, so that a region of small dynamic deflection expands in the mirror substrate (that is, on a mirror surface on the mirror substrate), and the dynamic deflection in the region is reduced. This results in good optical characteristics (such as a beam diameter) of a reflected laser light beam. Accordingly, the scanned surface 1308 can be optically scanned with high accuracy.

In the case of employing a deflector mirror with a built-in roof mirror, such as the deflector mirror according to the $16^{th}$ embodiment, as the deflector mirror 1301, the external roof mirror 1306 is omitted. Further, the optical scanning device may also be configured without the roof mirror 1306 even in the case of using the deflector mirror 1301, which does not have a built-in roof mirror.

$18^{th}$ Embodiment

Next, a description is given of another optical scanning device according to the present invention, and an image forming apparatus using the optical scanning device for optical writing scanning.

Figure 63:
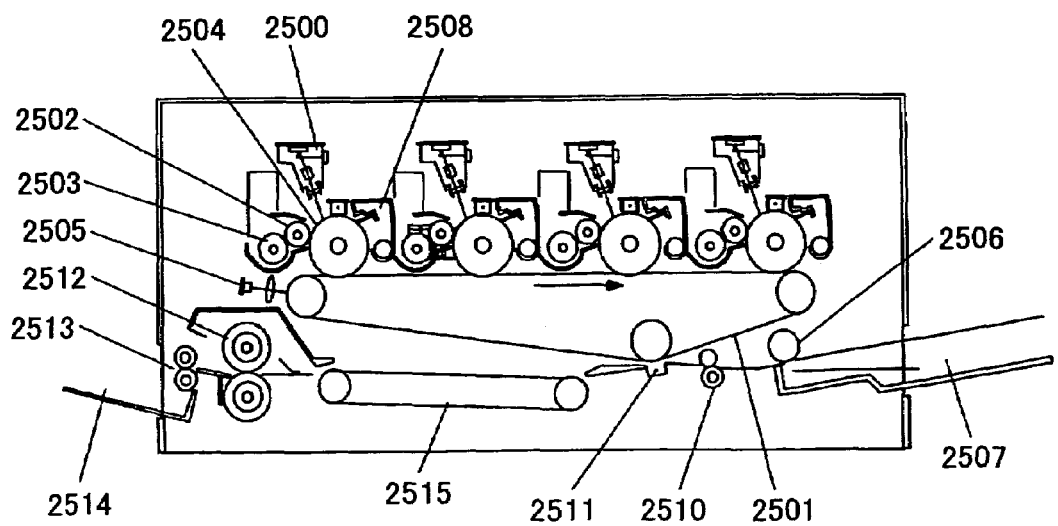
FIG. 63 is a schematic diagram of an image forming apparatus according to an 18$^{th}$ embodiment of the present invention.

FIG. 63 is a schematic diagram of an image forming apparatus (laser printer) according to an $18^{th}$ embodiment of the present invention. The image forming apparatus is of a tandem type, including stations of four colors of cyan, magenta, yellow, and black. In each station, an optical scanning device 2500 according to this embodiment performs optical writing scanning on a corresponding photosensitive body drum (an image carrier) 2504 using a laser light beam modulated by a recording signal, thereby forming an electrostatic latent image on the photosensitive body drum 2504. The electrostatic latent images formed on the photosensitive body drums 2504 are developed into toner images of the respective different colors. The toner images are superposed one on the other on a transfer belt 2501 to be transferred to a recording medium. The transfer belt 2501 moves, being supported by a driving roller and two driven rollers. The photosensitive body drums 2504 are arranged at equal intervals along a direction in which the transfer belt 2501 moves. A development roller 2502 and a toner hopper unit 2503 supplying toner of a corresponding one of the colors of yellow, magenta, cyan, and black are provided around each photosensitive body drum 2504. Further, a cleaning unit 2508 is provided integrally with each photosensitive body drum 2504. The cleaning unit 2508 scrapes off, with a blade, toner remaining on the photosensitive body drum 2504 after transfer of the toner image, and stores the scraped-off toner.

Using the signal of a sensor 2505 detecting registration marks formed on the ends of the transfer belt 2501 as a trigger, the optical scanning devices 2500 write the electrostatic latent images of the respective colors with different writing start timings in the sub scanning direction. Toner is put on the electrostatic latent images in the respective development parts, and the toner images are successively superposed one on the other on the transfer belt 2501. Paper is fed from a paper feed tray 2507 by a paper feed roller 2506, and is sent out by a registration roller 2510 in timing with formation of the image of the fourth color. The superposed four color toner images are transferred simultaneously from the transfer belt 2501 to the paper in a transfer unit 2511. The paper to which the composite toner image has been transferred is conveyed to a fixation roller 2512 by a conveyor belt 2515, where the toner image is fixed on the paper. Thereafter, the paper is ejected onto a paper ejection tray 2514 by a paper ejection roller 2513.

Figure 64:
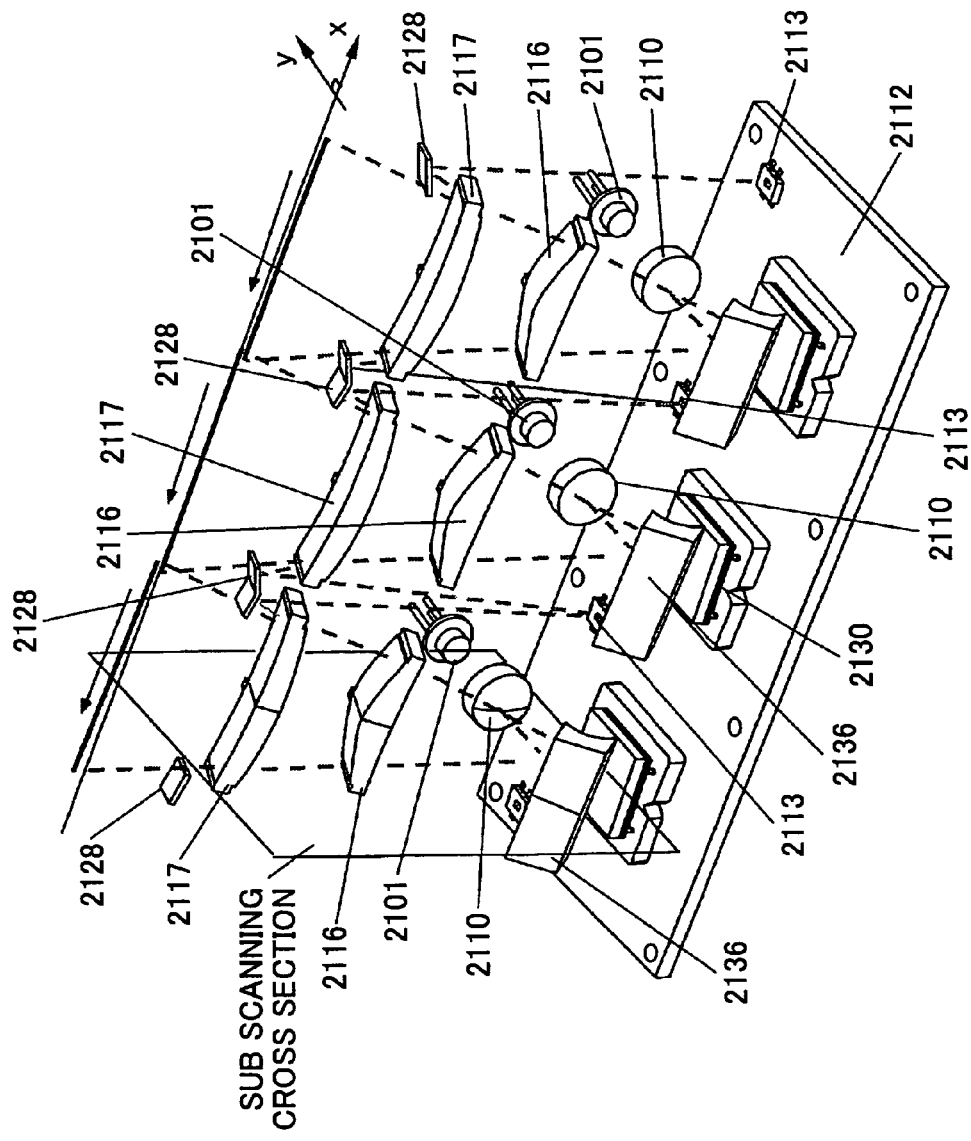
FIG. 64 is a schematic diagram of an optical scanning device according to the 18$^{th}$ embodiment of the present invention.
Figure 65:
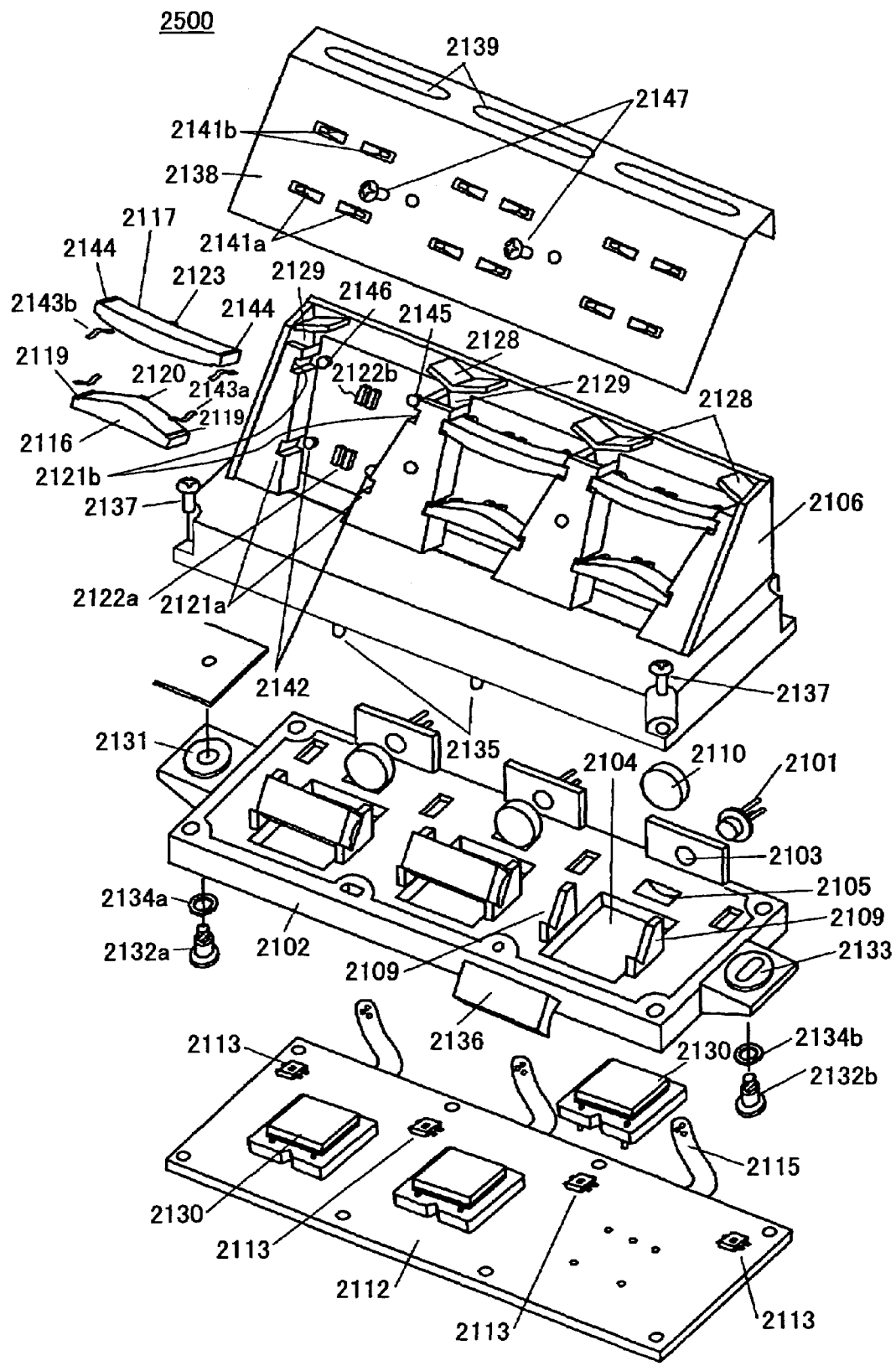
FIG. 65 is an exploded perspective view of the optical scanning device according to the 18$^{th}$ embodiment of the present invention.
Figure 66:
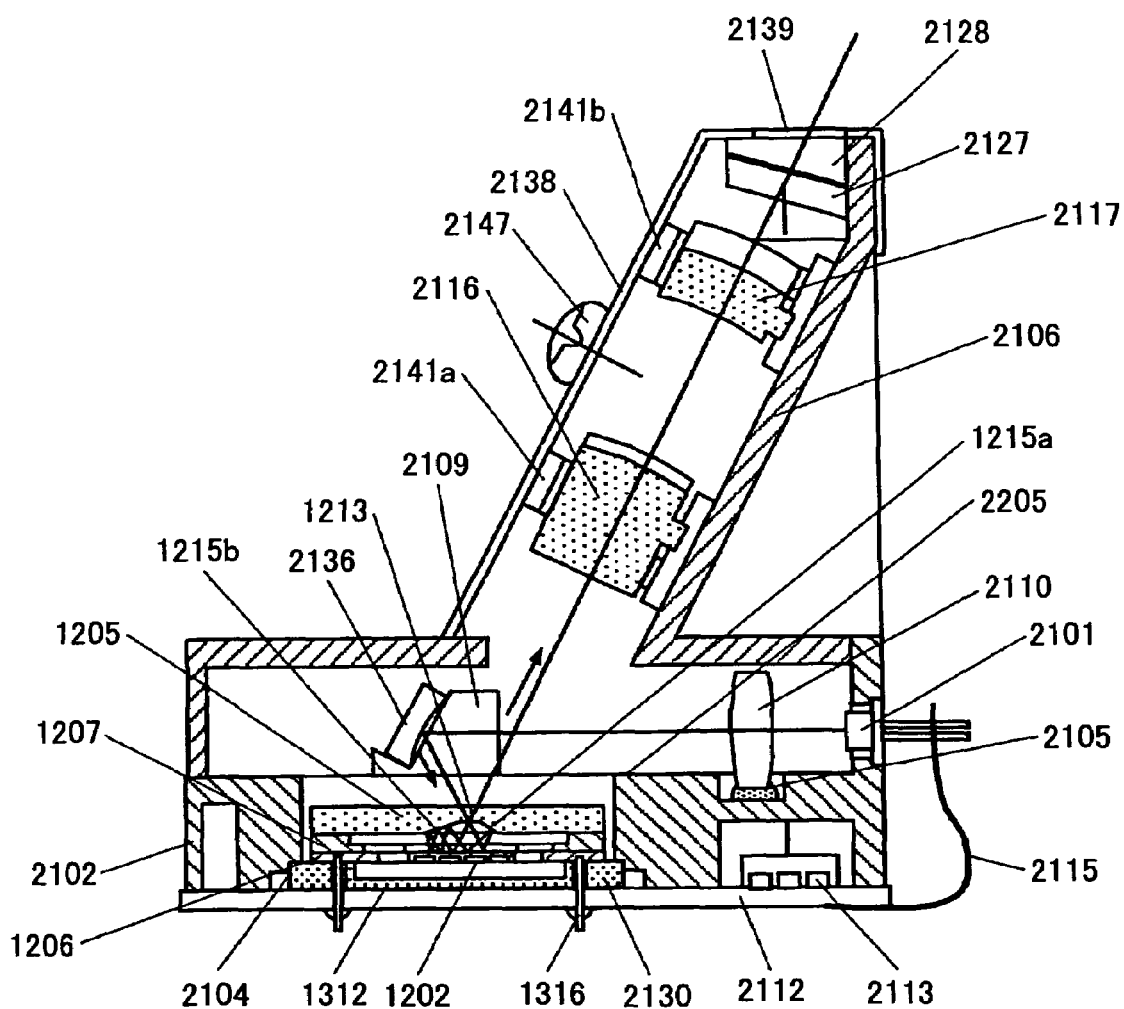
FIG. 66 is a cross-sectional view of the optical scanning device, illustrating a cross-sectional structure thereof in the sub scanning direction, according to the 18$^{th}$ embodiment of the present invention.

FIG. 64 is a schematic diagram of the optical scanning device 2500 of each station. FIG. 65 is an exploded perspective view of the optical scanning device 2500, illustrating a detailed configuration thereof. FIG. 66 is a cross-sectional view of the optical scanning device 2500, illustrating a cross-sectional structure thereof in the sub scanning direction.

As illustrated in FIG. 64, the optical scanning device 2500 according to this embodiment employs three deflector mirrors 2130 according to the present invention. In this embodiment, the deflector mirror according to the 16$^{th}$ embodiment, which increases the angle of deflection of a light beam by applying the principle of the optical lever, is assumed as each deflector mirror 2130. However, any of the deflector mirrors according to the other embodiments is also employable.

In correspondence to each deflector mirror 2130, a semiconductor laser 2101, a coupling lens 2110, a cylindrical lens 2136, a first scanning lens 2116, and a second scanning lens 2117 are provided. A scanned surface (the surface of the photosensitive body drum 2504) is divided into portions corresponding to the deflector mirrors 2130, and the portions of the scanned surface are scanned by the corresponding deflector mirrors 2130. In FIG. 64, x indicates the main scanning direction, and y indicates the sub scanning direction. In the vicinity of each second scanning lens 2117, mirrors 2128 for reflecting a scanning light beam toward corresponding synchronization detection sensors 2113, mounted on a printed board 2112 in order to detect synchronization of main scanning, are provided. A cross-sectional structure of the optical scanning device 2500 in a sub scanning cross section including one of the deflector mirrors 2130 is as illustrated in FIG. 66. In FIG. 66, the same elements as those of FIGS. 52, 53A and 53B are referred to by the same numerals.

A detailed description is given below of a configuration and operation of the optical scanning device 2500 of each station. A light beam emitted from each semiconductor laser 2101 travels through the corresponding coupling lens 2110 and cylindrical mirror 2136 so as to be made incident on the mirror surface of the corresponding deflector mirror 2130 through the slit window 1213 of the cover substrate 1205 at an angle of approximately 20° to a normal in a sub scanning cross section including the torsion beams 1208. The light beam reflected from the mirror surface 1250 of the mirror substrate 1202 is reflected back and forth five times in total between the mirror surface 1250 and the mirror surfaces 1215a and 1215b of the cover substrate 1205 while shifting its position of reflection in the sub scanning direction. Thereafter, the light beam exits from the slit window 1213. In this embodiment, reflection is thus repeated multiple times so that a large scanning angle can be obtained even with a small deflection angle of the vibration mirror, thereby reducing optical path length.

As described above, letting the total number of reflections and the deflection angle be N and $\alpha$, respectively, the scanning angle $\theta$ is given by $2N\alpha$. In this embodiment, N=5 and $\alpha$=5°. Accordingly, the maximum scanning angle is 50°, of which 35° is an image recording area. Use of the resonance of the deflector mirror reduces voltage to be applied for driving and also heat generation. However, as is apparent from the above-described equation, as recording rate, that is, an oscillation frequency, increases, the spring constant K of the torsion beams is required to increase, thus preventing a sufficient deflection angle from being obtained. Accordingly, as described above, the mirror surfaces 1215a and 1215b forming a roof mirror are provided inside the cover substrate 1205 so as to increase the scanning angle. As a result, a necessary and sufficient scanning angle can be obtained even in the case of high-speed recording.

Further, the mirror surfaces 1215a and 1215b are provided in a roof-like manner so that an angle of incidence in the sub scanning direction on the mirror surface 1250 of the mirror substrate 1202 switches between positive and negative every reflection, that is, the traveling direction of a light beam by reflection switches between rightward and leftward. As a result, the curving of a scanning line on the scanned surface accompanying oblique incidence is controlled so as to maintain linearity, and the rotation of light rays in a plane perpendicular to an optical axis is caused to return to the original position at the time of an exit so as to prevent degradation of imaging performance.

Referring to FIG. 65, a stepped through hole 2103 is provided in each wall provided in a standing condition to a frame member 2102. Each semiconductor laser 2101, which is a light source, is press-fitted into the corresponding stepped through hole 2103 from the opposite (outer) side with reference to its stem periphery, and is positioned in the optical axis direction by having its flange surface butting against the stepped part of the through hole 2103. Each coupling lens 2110 is aligned with a light emission point in the optical axis direction in a corresponding U-shaped recess 2105 through a UV adhesive agent so that the optical axis of the coupling lens 2110 is aligned with the emission axis of the corresponding semiconductor laser 2101 and that exiting light rays becomes parallel rays. The coupling lens 2110 is fixed in the recess 2105 by hardening the UV adhesive agent therebetween.

A light beam emerging from each coupling lens 2110 is made incident on the corresponding cylindrical mirror with negative curvature in the sub scanning direction joined to a corresponding pair of attachment sloped members 2109. Then, the light beam is made incident on the corresponding deflector mirror 2130 through the slit window 1213 of the cover substrate 1205 as a focusing beam focusing on the mirror surface 1250 of the mirror substrate 1202 in the sub scanning direction.

Each deflector mirror 2130 is positioned with reference to the outer edge of the base substrate 1312 from the bottom side of a corresponding stepped quadrangular hole 2104 provided on the frame bottom surface side so that the direction of the torsion beams 1208 is aligned with the optical axis direction. The position of the mirror surface 1250 is determined by having the flange surface of the deflector mirror 2130 butting against the stepped part of the quadrangular hole 2104. In this embodiment, the positions of the three deflector mirrors 2130 are determined by the single frame member 2102 so as to be equally spaced.

The lead terminals 1316 projecting from the bottom surface of the base substrate 1312 of each deflector mirror 2130 are inserted into the corresponding through holes of the printed board 2112 so as to be soldered. As a result, each deflector mirror 2130 is fixed with the upper surface of the printed board 2112 being in contact with the frame member 2102 so as to close the lower-side opening thereof, and circuit connections are made.

In addition to the deflector mirrors 2130, the driver circuit of each semiconductor laser 2101, electronic components forming the driver circuit of each deflector mirror 2130, and the above-described synchronization detection sensors 2113 are mounted on the printed board 2112, where all interconnections with external circuits are made.

Each of cables 2115 has one end thereof connected to the printed board 2112, and is connected to the lead terminal of the corresponding semiconductor laser 2101.

The frame member 2102 is formed of glass fiber reinforced resin or of die casting aluminum that can ensure a certain rigidity. Flange parts 2131 and 2133 for attachment to the structure of the main body of the image forming apparatus are formed at both ends of the frame member 2102. The flange part 2131 has a reference hole. The shaft part of a fixing screw 2132a is fitted into the inside of the reference hole through a spring washer 2134a. The flange part 2133 has an elongated hole. A fixing screw 2132b is inserted through the elongated hole through a spring washer 2134b. Thereby, the frame member 2102 is fixed so as to oppose the corresponding photosensitive body drum 2504. At this point, adjustment is made on the scanned surface (photosensitive body drum) with looseness by the reference hole as a rotary shaft so that a scanning line scanned by any of the optical scanning devices 2500 is parallel to the direction x perpendicular to the direction y of the movement of the scanned surface.

The upper surface of the frame member 2101 is made parallel to the butting surface in the mirror nominal direction of each deflector mirror 2130 provided on the bottom side of the corresponding quadrangular hole 2104. Two projections 2135 projecting from the bottom surface of a housing 2106 for housing the first and second scanning lenses 2116 and 2117 are inserted into the engagement holes of the frame member 2102, so that the housing 2106 is positioned on the upper surface of the frame member 2102. The housing 2106 is screwed in its four corners with screws 2137. In this embodiment, the screws 2137 are fastened to the printed board 2112 through the through holes of the frame member 2102, so that the housing 2106, the frame member 2102, and the printed board 2112 are joined as a unit with the frame member 2102 being interposed between the housing 2106 and the printed board 2112. Thereafter, the above-described bonding is performed.

In the housing 2106, the first and second scanning lenses 2116 and 2117 forming an imaging part are arranged, respectively, in the main scanning direction, and are held as a unit, being positioned so that their respective scanning areas slightly overlap with each other.

In each first scanning lens 2116, a projection 2120 for positioning in the main scanning direction is provided on its sub scanning direction reference surface so as to project in the center thereof, and a flat pressed surface 2119 for positioning in the optical axis direction is provided at each end on each of the incident surface side and the emergent (exiting) surface side. The projection 2120 is engaged with a corresponding groove 2122a integrated with the housing 2106, and the flat pressed surfaces 2119 are inserted into a corresponding pair of cutouts 2121a formed in the housing 2106 so as to be pressed toward the incident surface side by a corresponding pair of corrugated plate springs 2143a. Thereby, the positions of the first scanning lenses 2116 in the same plane are maintained. As a result, the first scanning lenses 2116 are positioned relative to each other in the same plane perpendicular to the optical axis. Further, by having the sub scanning direction reference surface butting against the ends of a corresponding pair of projections 2142 projecting from the housing 2106, each first scanning lens 2116 is positioned in a plane perpendicular to the optical axis so that the height of its disposition in the sub scanning direction is determined. The first scanning lenses 2116 are supported, being pressed by a corresponding pair of leaf springs 2141a integrated with a cover 2138.

Likewise, each second scanning lens 2117 includes a projection 2123 projecting in the center of its sub scanning direction reference surface for positioning in the main scanning direction and flat pressed surfaces 2144 at both ends. The projection 2123 is engaged with a corresponding groove 2122b integrated with the housing 2106, and the flat pressed surfaces 2144 are inserted into a corresponding pair of cutouts 2121b. Then, the second scanning lens 2117 is pressed toward the emergent surface side by a corresponding pair of corrugated plate springs 2143b so as to have its position maintained. The disposition height in the sub scanning direction is determined by having the sub scanning direction reference surface butting against the end of a corresponding projection 2145 projecting from the housing 2106 and the end of an adjustment screw 2146 movable in the sub scanning direction. The second scanning lens 2117 is supported, being pressed by a corresponding pair of leaf springs 2141b integrated with the cover 2138. The cover 2138 is fastened by screws 2147.

In this embodiment, the three deflector mirrors 2130 are arranged in the main scanning direction in each optical scanning device 2500. However, the number of deflector mirrors 2130 may be increased or decreased as required.

The present invention is not limited to the specifically disclosed embodiments, and variations and modifications may be made without departing from the scope of the present invention.

The present invention is based on Japanese Priority Patent Applications No. 2004-117199, filed on Apr. 12, 2004, and No. 2004-122688, filed on Apr. 19, 2004, the entire contents of which are hereby incorporated by reference.

What is claimed is:

1. A deflector mirror, comprising:
    a mirror substrate configured to vibrate in a reciprocating manner on beams as a torsional rotary shaft so as to deflect a light beam emitted from a light source,
    wherein the mirror substrate includes a plurality of regions in each of portions thereof extending from the torsional rotary shaft to respective ends of the mirror substrate, the regions being different in flexural rigidity,
    wherein the flexural rigidity is maximized in a first one of the regions between the torsional rotary shaft and the end of the mirror substrate in each of said portions thereof the first one of the regions including a position substantially L/3 apart from the torsional rotary shaft, L being a dimension of the mirror substrate in a direction perpendicular to the torsional rotary shaft, and
    wherein in the first one of the regions, bending moment acting on the mirror substrate when the mirror substrate vibrates is maximized, and
    the flexural rigidity of a second one of the regions disposed between the torsional rotary shaft and the first one of the regions is lower than the flexural rigidity of the first one of the regions.

2. The deflector mirror as claimed in claim 1, wherein the flexural rigidity is caused to differ by forming a plurality of recesses on a side of the mirror substrate.

3. The deflector mirror as claimed in claim 1, wherein the flexural rigidity is caused to differ by varying thickness of the mirror substrate.

4. The deflector mirror as claimed in claim 1, wherein a ratio of geometrical moment of inertia to bending moment is substantially constant through the regions of the mirror substrate.

5. The deflector mirror as claimed in claim 1, further comprising:
    an external force generator configured to generate an external force and exert the external force on the mirror substrate so that the mirror substrate vibrates in a reciprocating manner on the torsional rotary shaft.

6. The deflector mirror as claimed in claim 5, wherein the external force generator is an electrostatic force exerted between a movable electrode and a fixed electrode provided at an end part of the deflector mirror.

7. The deflector mirror as claimed in claim 5, wherein the external force generator is a magnetic force generated by causing electric current to flow through a driving coil by providing a static magnetic field generator providing a static magnetic field to the driving coil, the driving coil being provided around a periphery of the mirror substrate.

* * * * *